US012793368B2

(12) United States Patent
Vasudevan et al.

(10) Patent No.: US 12,793,368 B2
(45) Date of Patent: Nov. 10, 2026

(54) TECHNIQUES FOR INTERACTING WITH COMPONENT PARTS OF AN OBJECT REPRESENTED BY AN EXTENDED-REALITY REPRESENTATION OF THE OBJECT USING HAND GESTURES IN AN EXTENDED-REALITY ENVIRONMENT, AND SYSTEMS AND METHODS OF USE THEREOF

(71) Applicant: Meta Platforms Technologies, LLC, Menlo Park, CA (US)

(72) Inventors: Soundararaghavan Vasudevan, Sammamish, WA (US); Jason Putnam, Snohomish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 112 days.

(21) Appl. No.: 19/017,171

(22) Filed: Jan. 10, 2025

(65) Prior Publication Data

US 2025/0232544 A1 Jul. 17, 2025

Related U.S. Application Data

(60) Provisional application No. 63/566,080, filed on Mar. 15, 2024, provisional application No. 63/620,822, filed on Jan. 13, 2024.

(51) Int. Cl.
*G06T 19/20* (2011.01)
*G06F 3/01* (2006.01)

(52) U.S. Cl.
CPC .............. *G06T 19/20* (2013.01); *G06F 3/017* (2013.01); *G06T 2200/24* (2013.01);
(Continued)

(58) Field of Classification Search
CPC . G06T 19/20; G06T 2200/24; G06T 2210/04; G06T 2219/004; G06T 2219/2008; G06T 2219/2016; G06F 3/017
See application file for complete search history.

(56) References Cited

U.S. PATENT DOCUMENTS 10,255,727 B1 4/2019 Gribetz et al.
11,023,035 B1 * 6/2021 Atlas ...................... G06F 3/014
(Continued)

OTHER PUBLICATIONS

Beattie N., et al., "Taking the LEAP with the Oculus HMD and CAD-Plucking at Thin Air?," Procedia Technology, Jun. 29, 2015, vol. 20, pp. 149-154.
(Continued)

*Primary Examiner* — Terrell M Robinson
(74) *Attorney, Agent, or Firm* — Morgan, Lewis & Bockius LLP

(57) ABSTRACT

A method of interacting with extended reality (XR) objects within a computer aided design is described. The method includes, while presenting an XR representation of an object and in response to a first gesture, initiate a first XR mode that allows the user to manipulate a plurality of component parts of the object within the XR representation. The method includes, in response to a second gesture directed to a component part of the plurality of component parts of the XR representation, cause a manipulation to the component part. The method includes, in response to a third hand gesture, initiate a second XR mode, the second XR mode causing presentation of an XR augment that defines a boundary. The method further includes, in response to movement of at least one component part to within a threshold distance of the boundary, coupling together the plurality of component parts to form the object.

20 Claims, 37 Drawing Sheets

(52) U.S. Cl.
CPC .... *G06T 2210/04* (2013.01); *G06T 2219/004* (2013.01); *G06T 2219/016* (2013.01); *G06T 2219/2008* (2013.01); *G06T 2219/2016* (2013.01)

(56) References Cited

U.S. PATENT DOCUMENTS

| | | | | |
|---|---|---|---|---|
| 2014/0240444 | A1* | 8/2014 | Szymczyk | H04N 7/157<br>348/14.07 |
| 2016/0292925 | A1* | 10/2016 | Montgomerie | G06F 3/011 |
| 2017/0136622 | A1* | 5/2017 | Bruemmer | B25J 9/161 |
| 2019/0279424 | A1* | 9/2019 | Clausen | G06F 3/017 |
| 2021/0005103 | A1 | 1/2021 | Kocher et al. | |
| 2022/0086205 | A1* | 3/2022 | LeBeau | G06F 3/011 |
| 2022/0253567 | A1 | 8/2022 | Apte et al. | |
| 2022/0264079 | A1* | 8/2022 | Perlin | H04N 13/344 |
| 2025/0069342 | A1* | 2/2025 | Perlin | G06F 3/011 |

OTHER PUBLICATIONS

International Search Report and Written Opinion for International Application No. PCT/US2025/011368, mailed Apr. 22, 2025, 13 pages.

* cited by examiner

TECHNIQUES FOR INTERACTING WITH COMPONENT PARTS OF AN OBJECT REPRESENTED BY AN EXTENDED-REALITY REPRESENTATION OF THE OBJECT USING HAND GESTURES IN AN EXTENDED-REALITY ENVIRONMENT, AND SYSTEMS AND METHODS OF USE THEREOF

PRIORITY AND RELATED APPLICATIONS

This application claims priority to U.S. Provisional Patent Application No. 63/620,822, entitled "Techniques For Interacting With Components Parts Of An Object Represented By An Extended-Reality Representation Of The Object Using Hand Gestures In An Extended-Reality Environment, And Systems And Methods Of Use Thereof" filed Jan. 13, 2024 and U.S. Provisional Patent Application No. 63/566,080, entitled "Techniques For Interacting With Components Parts Of An Object Represented By An Extended-Reality Representation Of The Object Using Hand Gestures In An Extended-Reality Environment, And Systems And Methods Of Use Thereof" filed Mar. 15, 2024, each of which is hereby incorporated by reference in its entirety.

TECHNICAL FIELD

This disclosure relates generally to extended-reality headsets, including but not limited to techniques for presenting and manipulating component parts of an object (e.g., based on a computer-aided design model of that object) represented by an extended-reality representation of the object using hand gestures in an extended-reality environment.

BACKGROUND

Manipulating component parts of objects represented by extended-reality representations is a difficult task. One example is trying to interact with models based on computer aided design, which is typically performed at laptops and desktop computers. Users' ability to visualize and modify designs is limited by what can be visualized on those devices. Additionally, to understand the structural limitations of a design, users reproduce scale models of their designs. Use of extended-reality headsets for design applications is limited.

As such, there is a need to address one or more of the above-identified challenges. A brief summary of solutions to the issues noted above are described below.

SUMMARY

The methods, systems, and devices described herein allow users wearing extended-reality headsets to interact, manipulate, annotate, and/or build a plurality of component parts of an XR object within an artificial environment in an immersive and interactive manner. The methods, systems, and devices described herein also allow users to collaborate with each other in an XR environment such that each user can see interactions, manipulations, and/or annotations performed by other users.

One example method performed at an extended-reality headset is described herein. This example method includes while presenting, using a lens system of the extended-reality headset, an extended reality (XR) representation of an object within a portion of a field of view of a user wearing the extended-reality headset, in response to a first hand gesture performed by the user directed to the XR representation, initiating a first XR mode that allows the user to manipulate a plurality of component parts of the object that are each represented within the representation of the XR object (for simplicity, the descriptions refer to component parts directly, but the skilled artisan will appreciate upon reading this disclosure that representations of the component parts are manipulated in an extended-reality environment and that the component parts (in their physical form) are not necessarily directly interacted with). The example method includes, while the first XR mode is active and in response to a second hand gesture performed by the user directed to a component part of the plurality of component parts of the object, causing a manipulation to the component part based on the second hand gesture. The example method includes in response to a third hand gesture performed by the user, initiate a second XR mode. The second XR mode causes presentation of an XR augment that defines a boundary for receiving one or more of the plurality of component parts. The example method further includes, while the second XR mode is active and in response to movement of at least one component part of the plurality of component parts to within a threshold distance of the boundary, coupling together the plurality of component parts to form the XR representation of the object in a structurally correct sequence.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

Figure 1A:
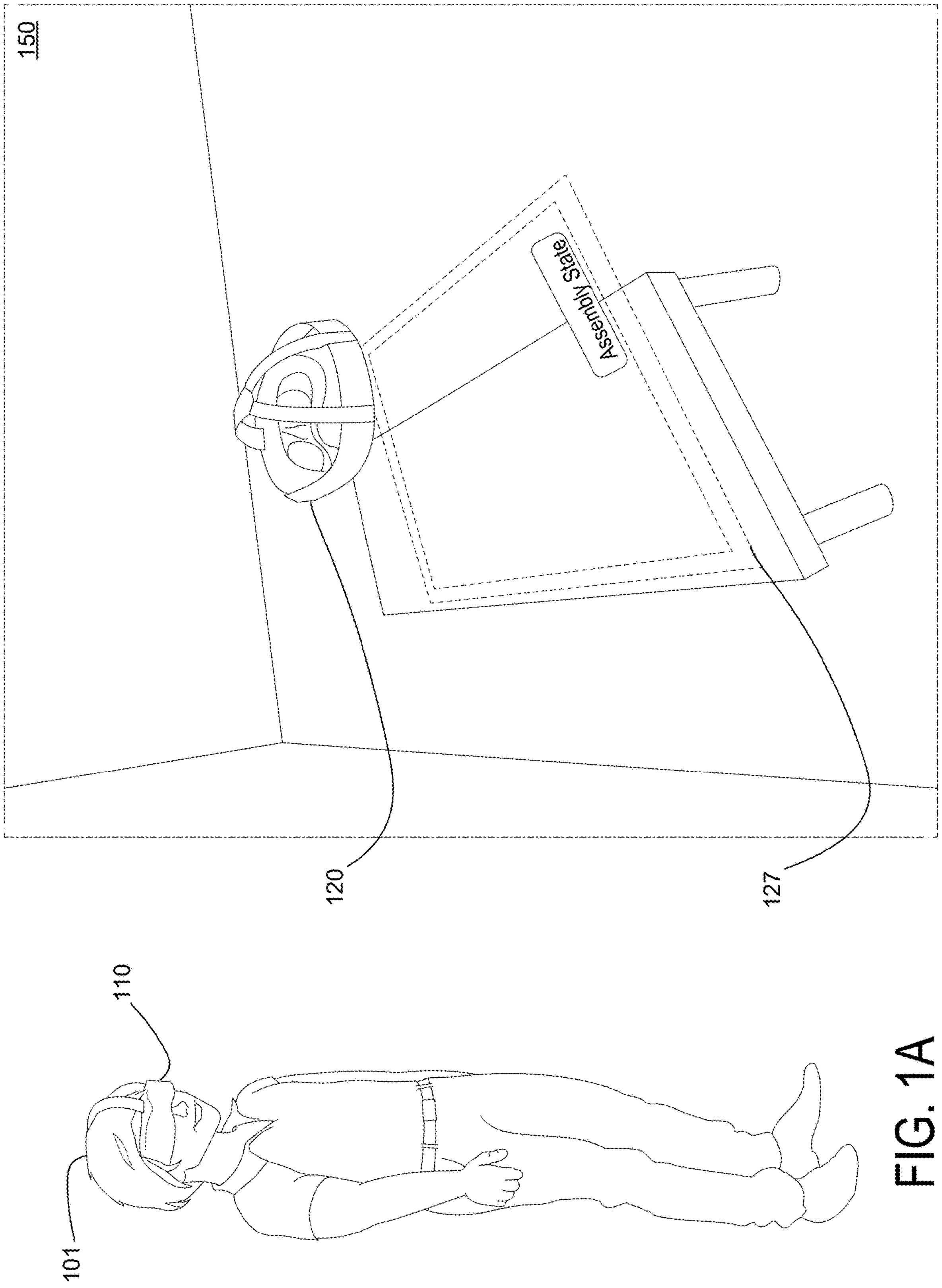
FIGS. 1A-1K illustrate interactions with one or more XR objects, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with various types of extended-realities (XRs) such as mixed-reality (MR) and augmented-reality (AR) systems. MRs and ARs, as described herein, are any superimposed functionality and/or sensory-detectable presentation provided by MR and AR systems within a user's physical surroundings. Such MRs can include and/or represent virtual realities (VRs) and VRs in which at least some aspects of the surrounding environment are reconstructed within the virtual environment (e.g., displaying virtual reconstructions of physical objects in a physical environment to avoid the user colliding with the physical objects in a surrounding physical environment). In the case of MRs, the surrounding environment that is presented through a display is captured via one or more sensors configured to capture the surrounding environment (e.g., a camera sensor, time-of-flight (ToF) sensor). While a wearer of an MR headset can see the surrounding environment in full detail, they are seeing a reconstruction of the environment reproduced using data from the one or more sensors (i.e., the physical objects are not directly viewed by the user). An MR headset can also forgo displaying reconstructions of objects in the physical environment, thereby providing a user with an entirely VR experience. An AR system, on the other hand, provides an experience in which information is provided, e.g., through the use of a waveguide, in conjunction with the direct viewing of at least some of the surrounding environment through a transparent or semi-transparent waveguide(s) and/or lens(es) of the AR glasses. Throughout this application, the term "extended reality (XR)" is used as a catchall term to cover both ARs and MRs. In addition, this application also uses, at times, a head-wearable device or headset device as a catchall term that covers XR headsets such as AR glasses and MR headsets.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMU) s of a wrist-wearable device) and/or detected via image data captured by an imaging device of a wearable device (e.g., a camera of a head-wearable device)) or a combination of the user's hands. In-air means, in some embodiments, that the user hand does not contact a surface, object, or portion of an electronic device (e.g., a head-wearable device or other communicatively coupled device, such as the wrist-wearable device), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight (ToF) sensors, sensors of an inertial measurement unit, etc.) detected by a wearable device worn by the user and/or other electronic devices in the user's possession (e.g., smartphones, laptops, imaging devices, intermediary devices, and/or other devices described herein).

FIGS. 1A-1J illustrate interactions with one or more XR objects 120 in an XR environment 150, in accordance with some embodiments. A head-wearable device 110 (e.g., an AR device 900, an VR device 910, as described in reference to FIGS. 9A-9C, and/or smart glasses and/or smart lenses) presents the XR environment 150 to a user 101 at via one or more displays. In some embodiments, the XR environment 150 is presented at another display device (e.g., a smartphone, a personal computer, a smart television, etc.) communicatively coupled to the head-wearable device 110. In some embodiments, the head-wearable device 110 is communicatively coupled to one or more controllers (e.g., a wrist-worn device and/or a handheld controller). The interactions with the one or more XR objects 120 are performed via user inputs provided by the user 101 wearing the head-wearable device 110. In some embodiments, the user inputs include at least one of a one or more hand gestures, one or more controller inputs, and/or one or more voice commands. In some embodiments, the one or more hand gestures are detected by an imaging device of the head-wearable device 110 (e.g., a front-facing camera) and/or a sensor of the one or more controllers (e.g., an inertial measurement unit (IMU) sensor of a handheld controller and/or an electromyography (EMG) sensor of a wrist-worn device). In some embodiments, the one or more controller inputs includes inputs performed at one or more of buttons, triggers, joysticks, and/or touch-input interfaces.

FIG. 1A illustrates one or more XR objects 120 presented via the one or more displays of the head-wearable device 110, in accordance with some embodiments. In some embodiments, each of the one or more XR objects 120 are (accurate) representations of designs, assemblies, or parts in a computer aided design (e.g., that is created and stored on the head-wearable device or uploaded on and/or shared with the head-wearable device via a communicatively coupled device). Accurate representations, for purposes of this disclosure, in some embodiments, means that the representations are to-scale, maintain appropriate aspect ratios, and are structurally accurate. The one or more XR objects 120 are presented with one or more user interfaces (UIs) (e.g., an XR augment 127). The one or more XR objects 120 form an assembly (e.g., a complete structural design). Additionally, FIG. 1A shows the head-wearable device 110 in a first mode and/or an assembly mode that allows the user to manipulate the one or more XR objects 120. One or more non-limiting examples of the manipulations that the user can perform while in the first mode include moving the one or more XR objects 120, enlarging the one or more XR objects 120, minimizing the one or more XR objects 120, recoloring the one or more XR objects 120, adjusting an opacity of the one or more XR objects 120, presenting the assembly of the one or more XR objects 120 in an exploded view, and presenting a cross section of the assembly of the one or more XR objects 120. In some embodiments, the first mode includes an XR augment 127 (e.g., a workspace XR augment, as illustrated in FIG. 1A) of the one or more XR objects 120. The XR augment 127 defines an area within the XR environment 150, as illustrated in FIG. 1A. In some embodiments, the user 101 can only perform one or more of the manipulations while the one or more XR objects 120 are within the XR augment 127. In some embodiments, when the head-wearable device 110 enters the first mode, the one or more XR objects 120 is first presented within the XR augment 127, as illustrated in FIG. 1A. In some embodiments, the user 101 performs a reset command (e.g., a double-clap hand gesture, a home-button press, and/or a "Return to workspace" voice command) to cause the one or more XR objects 120 to return to the XR augment 127.

In some embodiments, a second mode of the head-wearable device 110 is a build or part mode. The second mode causes the head-wearable device 110 to present the XR augment 127 that defines a boundary (e.g., around the area in the XR environment 150) for receiving at least one of the one or more XR objects 120. As one or more XR objects 120 are placed within the XR augment 127, the one or more objects 120, if part of an assembly (e.g., a model of the head-wearable device 110), are coupled in a structurally correct sequence. More specifically, the one or more XR objects 120, if part of an assembly, are connected in a sequence to assist a user in visualizing how one or more components of the assembly are built together or disassembled. In some embodiments, the second mode animates the coupling of the one or more XR objects in a structurally accurate sequence.

Figure 1B:
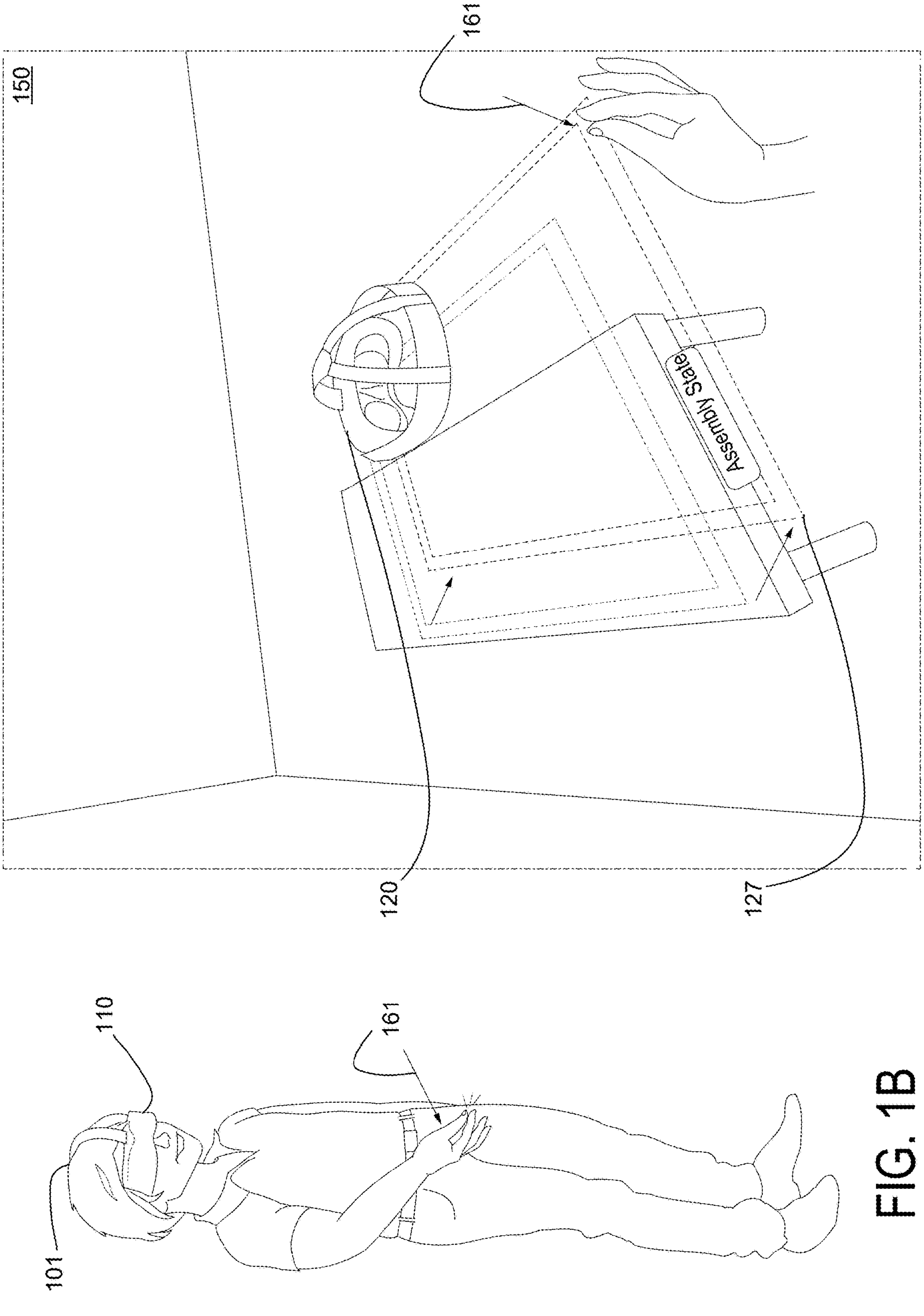

FIG. 1B shows the user 101 moving the XR augment 127 by performing a move gesture 161, in accordance with some embodiments. The user 101 performs the move gesture 161, targeted at the one or more XR objects 120 (e.g., and/or the XR augment 127, as illustrated in FIG. 1B), to move the one or more XR objects 120 in the XR environment 150. In some embodiments, the move gesture 161 is a move hand gesture (e.g., the user 101 performs an index finger pinch gesture and a drag gesture, as illustrated in FIG. 1B), a move voice command (e.g., the user 101 says "move the workspace closer to me"), and/or a combination thereof (e.g., the user 101 points at one of the one or more XR objects 120 and says "move that to the right"). As an example, the user 101 performs an index-finger pinch gesture 161 directed at the XR augment 127 (e.g., pinching at a first location of the XR augment 127 in the XR environment 150), moving their hand to a second location while holding the index-finger pinch gesture 161, and releasing the index-finger pinch gesture 161 to move the XR augment 127 to the second location, as illustrated in FIG. 1B.

Figure 1C:
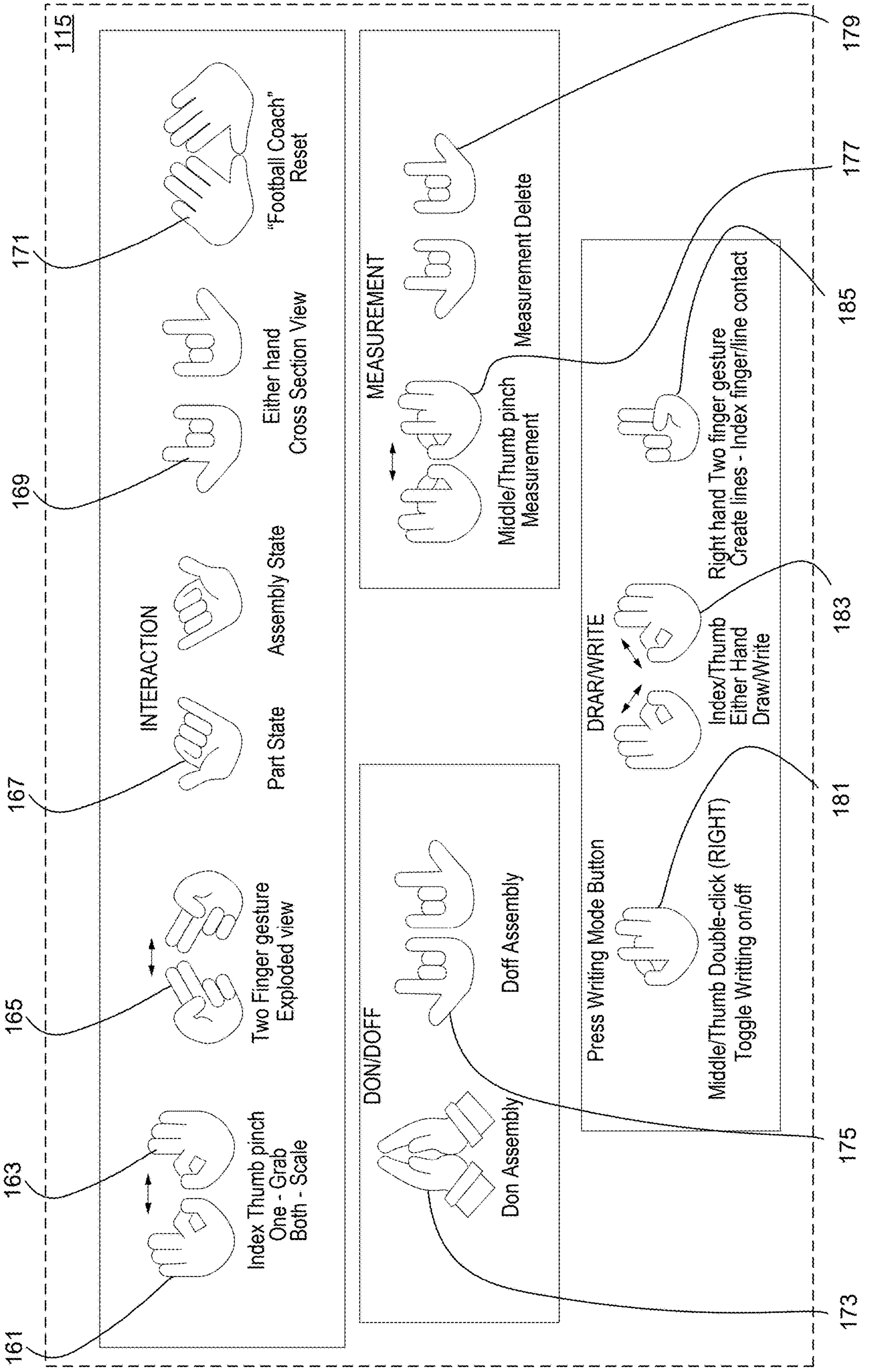

FIG. 1C shows an instructions user interface (UI) 115, in accordance with some embodiments. The instructions UI shows one or more modes available through the head-wearable device 110, as well as one or more tools or gestures that the user 101 can use to interact with the one or more XR objects 120. In some embodiments, the instructions UI 115 is presented at the head-wearable device 110 as one of the one or more XR objects 120. In some embodiments, the user 101 performs an instructions command (e.g., a clap hand(s) gesture and/or a voice command "show me the instructions") to cause the head-wearable device 110 to display the instructions UI 115.

Non-limiting examples of the different modes include a first mode, which is an assembly mode that allows the user 101 to interact with a plurality of XR objects and/or individual XR object of the one or more XR objects 120 (e.g., (i) the user 101 performs the move gesture 161 (e.g., an index-finger pinch-and-drag gesture) to move the one or more XR objects 120, (ii) the user 101 performs a scaling gesture 161-163 (e.g., a double index-finger gesture,) with both hands and separates the hands to increase a size of the one or more XR objects 120 and brings together the hands to decrease the size of the one or more XR objects 120, and/or (iii) the user 101 performs a reset gesture 171 (e.g., forming a triangle with both hands) to cause the one or more XR objects 120 to reset to a default state (e.g., a default position, a default orientation, a default color and/or opacity, etc.) that the one or more XR objects 120 are presented in before the user 101 modifies the one or more XR objects 120), as well as allow the user 101 to view an assembly of the one or more XR objects 120 in an exploded view or expanded view (e.g., (i) the user 101 performs an explode gesture 165 (e.g., a two-finger point gesture) with each hand and separates the hands to explode the assembly into its constituent components and brings together the hands to reassemble the assembly, (ii) the user 101 performs a state-switch gesture 167 (e.g., a thumb-and-pinkie finger gesture) to cause the one or more objects 120 to switch between being displayed as the assembly and being displayed as the constituent components of the assembly, and/or (iii) the user 101 performs a cross-section gesture 169 (e.g., a three-finger point gesture) to cause the one or more XR objects 120 to cause the assembly to be presented with a cross-sectional view including the constituent components); a second mode, which is a build mode that animates the coupling of the one or more XR objects 110 in a structurally accurate sequence (e.g., the user 101 performs a two-hand snap gesture to cause the coupling of the one or more XR objects 110 in the structurally accurate sequence); a third mode, which is a measurement mode that allows the user 101 to measure respective XR objects of the one or more XR objects 120 at scale (e.g., the user 101 performs a measurement gesture 177 (e.g., a middle-finger pinch gesture) with each hand to enter the measurement mode and separates the hands to create a measurement XR augment in the XR environment 150, and/or the user 101 performs a measurement-delete gesture 179 (e.g., a two-handed three-finger point gesture) to cause the measurement XR augment to be removed from the XR environment 150); a fourth mode, which is an annotation mode that allows the user 101 to draw and/or add messages in the XR environment 150 and/or onto the one or more XR objects 120 (e.g., the user

101 performs a drawing mode gesture 181 (e.g., middle-finger double-pinch gesture) to cause the head-wearable device 110 to enter the annotation mode, the user 101 performs a drawing gesture 183 (e.g., index-finger pinch-and-drag gesture) to draw in the XR environment 150, and/or the user 101 performs a straight line-drawing gesture 185 (e.g., a two-finger point gesture) to draw straight lines in the XR environment 150); and a fifth mode, which is a don/doff mode that allows the user 101 to wear and/or take off the one or more XR objects 120 from their person (e.g., the user 101 performs a don gesture 173 (e.g., a hands-together gesture) to cause the one or more XR objects 120 to be donned on the user 101, and/or the user 101 performs a doff gesture 175 (e.g., a two-handed three-finger point gesture) to cause the one of more XR objects 120 to be doffed off the user 101). The gestures shown in FIG. 1C are non-limiting and additional gestures can be used to manipulate the one or more XR objects 120. In some embodiments, the gestures shown in FIG. 1C can be used in conjunction with one or more voice commands. In some embodiments, the gestures shown in FIG. 1C can be shown with instructions or descriptions of one or more voice commands that the user can use.

Figure 1D:
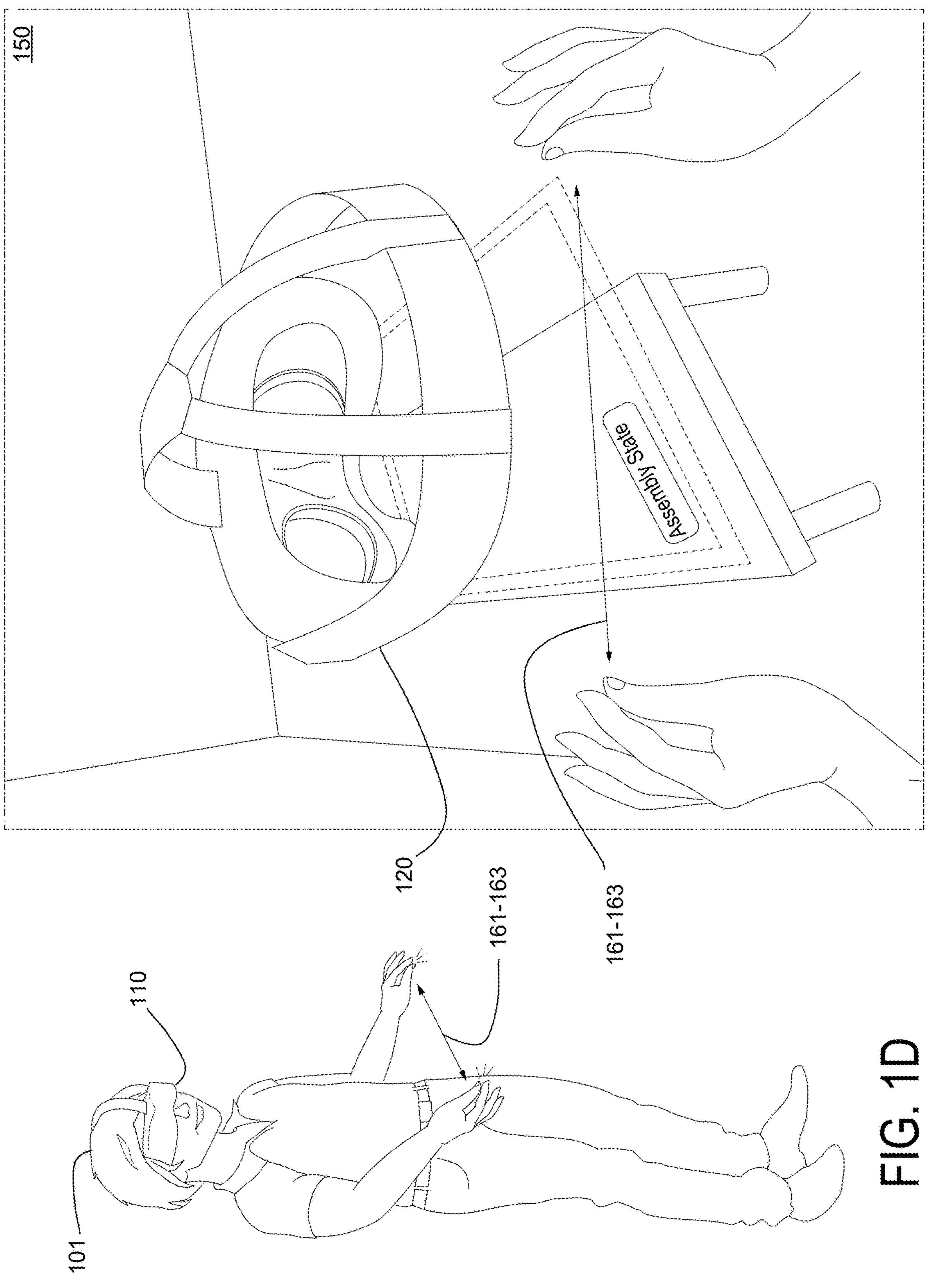

FIG. 1D shows a first manipulation of the one or more XR objects 120, in accordance with some embodiments. In particular, FIG. 1D shows the user 101 performing the scaling gesture 161-163 (e.g., two pinches in proximity and pulling the two pinches apart and/or outward) to enlarge and/or magnify the one or more XR objects 120 (e.g., the assembly of XR objects). The user 101 may perform a second double index-finger gesture (e.g., two pinches in proximity and separating the two pinches together and/or inward) to diminish and/or shrink the one or more XR objects 120. In some embodiments, the user 101 performs a scaling voice command (e.g., "enlarge this" and/or "shrink this"), alternatively to or in conjunction with the scaling gesture 161-163, to enlarge and/or diminish the one or more XR object 120. When the one or more XR objects 120 are enlarged, the one or more XR objects 120 maintain accurate dimensions and structural assembly, as illustrated in FIG. 1D.

Figure 1E:
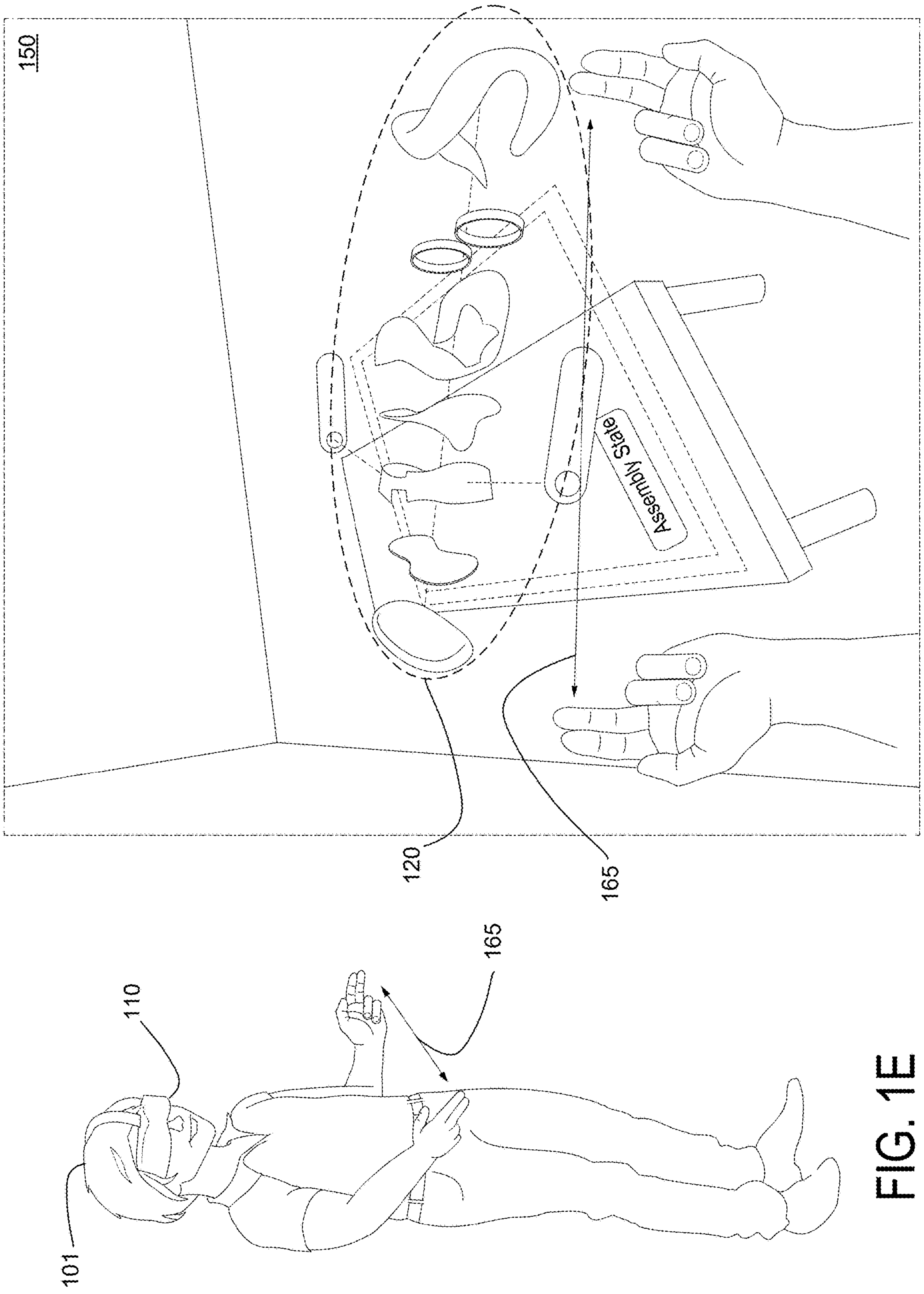

FIG. 1E shows a second manipulation of the one or more XR objects 120, in accordance with some embodiments. In particular, FIG. 1E shows the user 101 performing the explode gesture 165 (e.g., two two-finger pointing gestures performed in proximity and pulling the two two-finger pointing gestures apart and/or outward) to explode the assembly of one or more XR objects 120. In some embodiments, the user 101 performs a voice command (e.g., "expand this"), alternatively to and/or in conjunction with the explode gesture 165, to explode the assembly of the one or more XR objects 120. The user 101 can perform the explode gesture 165 in reverse (e.g., two two-finger pointing gestures performed in apart and pulling the two two-finger pointing gestures together) and/or a second voice command (e.g., "combine these") to bring the assembly of the one or more XR objects 120 together (e.g., remove the exploded view and return to the assembled view). Alternatively, the user 101 may perform the reset gesture 171 and/or another voice command (e.g., "reset") to reset the one or more XR objects 120 into their original state (e.g., remove or undo manipulations).

Figure 1F:
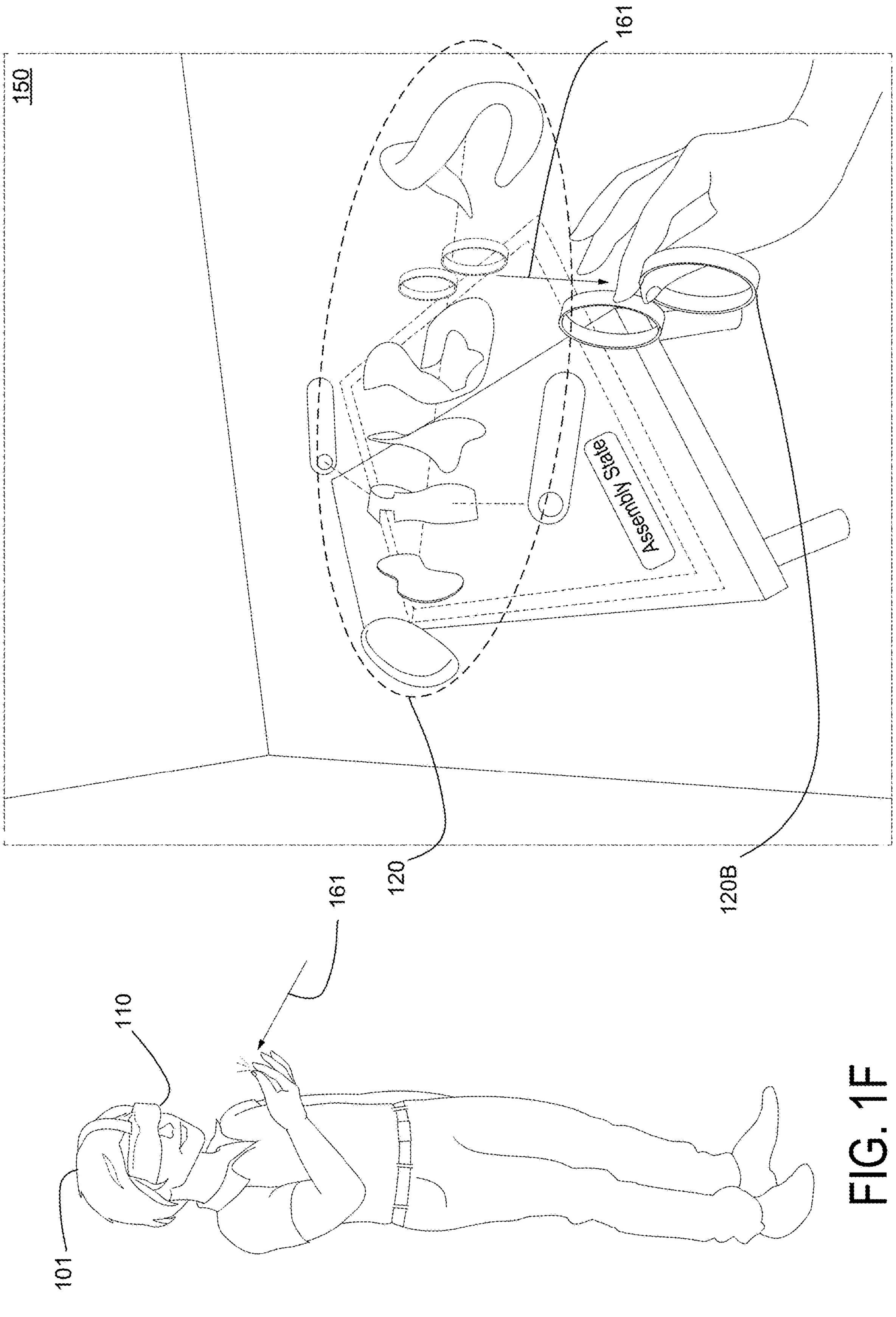
Figure 1G:
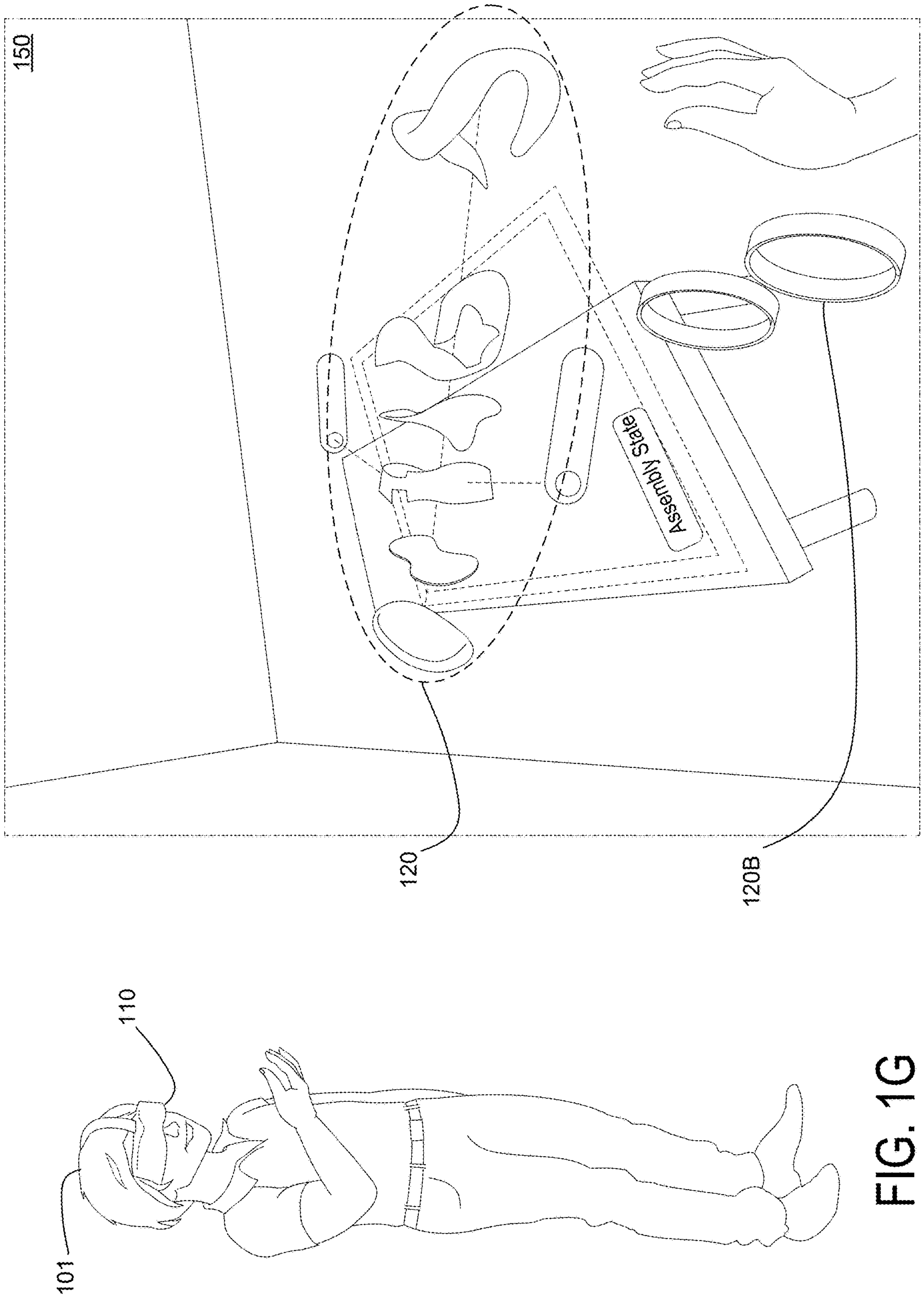

FIG. 1F shows a third manipulation of the one or more XR objects 120, in accordance with some embodiments. In particular, FIG. 1F shows the user 101 performing the move gesture 161 (e.g., a pinch gesture at a first XR object 120B) on a first XR object 120B of the one or more XR objects 120 to grab and move the first XR object 120B. FIG. 1G illustrates the user 101 interacting with the first XR object 120B after removing the first XR object 120B from the remainder of the one or more XR objects, in accordance with some embodiments. For example, the user 101 performs the move gesture 161 on the first XR object 120B to separate the first XR object 120B from the one or more XR objects 120 to perform one or more manipulations on the first XR object 120B. In some embodiments, when the user 101 performs the move gesture 161 on the first XR object 120B, the remainder of the one or more XR objects 120 remain in place. In some embodiments, the user 101 can perform other manipulations on the first XR object 120B without affecting the remainder of the one or more XR objects 120.

Figure 1H:
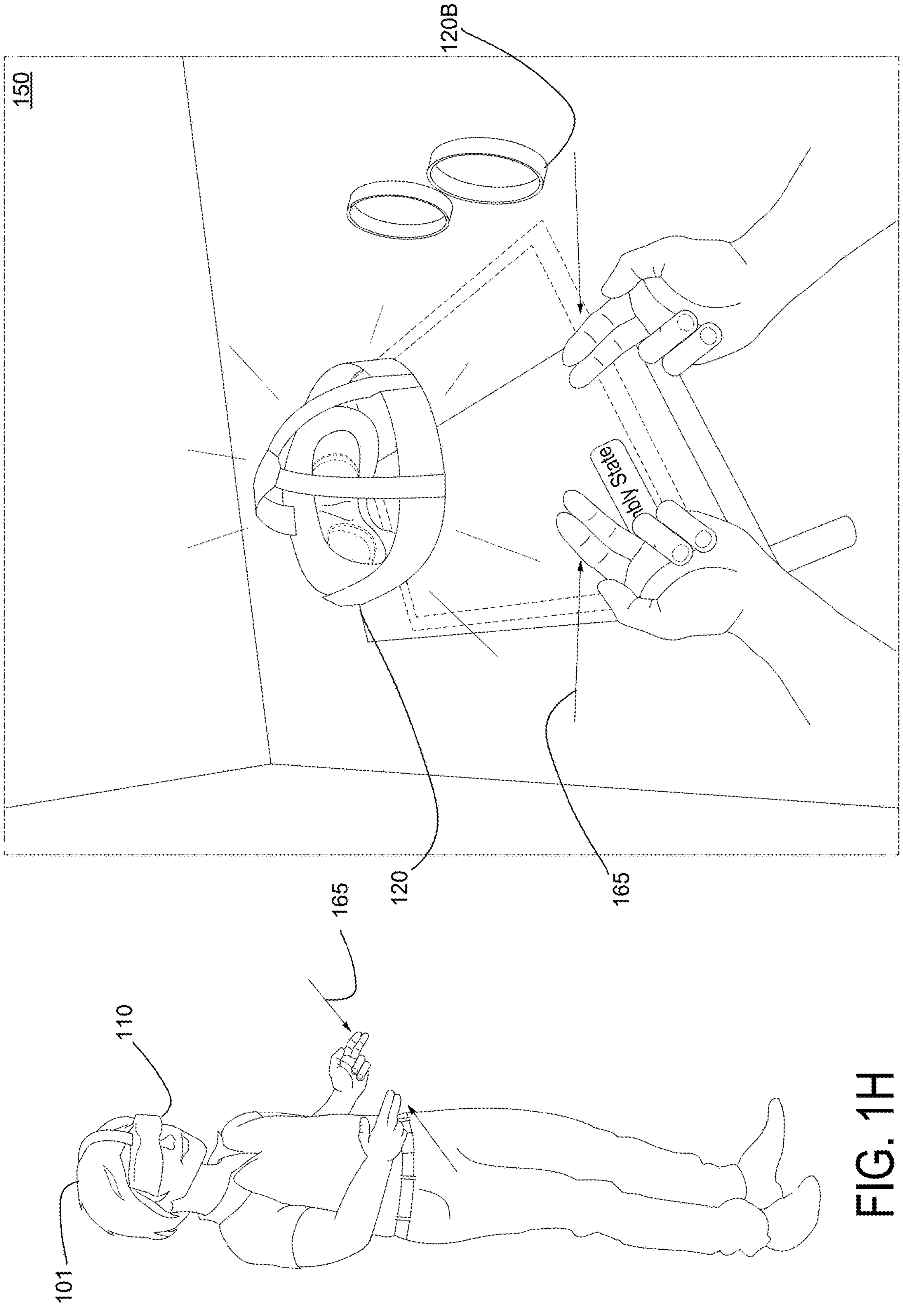

FIG. 1H shows the user 101 placing the first XR object 120 outside of the XR augment 127, in accordance with some embodiments. As the first XR object 120B is not within the XR augment 127, the user 101 can manipulate the remainder of the one or more XR objects 120 without manipulating the first XR object 120B not within the XR augment 127. As noted above, when additional XR objects are placed within the XR augment 127, if the additional XR objects are part of the assembly, the additional XR objects are coupled together in a structurally accurate animation. The user 101 performs the explode gesture 165 in reverse (e.g., and/or a combine gesture, such as a clap gesture that brings palms of the user 101 together) to couple the one or more XR objects 120 together in the structurally accurate animation. In some embodiments, the user 101 performs a voice command (e.g., "build this"), alternatively to or in conjunction with the explode gesture 165 in reverse, to couple the remainder of the one or more XR objects 120 together into the assembly in the structurally accurate animation. As the first XR object 120B is not within the XR augment 127, the first XR object 120B is not coupled together into the assembly and remains in place outside of the XR augment 127, as illustrated in FIG. 1H. The build mode is discussed below in reference to FIGS. 4A-4D.

Figure 1I:
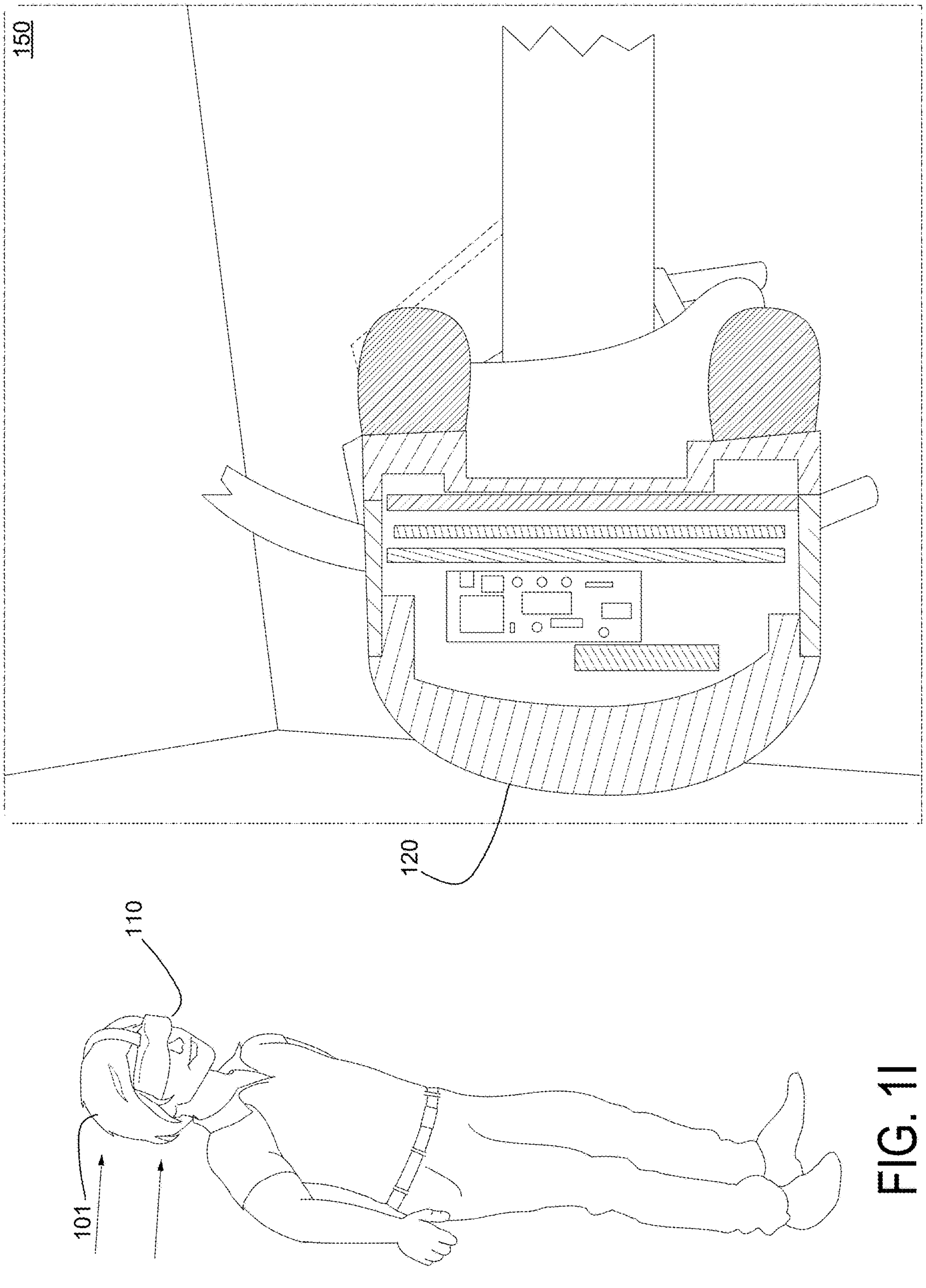

FIG. 1I shows a fourth manipulation performed on the one or more XR objects 120, in accordance with some embodiments. In particular, the user 101 moves their head into the one or more XR objects 120 in the XR environment 150. In response to the user's head and/or the head-wearable device 110 entering the one or more XR objects 120 (e.g., the user's head and/or the head-wearable device contacts and/or enters a proximity (e.g., two inches) of the one or more XR objects 120 in the XR environment 150), the head-wearable device 110 presents the cross-sectional view of the one or more XR objects 120, as illustrated in FIG. 1I. In some embodiments, the user 101 performs the move gesture 161 and brings the one or more XR objects 120 to the user's head such that the user's head and/or the head-wearable device 110 enters the one or more XR objects 120, and the head-wearable device 110 presents the cross-sectional view of the one or more XR objects 120. In some embodiments, the user 101 performs the cross-section gesture 169 (e.g., "rock on" gestures on each hand) and moves the cross-section gesture 169 through a portion of the one or more XR objects 120 to cause the head-wearable device 110 to present the cross-sectional view of the one or more XR objects 120. In response to the user 101 moving the cross-section gesture 169 through the one or more XR objects 120, the head-wearable device 110 presents the cross-sectional view of the one or more XR objects 120 (e.g., up to a current position of the cross-section gesture 169).

Figure 1J:
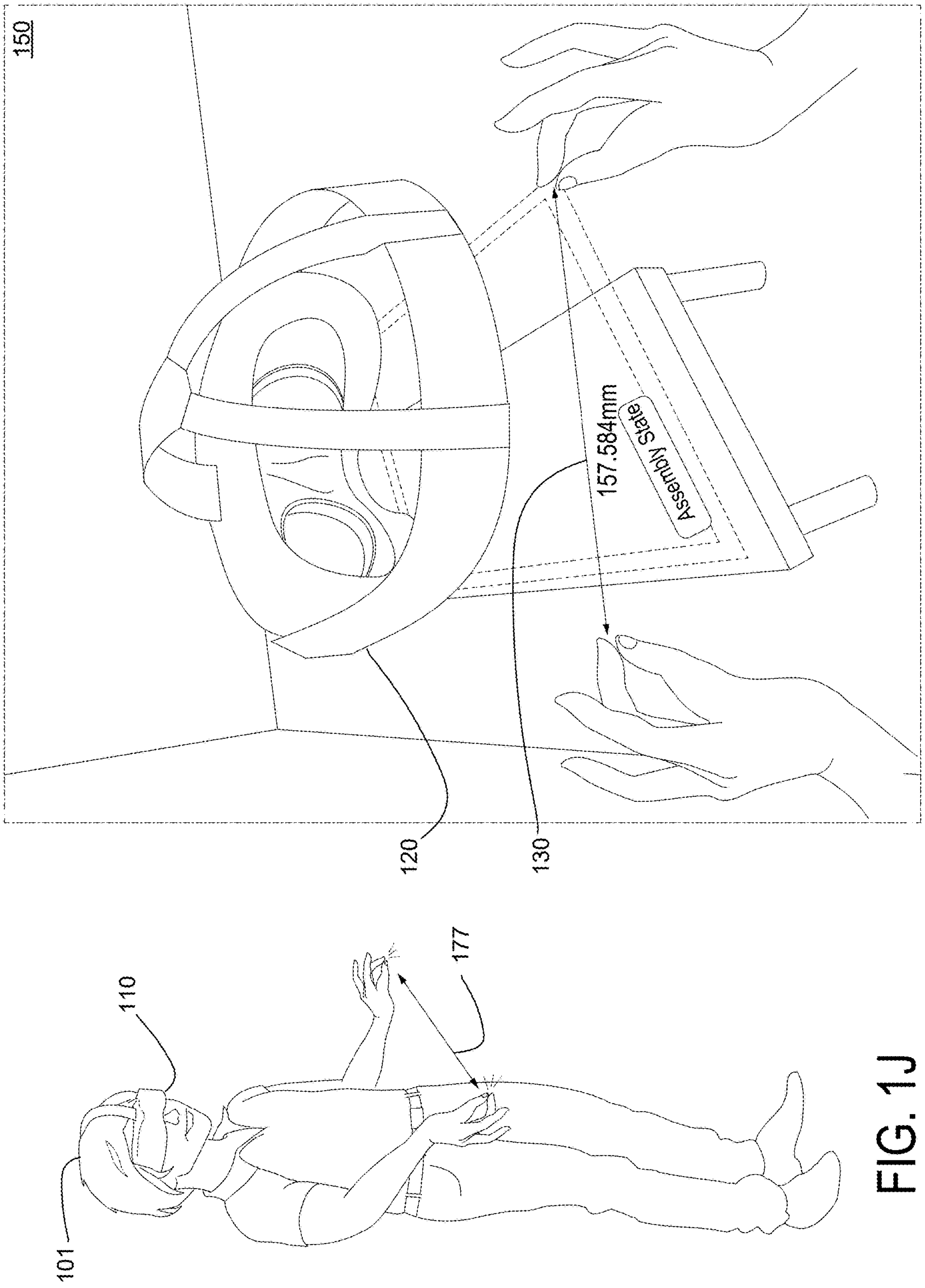

FIG. 1J shows a measurement mode of the head-wearable device 110, in accordance with some embodiments. While the head-wearable device 110 is in the measurement mode, the user 101 can perform the measurement gesture 177 (e.g., pinch gestures on each hand and pulling and/or bringing the two punch gestures together) to use one or more XR measurement tools 130 (e.g., a ruler, measurement cord, as illustrated in FIG. 1J, an angle measurement tool, a protractor, etc.). For example, as shown in FIG. 1J, the user 101 performs the measurement gesture 177 to cause one or more XR measurement tools 130 to measure the one or more XR objects 120 and/or portion thereof. In some embodiments, the user 101 performs a voice command (e.g., "give me a ruler"), alternatively to or in conjunction with the measurement gesture 177, to use the one or more XR measurement tools 130. In some embodiments, the measurements captured by the head-wearable device 110 are accurate and true to the dimension of the one or more XR objects 120. For example, if an XR object of the one or more XR objects 120 has a total length of 200 mm, the measured valued will be between 0 to 200 mm, even if the XR object is enlarged and/or diminished (e.g., the measurement is accurate regardless of the scale of the XR object).

Figure 1K:
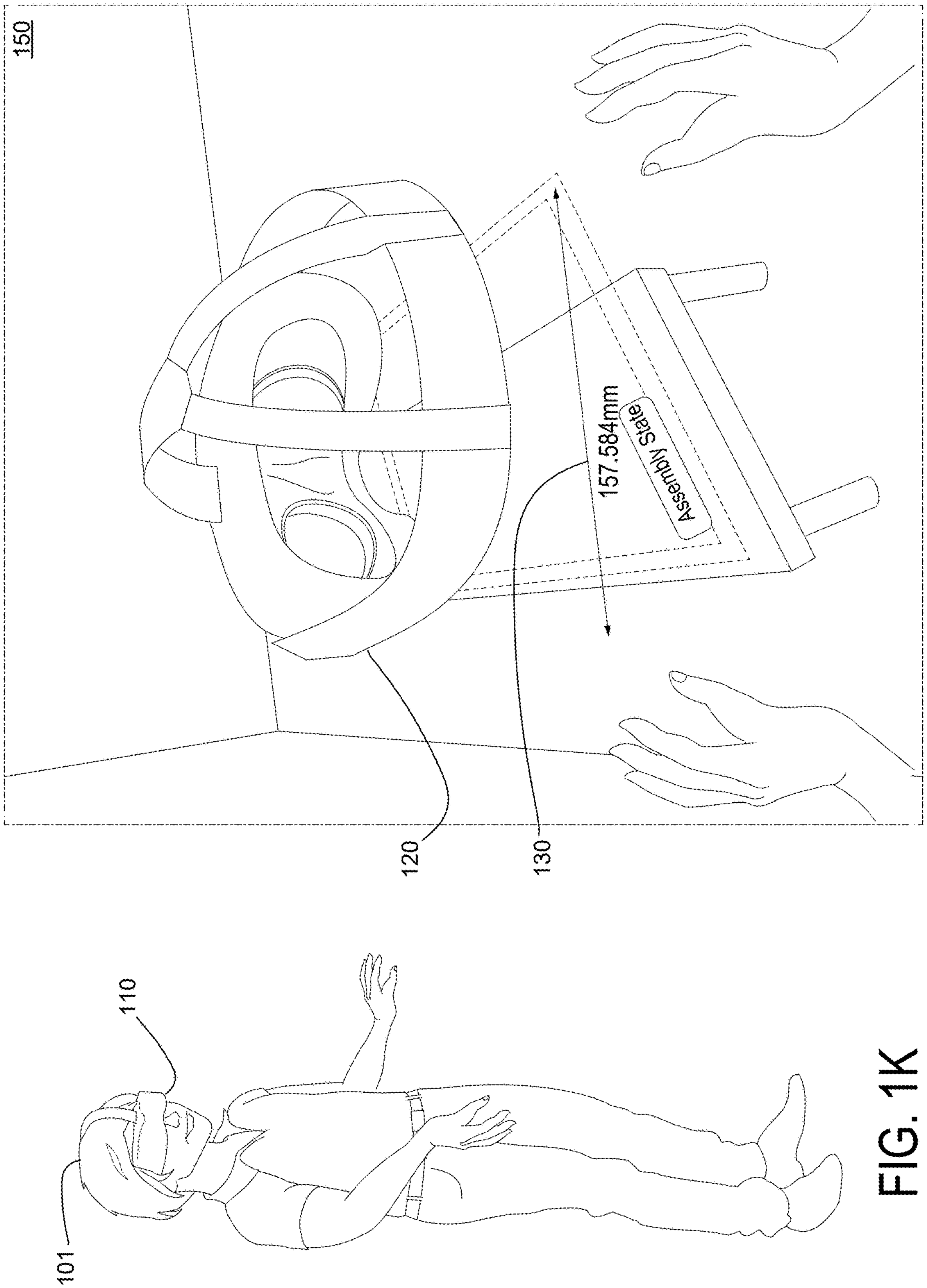

FIG. 1K shows the user 101 placing the one or more XR measurement tools 130 within the XR environment 150, in accordance with some embodiments. In particular, after the user 101 has measured the one or more XR objects 120 and would like to keep the one or more XR measurement tools 130 visible, the user 101 can leave the one or more XR measurement tools 130 in place. In some embodiments, the user 101 can remove the one or more XR measurement tools 130 (e.g., cause the head-wearable device 110 to cease displaying the one or more XR measurement tools 130), the user 101 can perform the measurement-delete gesture 179 and/or an additional voice command.

Figure 2A:
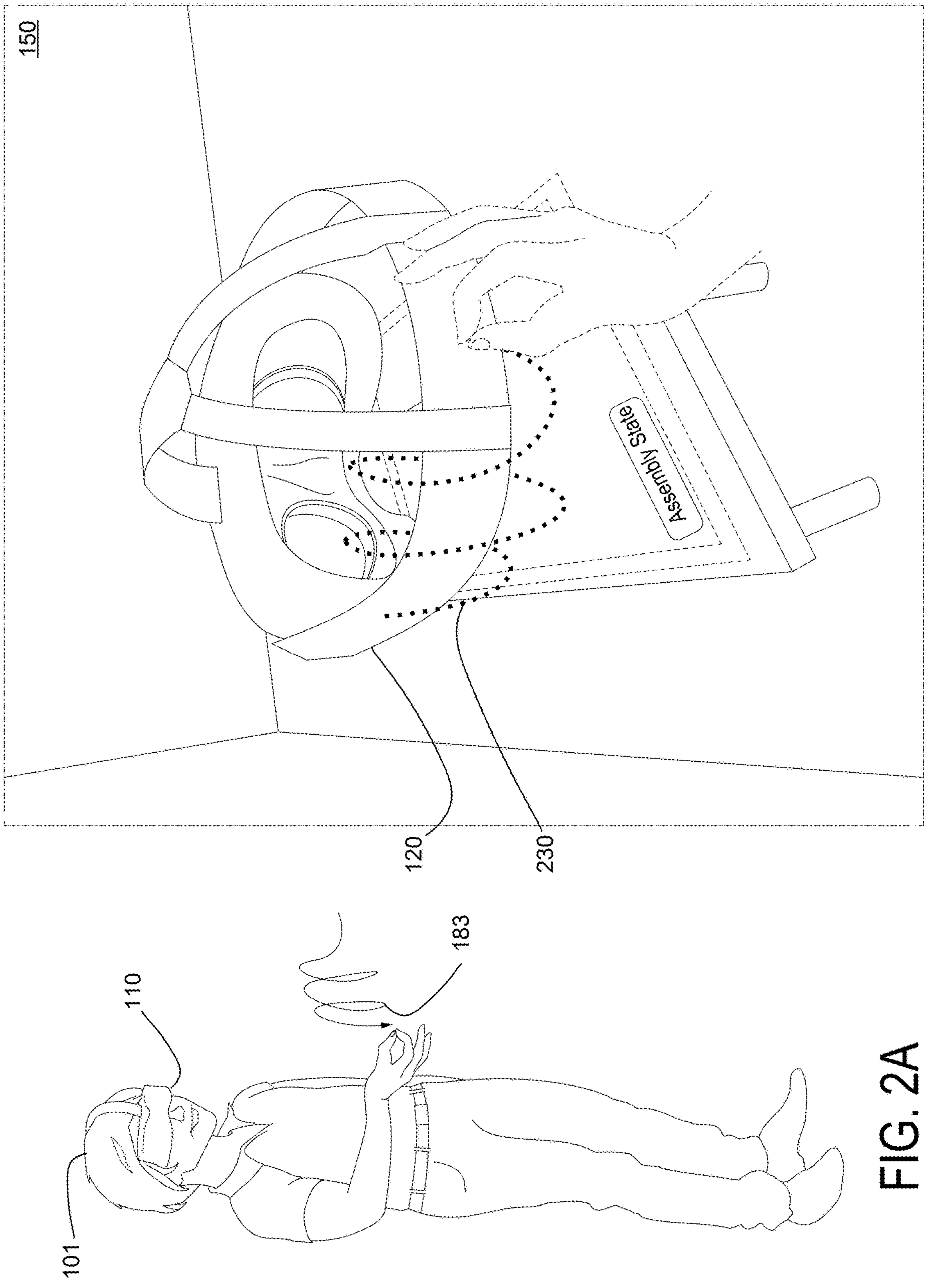
FIGS. 2A-2C illustrate one or more gestured performed while the head-wearable device operates in the annotation mode, in accordance with some embodiments.
Figure 2B:
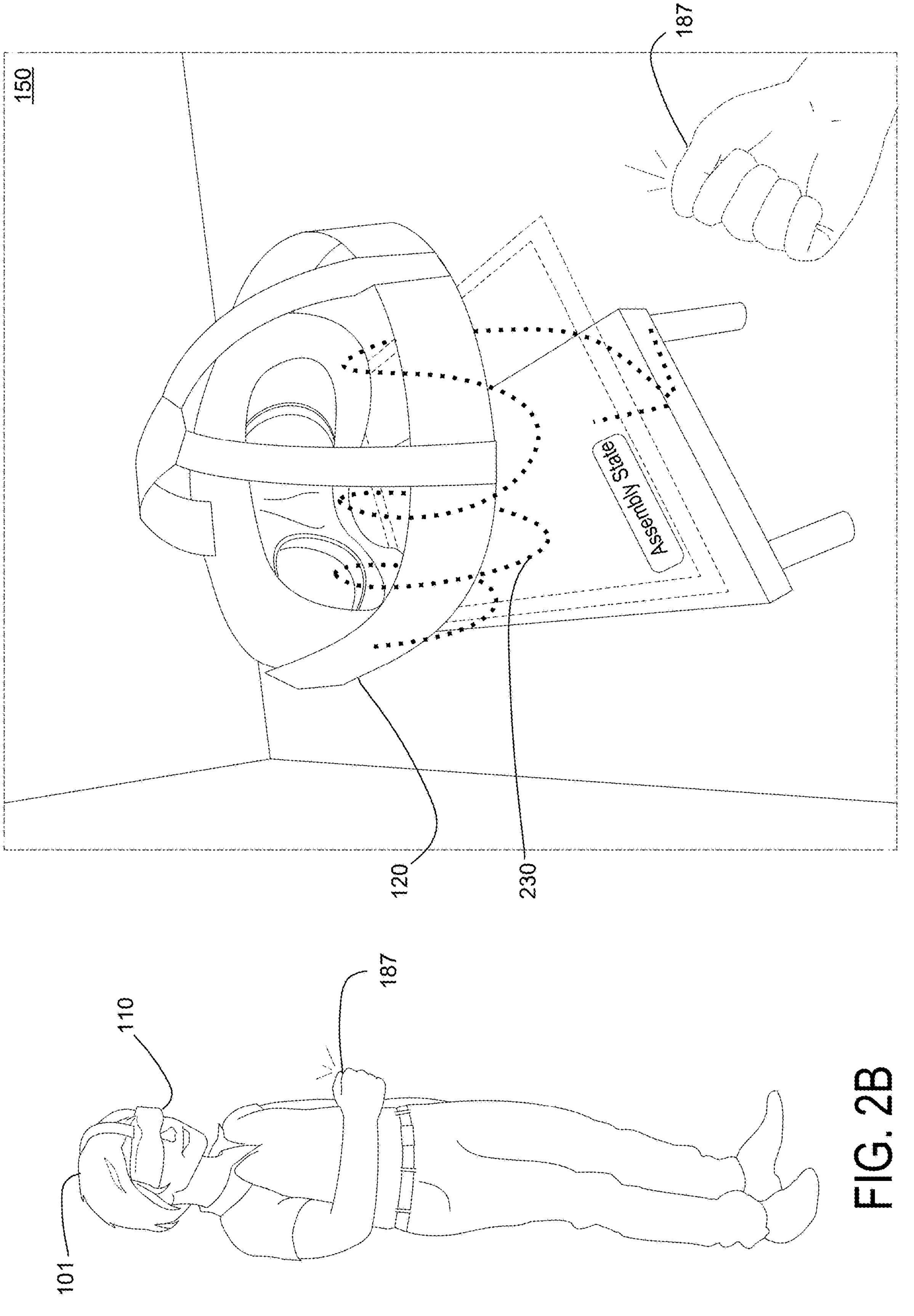
Figure 2C:
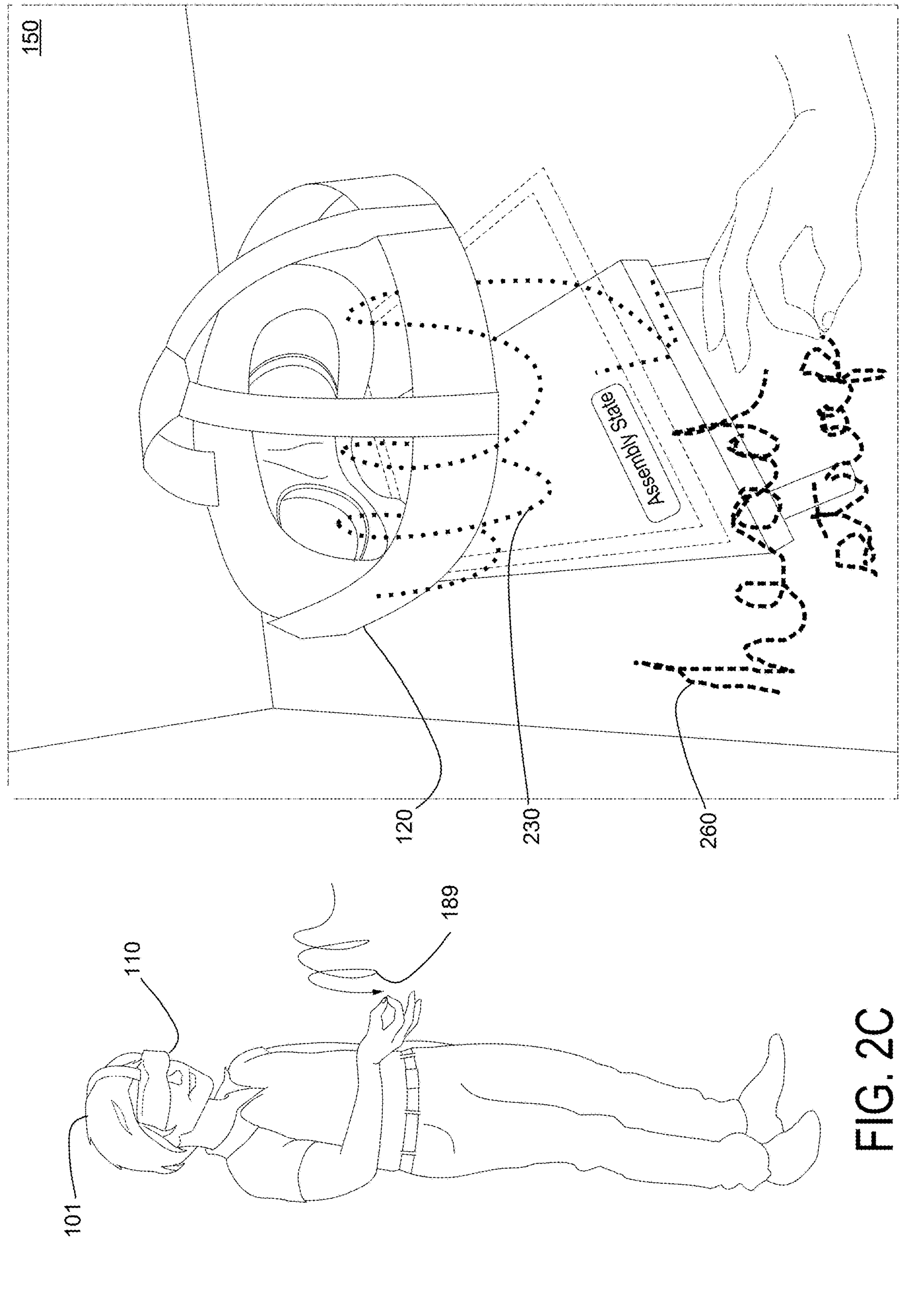

FIGS. 2A-2C illustrate one or more gestures performed while the head-wearable device 110 operates in the annotation mode, in accordance with some embodiments. In some embodiments, the user 101 performs the drawing mode gesture 181 and/or a voice command to activate the annotation mode. FIG. 2A illustrates the user 101 performing the drawing gesture 183 gesture (e.g., a pinch and drag gesture) to draw an XR annotation 230 around the one or more XR objects 120 and/or within the XR environment 150, accordance with some embodiments. The XR annotation 230 follows a location of the drawing gesture 183, as illustrated in FIG. 2A. In some embodiments, the XR annotation 230 is three-dimensional and can appear, to the user 101, in front of and/or behind the one or more XR objects 120 based on a position of the XR annotation 230 and/or a portion of the XR annotation 230 relative to the one or more XR objects 120. For example, the user 101 performs the drawing gesture 183 such that the XR annotation 230 circles around the one or more XR objects 120, as illustrated in FIG. 2A.

FIG. 2B illustrates the user 101 performing an annotation switch gesture 187 (e.g., a hand grip or hand squeeze) to change an annotation tool and/or an annotation color, in accordance with some embodiments. For example, a user's left hand can perform the annotation switch gesture 187 to change a color of a subsequently drawn XR annotation. In some embodiments, the user 101 performs a voice command (e.g., "violet"), alternatively to or in conjunction with the annotation switch gesture 187, to change the color of the subsequently drawn XR annotation. Alternatively, performance of the annotation switch gesture 187 at a user's right hand and/or another voice command (e.g., "thicker line") can cause a thickness of subsequently drawn XR annotation to be thicker or thinner (depending on which thickness the user 101 selected).

FIG. 2C illustrates the user 101 performing another drawing gesture 189 to add another XR annotation 260 to the XR environment 150, in accordance with some embodiments. In particular, the other XR annotation 260 is in a different color and/or a different thickness as the XR annotation 230. In some embodiments, the XR annotation 230 and/or the other XR annotation 260 are tethered to and/or independent from at least one of the one or more XR objects 120. For example, the XR annotation 230 may be tethered to the one or more XR objects 120 and the other XR annotation 260 is independent from the one or more XR objects 120 (e.g., based on a proximity of the respective XR annotation to the one or more XR objects 120, a user setting, and/or an annotation setting). Thus, when the one or more XR objects 120 are moved around in the XR environment 150, the XR annotation 230 moves with the one or more XR objects 120 and maintains its position and/or orientation relative one or more XR objects 120. Meanwhile, when the one or more XR objects 120 are moved around in the XR environment 150, the other XR annotation 260 maintains its position and/or orientation in the XR environment 150.

Figure 3A:
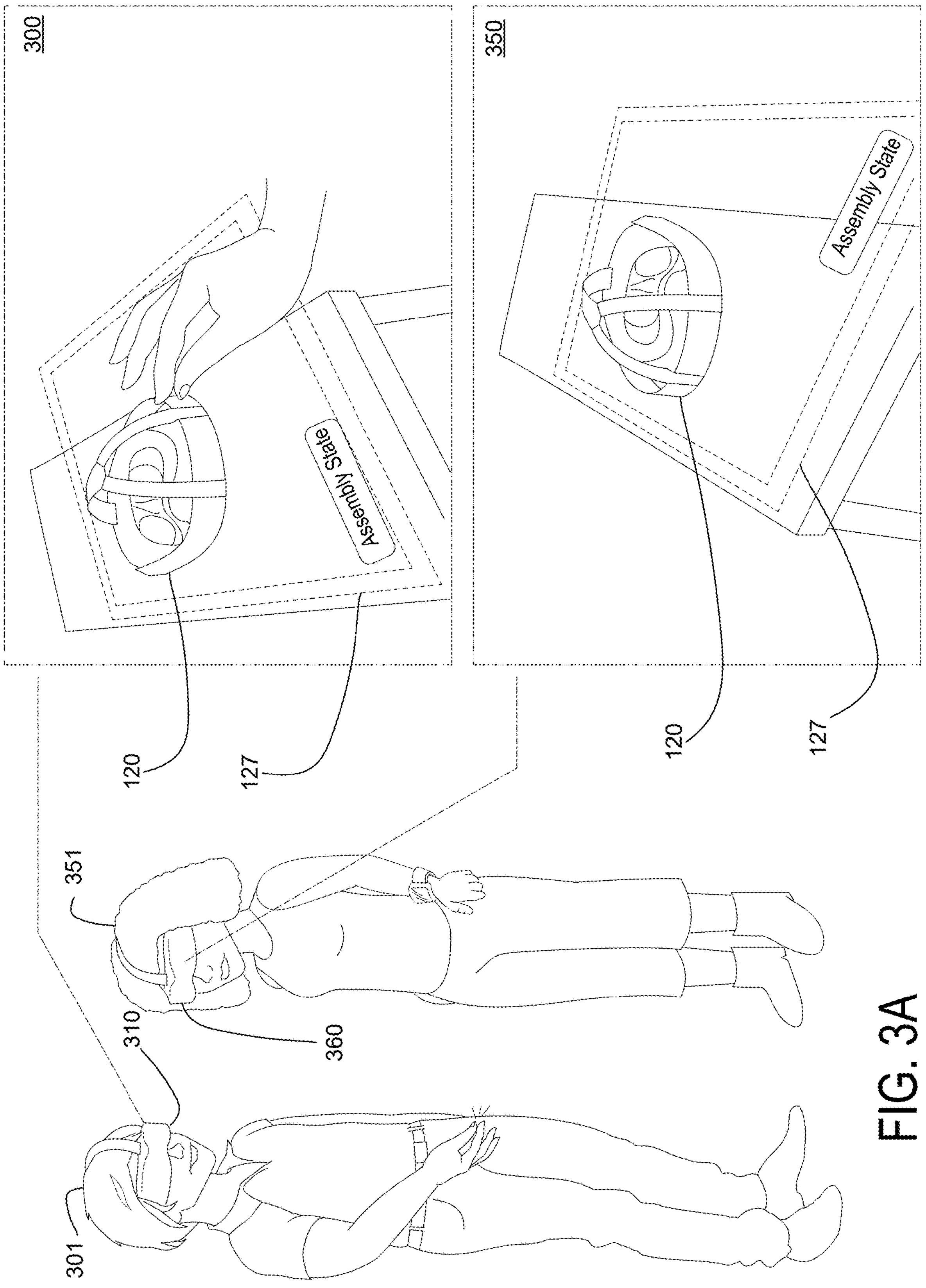
FIGS. 3A-3C illustrate coordination of an XR environment between two or more user, in accordance with some embodiments.
Figure 3B:
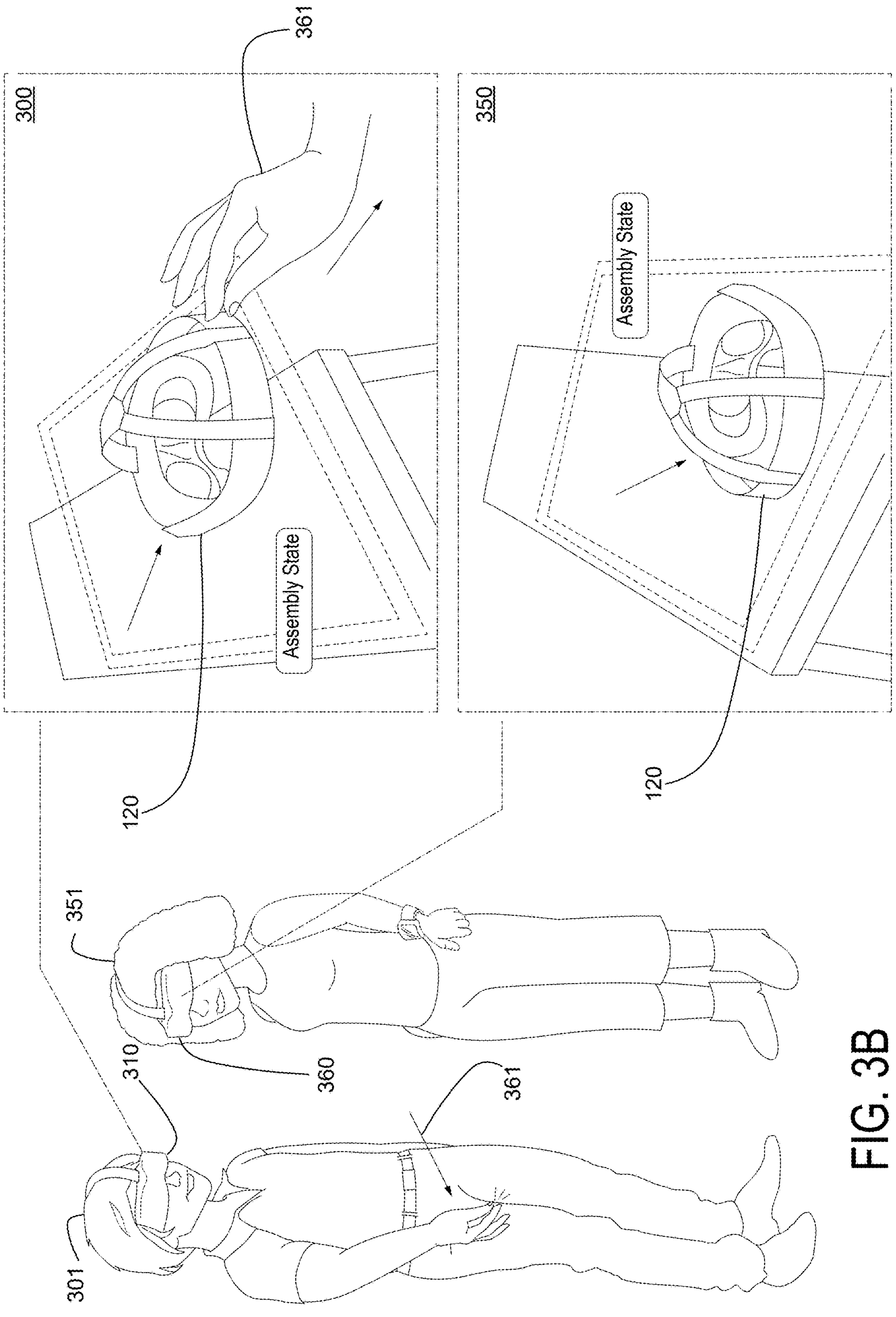
Figure 3C:
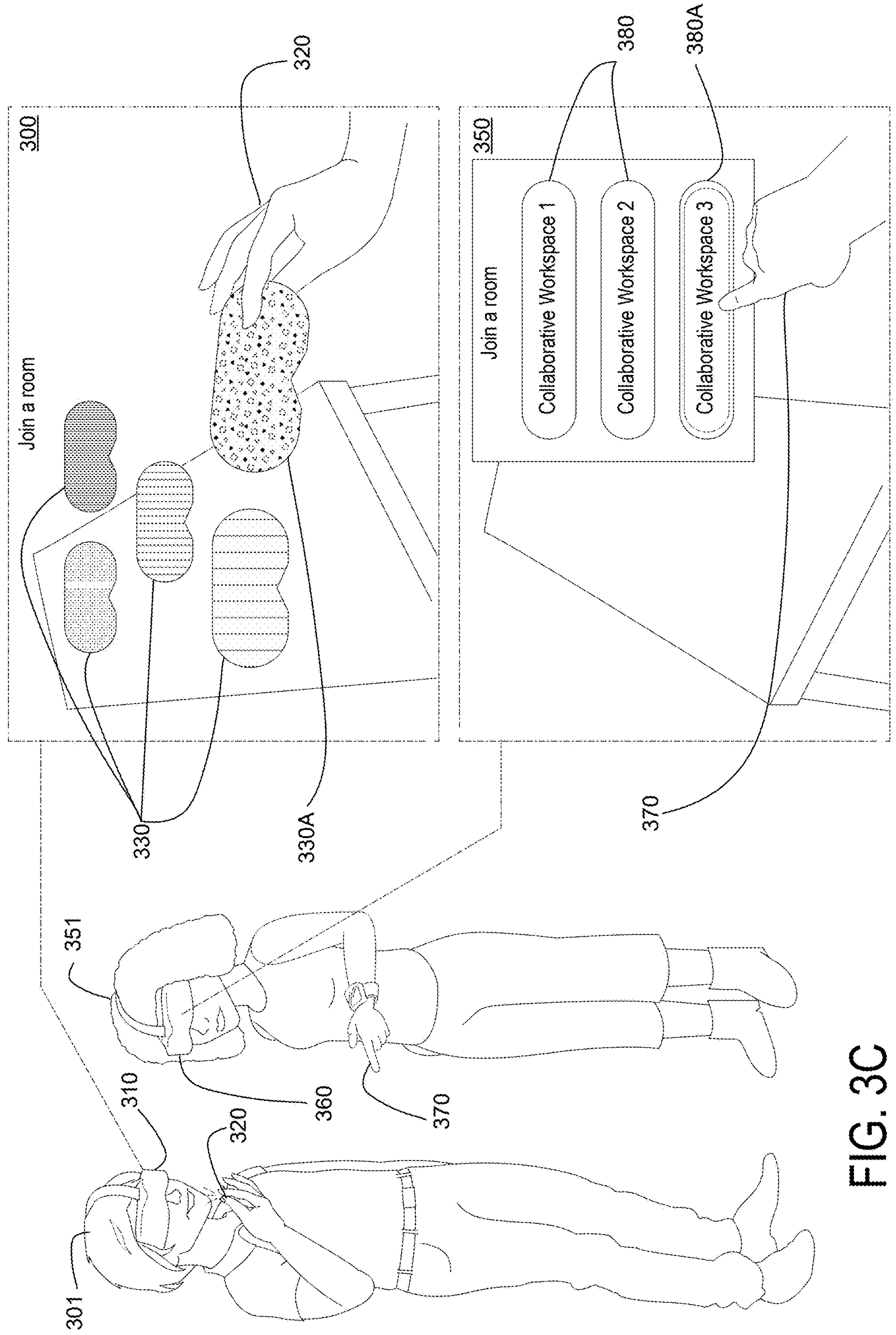

FIGS. 3A-3C illustrate coordination of a collaborative XR environment between two or more users (e.g., a first user 301 and a second user 351), in accordance with some embodiments. The two or more users can collaborate on the same project and work in the collaborative XR environment by coordinating positions of two head-wearable devices (e.g., the first head-wearable device 310 associated with the first user 301 and the second head-wearable device 360 associated with the second user 351). FIG. 3A illustrates the two head-wearable devices identifying and tagging a particular portion of a physical space, and the particular portion of the physical space is used to calibrate a position of the two head-wearable devices. In this way, the two or more users can work on the same one or more XR objects 120, and manipulations performed at each of the two head-wearable devices are accurately represented at other devices. Alternate coordination techniques are performed if the two or more users are not in the same physical space (e.g., the coordination of the one or more XR objects 120 and the manipulations are coordinated remotely). For example, FIG. 3A illustrates a first viewpoint 300 of the collaborative XR environment from the first user's perspective and a second viewpoint 350 of the collaborative XR environment from the second user's perspective. In some embodiments, the one or more XR objects 120 and/or any of XR elements (e.g., the XR augment 127, as illustrated in FIG. 2A) are displayed at a same position and/or a same orientation in both the first viewpoint 300 and the second viewpoint 350.

FIG. 3B illustrates the first user 301 performing an additional move gesture (e.g., an index-finger pinch-and-drag gesture) directed at the one or more XR objects 120 in the collaborative XR environment, in accordance with some embodiments. The first user 301 performs the additional move gesture 361 to move the one or more XR objects 120 in the collaborative environment. In response to the first user 301 performing the additional move gesture 361, the one or more XR objects 120 are moved in the collaborative XR environment, and the movement of the one or more XR objects 130 is presented at both the first viewpoint 300 and the second viewpoint 350, as illustrated in FIG. 3B.

FIG. 3C illustrates examples of invites or entrance in a particular collaborative XR environment, in accordance with some embodiments. As a first example, the first user 301 selects a first visor 330A (e.g., an XR representation of a visor and/or another XR object), associated with a first collaborative XR environment, and puts on the first visor 330A (e.g., bringing the first visor 330A up to the first head-wearable device 310) to cause the first user 301 to enter the first collaborative XR environment. In some embodiments, the first user 301 selects and puts on the first visor 330A by performing a visor move gesture 320 (e.g., the user 101 performs an index finger pinch gesture and a drag gesture on the first visor 330A, as illustrated in FIG. 2C). In some embodiments, the first user 301 selects the first visor 330A from a plurality of visors 330, each of the plurality of visors 330 associated with a respective XR environment (e.g., one or more collaborative XR environments and/or one or more single-user XR environments). As a second example, the second user 351 can select a first collaborative XR environment option 380A of a plurality of collaborative XR environment options 380 (e.g., the plurality of collaborative XR environment options 380 is displayed in a selection menu, as illustrated in FIG. 3C) to enter the first collaborative XR environment. The two examples allow the two or more users to include others quickly and efficiently into the first collaborative XR environment. Similarly, if the first user 301 and/or the second user 351 does not want to see annotations or manipulations generated by other users, the first user 301 and/or the second user 351 can remove the first visor 330A and/or unselect the first collaborative XR environment option 380A (e.g., via the selection menu) to exit the first collaborative XR environment (e.g., to work alone and/or in another collaborative XR environment). In some embodiments, the first user 301 and/or the second user 351 can invite the other users to the first collaborative XR environment by selecting another option from the selection menu.

Figure 4A:
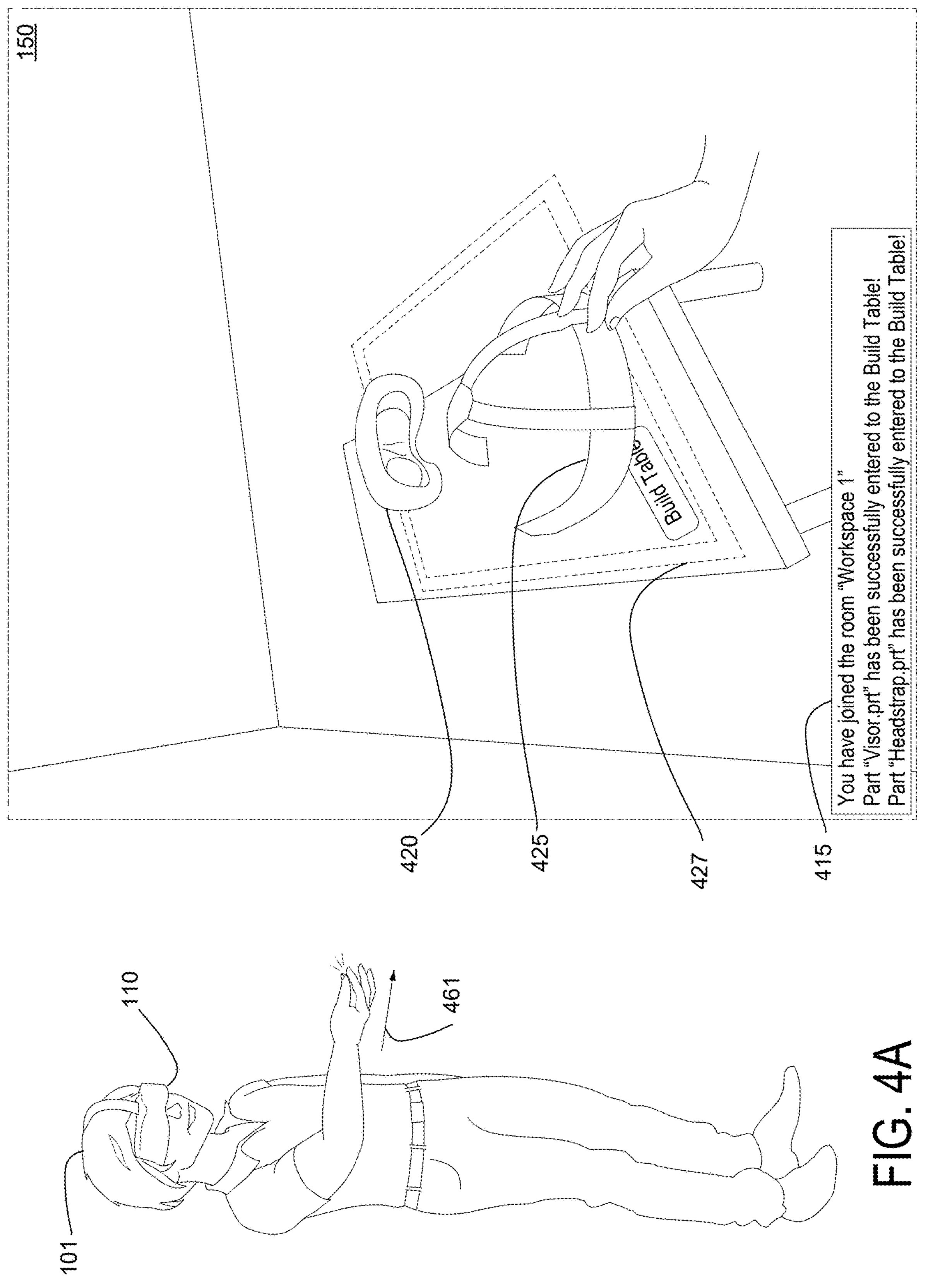
FIGS. 4A-4D illustrate a build mode of the head-wearable device, in accordance with some embodiments.

FIGS. 4A-4D illustrate a build mode of the head-wearable device 110, in accordance with some embodiments. In particular, FIGS. 4A-4D illustrate placement and removal of a first XR object 420 and a second XR object 435 within a build XR augment 427. In FIG. 4A, the first XR object 420 (e.g., an XR representation of a visor for the head-wearable device 110) is within the build XR augment 427 the user 101 places the second XR object 425 (e.g., an XR representation of a head strap of the head-wearable device 110) in the build XR augment 427. In some embodiments, the user 101 performs a first move gesture 461 to place the second XR object 425 in the build XR augment 427. When the user 101 places the second XR object 425 in the build XR augment 427, the second XR object 425 automatically moves towards the first XR object 420 and couples with the first XR object 420 (e.g., the second XR object 425 snaps to the first XR object 420 in a way that is mechanically accurate). The first XR object 120 and the second XR object 425 couple together in a manner that is that is mechanically accurate. In some embodiments, the head-wearable device 110 presents a worklog 415 describing any actions occurring in the XR environment 150 and/or any actions performed by the user 101. In some embodiments, the user 101 places an additional XR object within the build XR augment 427, and, in response, the additional XR object couples with the first XR object 420 and/or the second XR object 425.

Figure 4B:
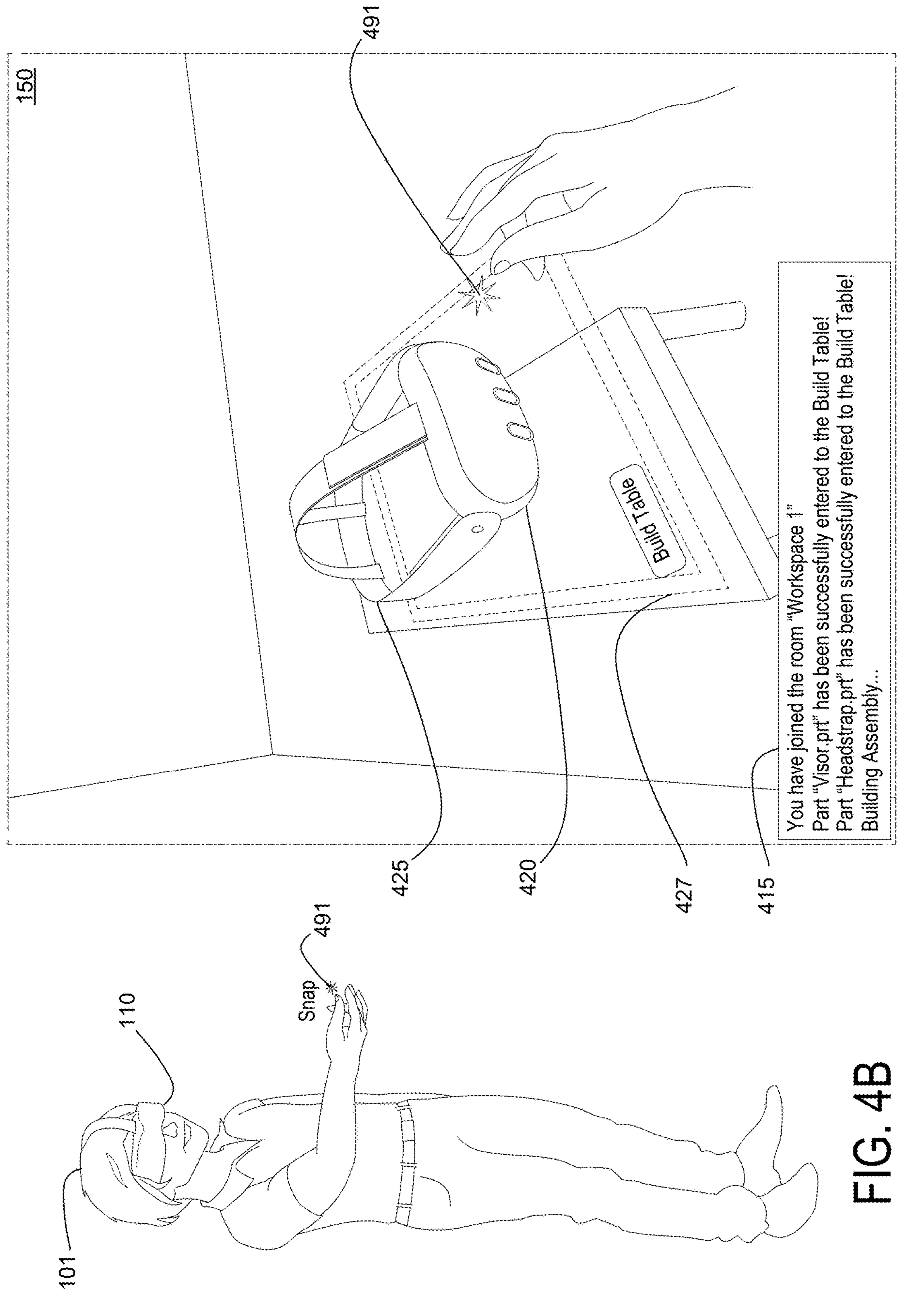

In some embodiments, rather than the second XR object 425 automatically coupling with the first XR object 420 upon being placed in the build XR augment 427, the second XR object 425 couples with the first XR object 420 in response to the user 101 performing a build command 491. FIG. 4B illustrates the user 101 performing the build command 491 (e.g., the user 101 snapping their fingers) to cause the second XR object 425 to couple with the first XR object 420 while the second XR object 425 and the first XR object 420 are both within the build XR augment 427.

Figure 4C:
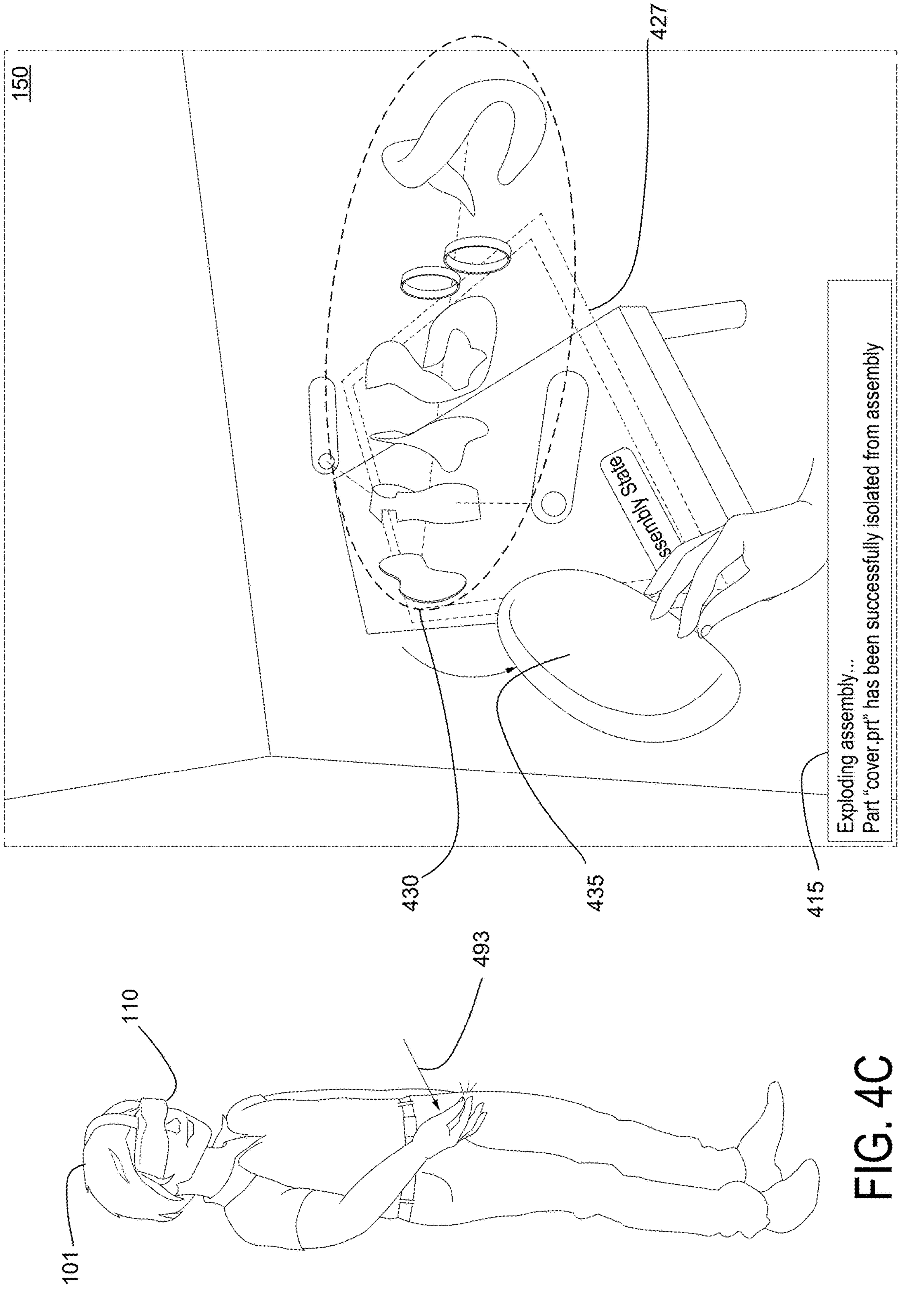
Figure 4D:
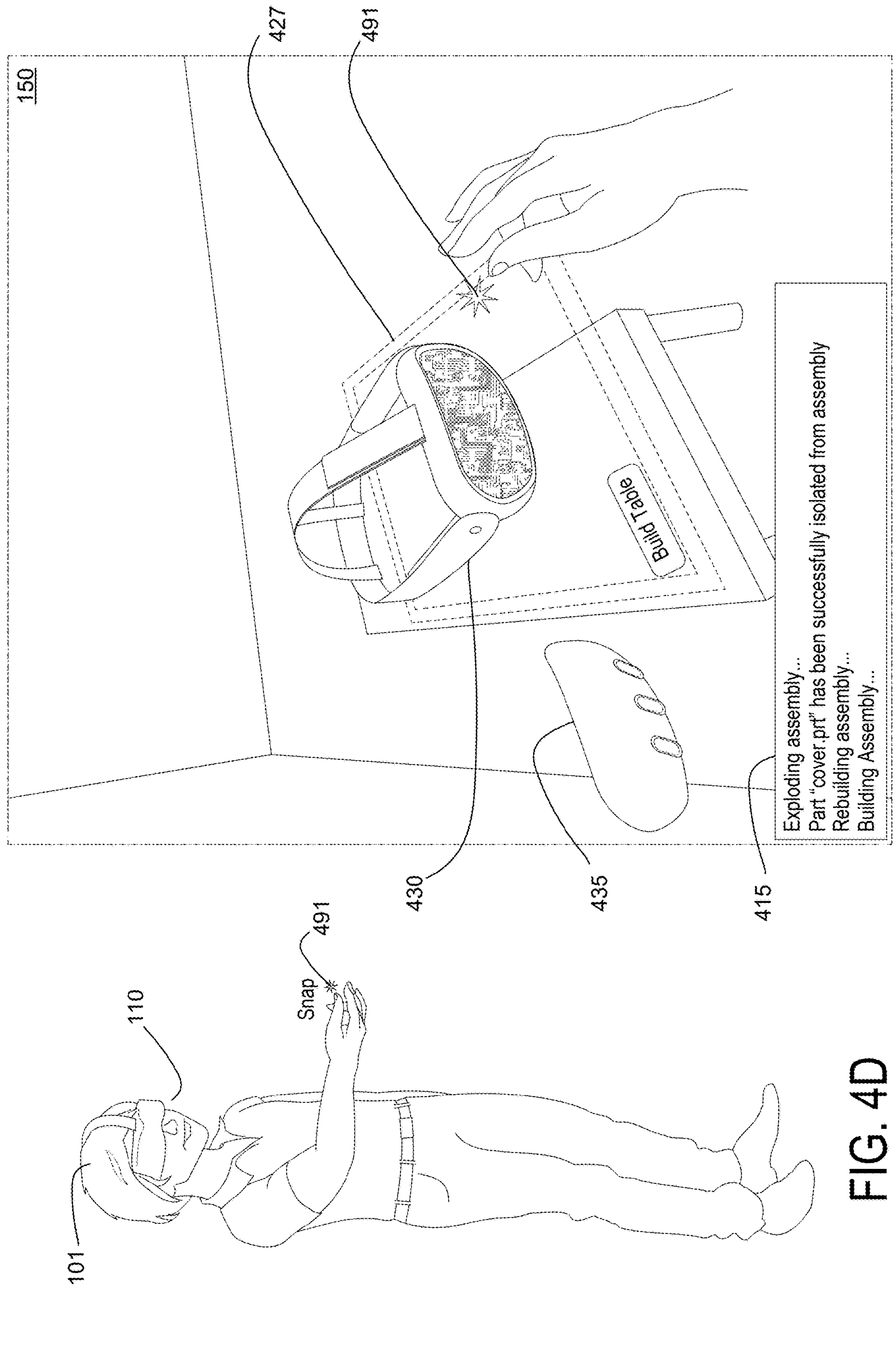

FIG. 4C illustrates removal of a third XR object 435 from the build XR augment 427, in accordance with some embodiments. The user 101 removes the third XR object 435 (e.g., an XR representation of a cover for the head-wearable device 110) from the build XR augment 427 the user 101 leaves a plurality of XR objects 430 (e.g., an exploded-view XR representation of other components of the head-wearable device 110) in the build XR augment 427. In some embodiments, the user 101 performs a second move gesture 493 to remove the third XR object 435 from the build XR augment 427. In some embodiments, the user 101 removes an additional XR object from the build XR augment 427. FIG. 4D illustrates the user 101 performing the build command 491 to cause the plurality of XR objects 430 remaining in the build XR augment 427 to couple with one another. The third XR object 435 does not couple with the plurality of XR objects 430 since it is not within the build XR augment 427. Thus, the user 101 can use the build mode to isolate and work on particular parts of an assembly comprising multiple XR objects as needed.

Figure 5A:
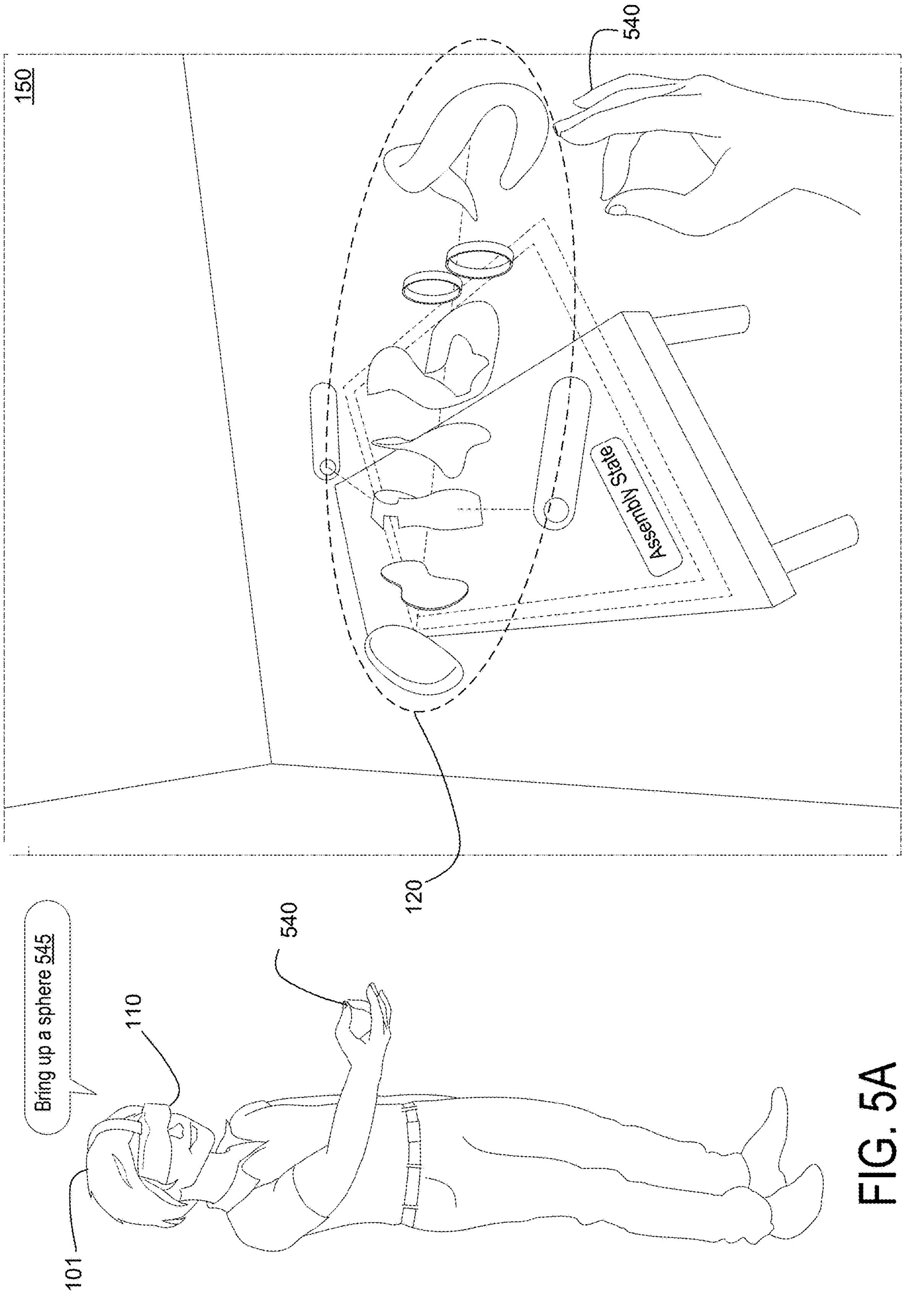
FIGS. 5A-5D illustrate additional interactions with one or more XR objects using voice commands, in accordance with some embodiments.

FIGS. 5A-5D illustrate additional interactions with the one or more XR objects 120 using hand gestures and/or voice commands, in accordance with some embodiments. FIG. 5A shows a first voice command 545 (e.g., "bring up a sphere", as shown in FIG. 5A) performed by the user 101, in accordance with some embodiments. In some embodiments, the first voice command 545 is detected by the head-wearable device 110 and/or a communicatively coupled device. In some embodiments, the head-wearable device 110 and/or the communicatively coupled device detects the first voice command 110 while the user 101 performs a listen gesture 540 (e.g., a pinching a thumb and a middle finger of the user) (e.g., the head-wearable device 110 detects voice commands performed while the listen gesture 540 is being performed). Specifically, the user performs and maintains the listening gesture 540 (e.g., a pinch gesture), provides the first voice command 545, and, in accordance with a determination that the user 101 ceases to perform the listening gesture 540 (e.g., the user 101 stops pinching their thumb and middle finger), the head-wearable device 110 executes the instructions associated with the first voice command 545. The first voice command 545 and/or the listen gesture 540 are associated with instructions for causing performance of a command and/or an operation. For example, the first voice command 545 is associated with instructions that cause the head-wearable device 110 to display a grouping XR augment 560 (e.g., a sphere) in the XR environment 150.

Figure 5B:
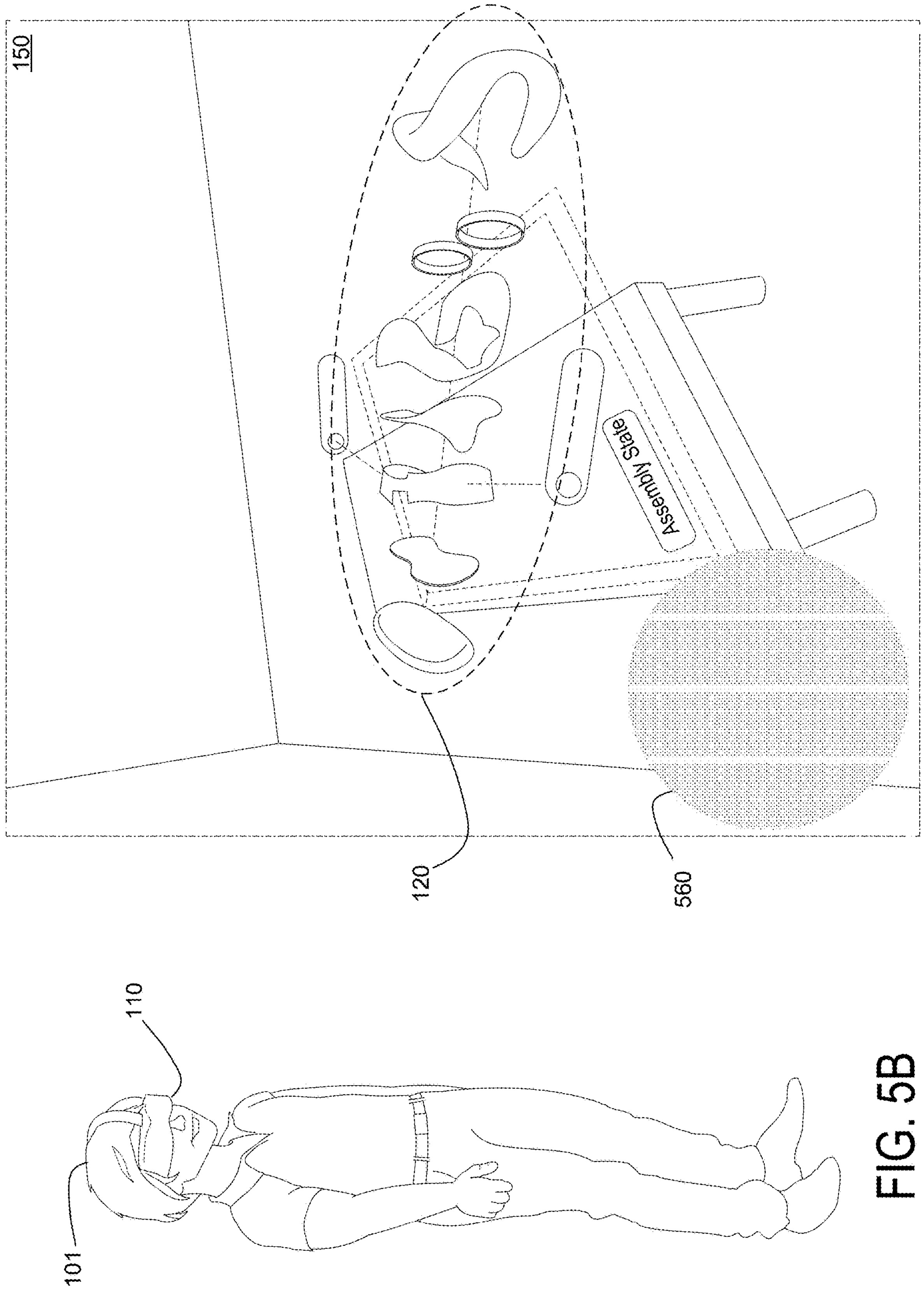

FIG. 5B shows the grouping XR augment 560 presented by the head-wearable device 110 in response to the first voice command 545, in accordance with some embodiments. In some embodiments, the grouping XR augment 560 defines an area in the XR environment 150 for placing at least one of the one or more XR objects 120. In some embodiments, the grouping XR augment 560 is at least partially transparent and/or opaque. While the examples provided in FIGS. 5A and 5B describe the grouping XR augment 560 being presented as a sphere, the user 101 can cause a grouping XR augment of any other geometric shape (e.g., a cube, a tetrahedron, etc.) to be generated. The user 101 can perform one or more gestures and/or voice commands to modify and/or manipulate the grouping XR augment 560. For example, the user 101 can change a size, shape, position, color, opacity, etc. of the grouping XR augment 560 by performing additional hand gestures and/or additional voice commands.

Figure 5C:
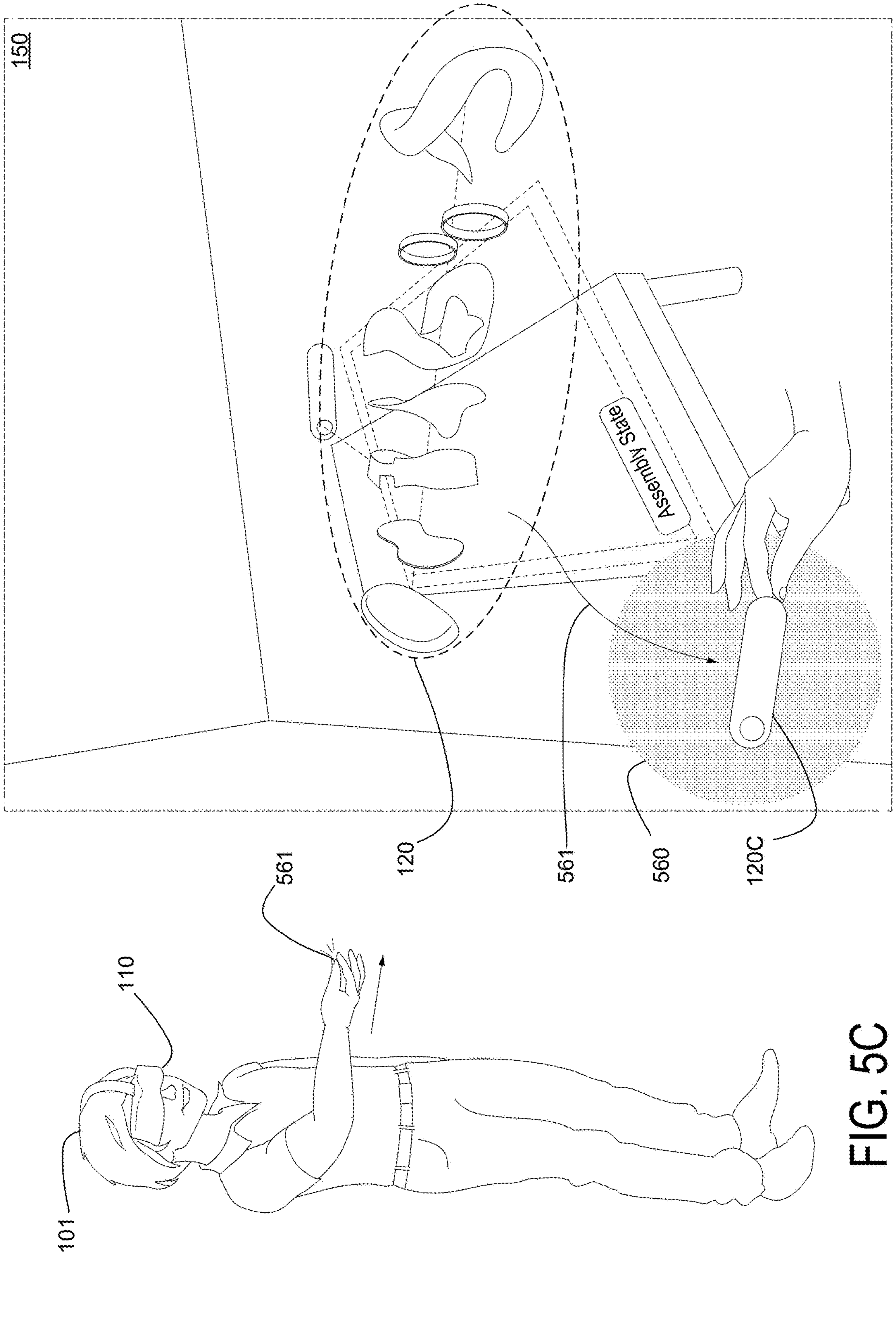

FIG. 5C illustrates the user 101 moving a second XR object 120C of the one or more XR objects 120 into the grouping XR augment 560, in accordance with some embodiments. The user 101 places the second XR object 120C into the grouping XR augment 560 by performing another move gesture 561 (e.g., an index finger pinch gesture and a drag gesture, as described in reference to FIGS. 1B and 1F). When the second XR object 120C is placed within the grouping XR augment 560, the second XR object 120C becomes associated with the grouping XR augment 560. When removed from inside the grouping XR augment 560, the second XR object 120C is disassociated from the grouping XR augment 560. In some embodiments, in response to a separate voice command and/or a separate hand gesture (e.g., another index finger pinch gesture and another drag gesture), the second XR object 120C is disassociated from the grouping XR augment 560. In some embodiments, the user 101 places and/or removes a plurality of the one or more XR objects 120 into the grouping XR augment 560.

Figure 5D:
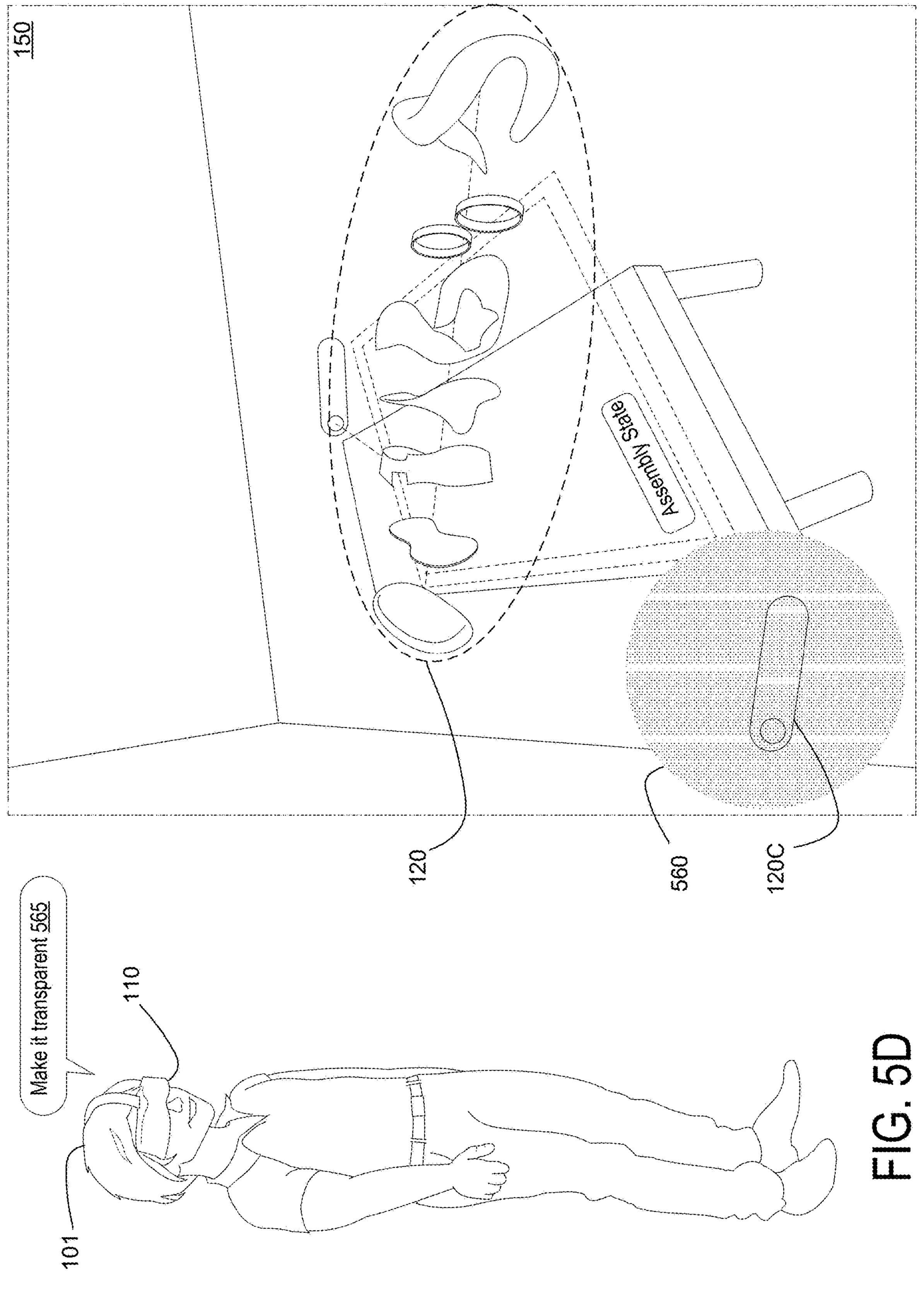

FIG. 5D illustrates the user 101 changing at least one quality of the second XR object 120C associated with the grouping XR augment 560, in accordance with some embodiments. In some embodiments, the at least one quality of the second XR object 120C (e.g., transparency, as illustrated in FIG. 5D) is modified by a second voice command 565 (e.g., "make those parts transparent") while the user 101 performs the listen gesture 540. In some embodiments, the at least one quality of the second XR object 120C includes color, transparency, opacity, scale, etc. In some embodiments the user 101 performs a second voice command (e.g., "delete those parts") to delete the second XR objects 120C associated with the grouping XR augment 560. In some embodiments, XR objects of the one or more XR objects that are not within the grouping XR augment 560 are not affected when the user 101 performs the second voice command 565. In some embodiments, if the plurality of the one or more XR objects 120 are within the grouping XR augment 560 when the user 101 performs the second voice command 565, the at least one quality of each of the plurality of the one or more XR objects 120 is modified.

Figure 6A:
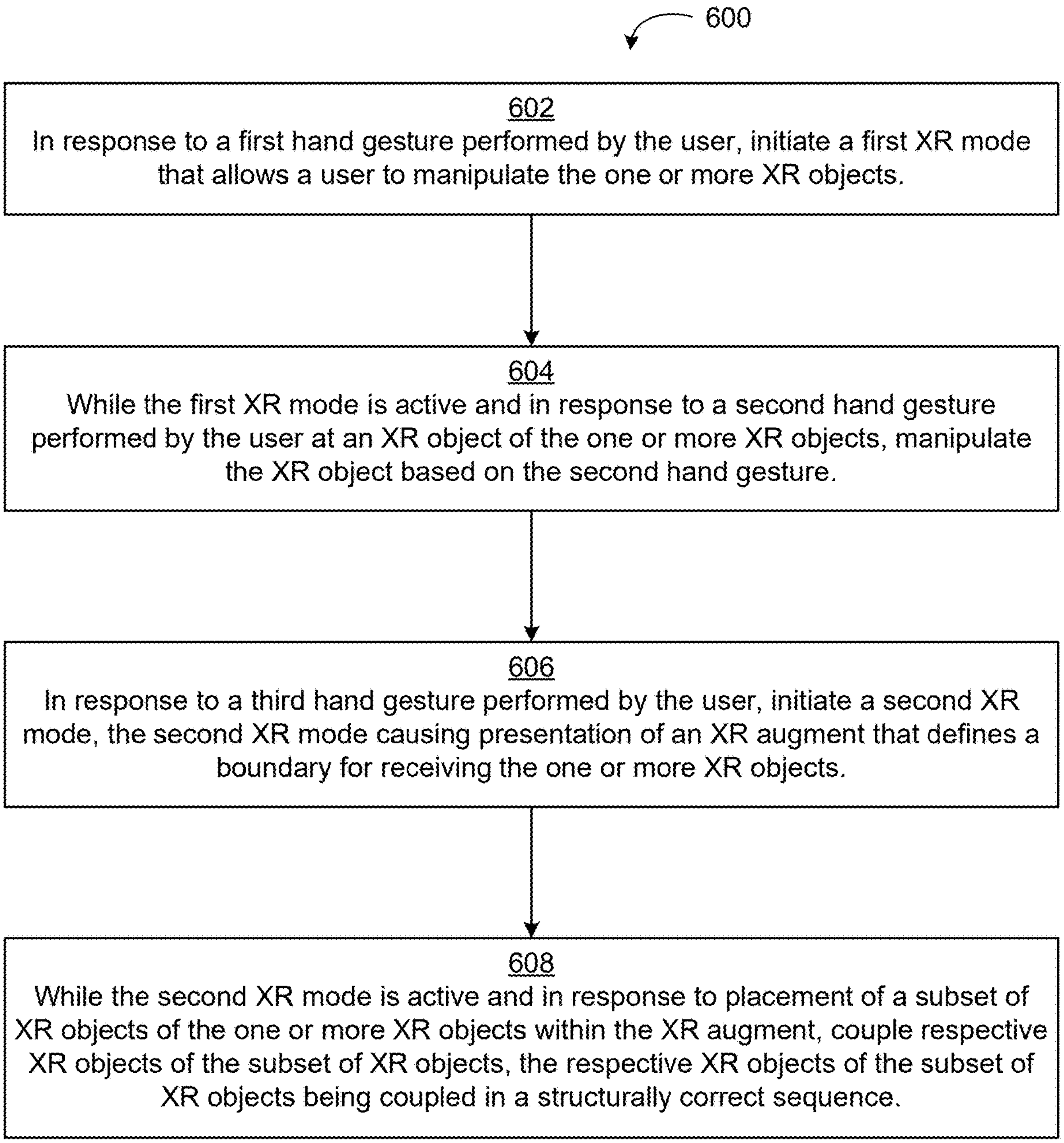
FIGS. 6A and 6B illustrate flow diagrams of methods of interacting with one or more XR objects representative of assemblies or parts of components within a computer aided design, in accordance with some embodiments.
Figure 6B:
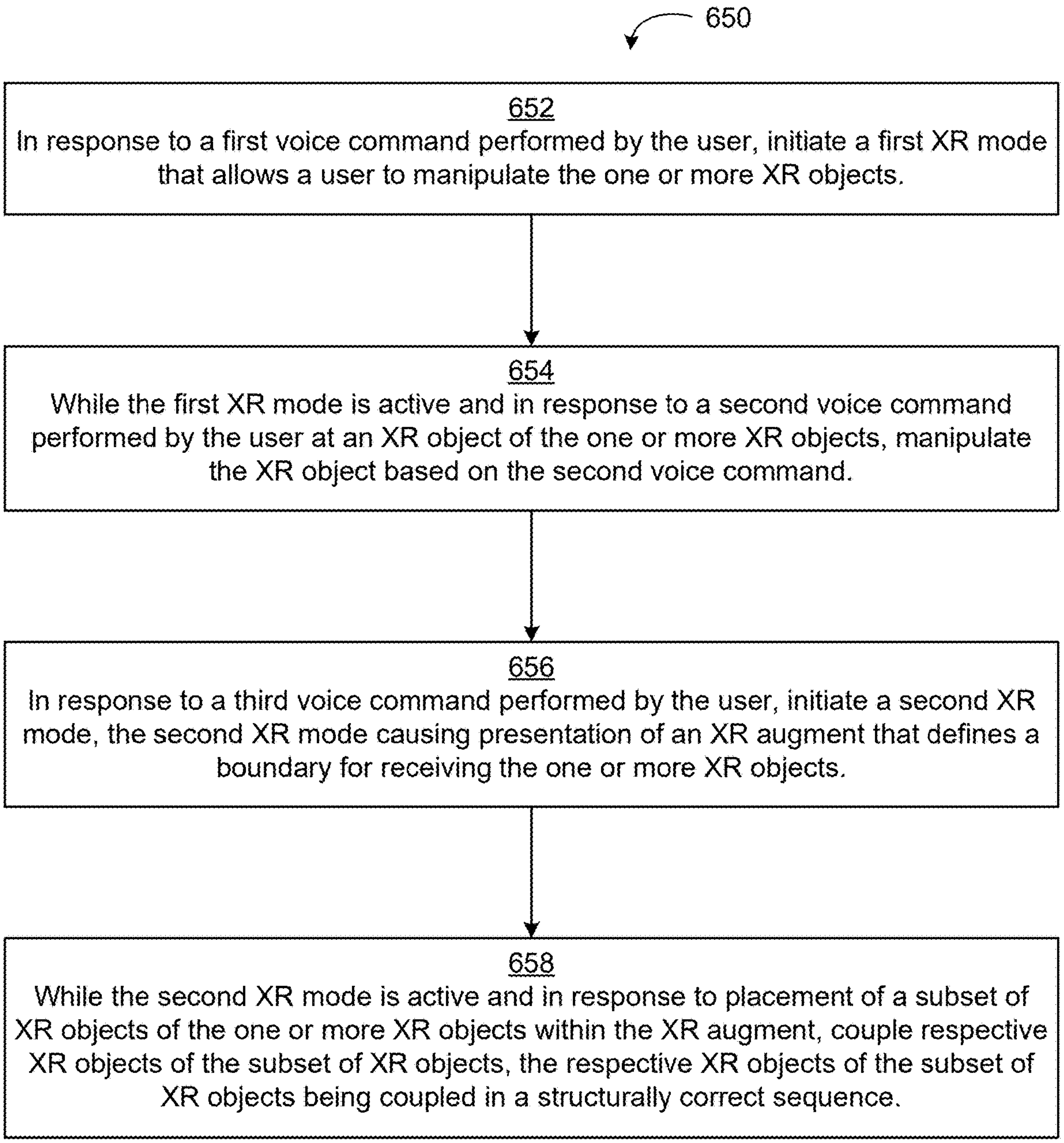
Figure 9A:
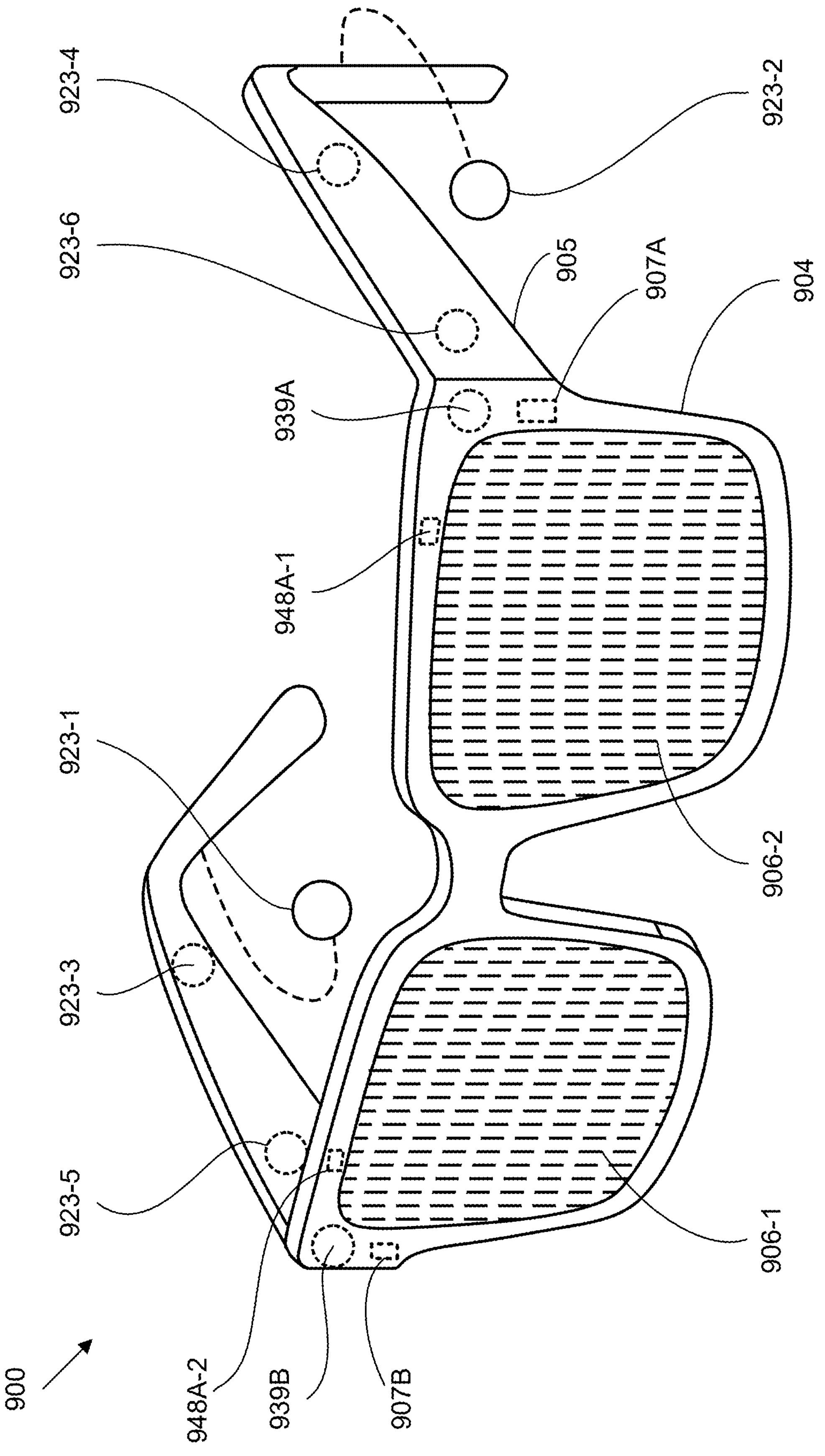
FIGS. 9A-9C illustrate example head-wearable devices, in accordance with some embodiments.
Figures 1, 9B:
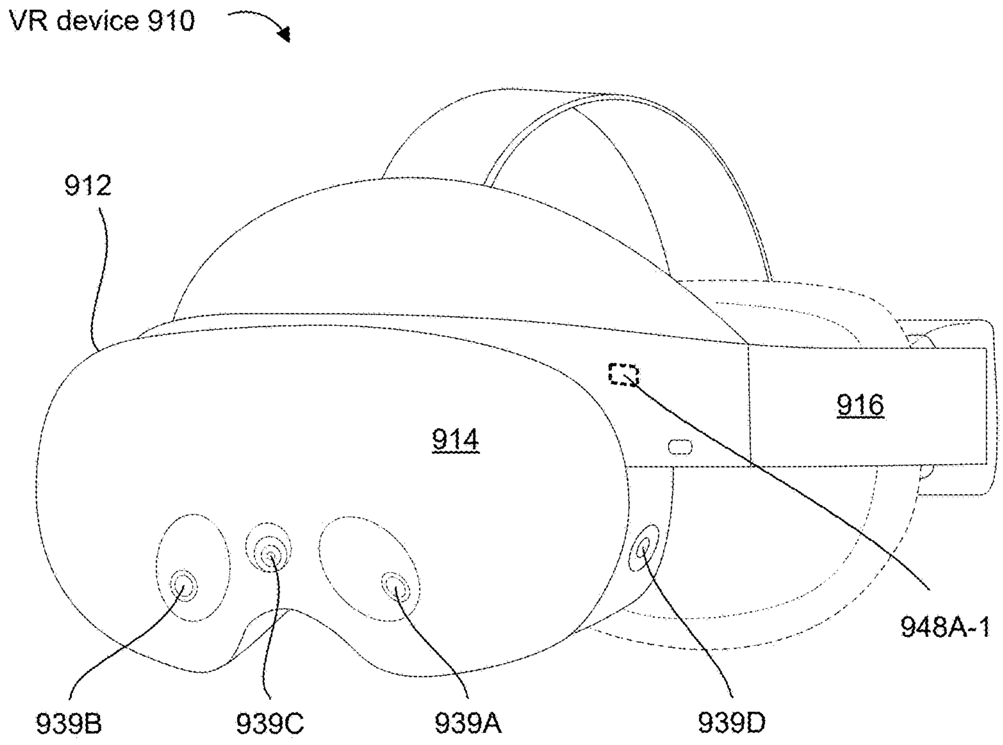
Figures 2, 9B:
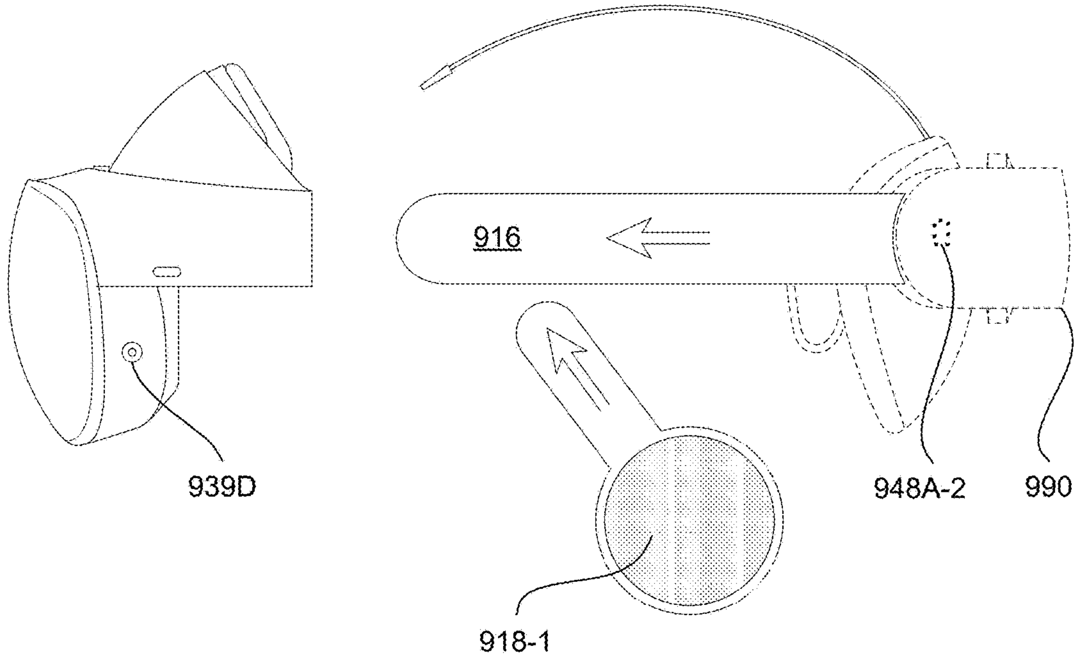
Figure 9C:
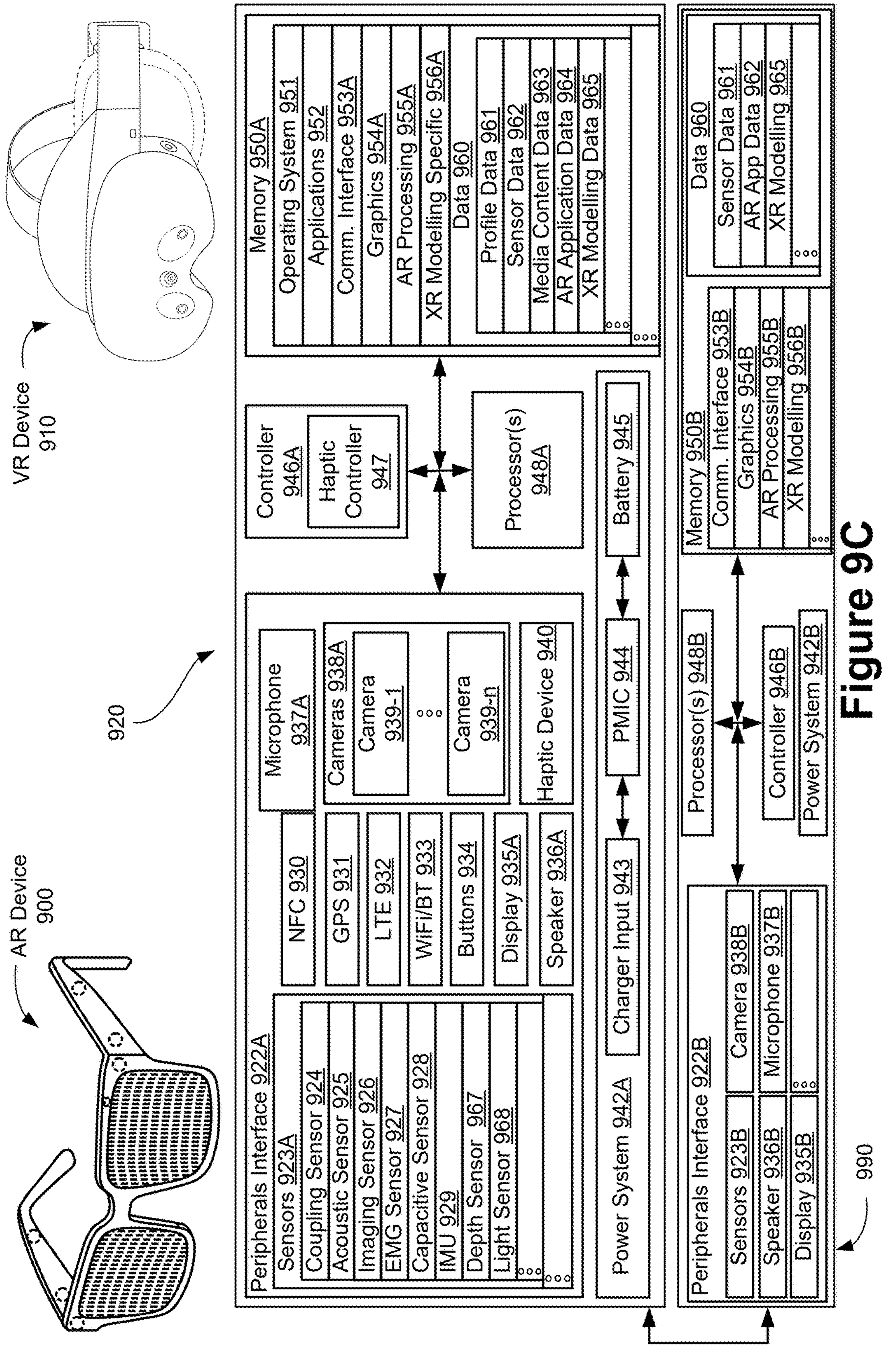

FIGS. 6A and 6B illustrates a flow diagram of methods of interacting with one or more XR objects representative of assemblies or parts of components, in accordance with some embodiments. In some embodiments, the methods are used with one or more applications presented to a user such as a computer aided design application, design application, a text application, editing applications and/or any other applications (that are presented at a head-wearable device). Operations (e.g., steps) of the methods 600 and 650 can be performed by one or more processors (e.g., central processing unit and/or MCU) of a system a head-wearable device or a head-wearable device communicatively coupled with at least one other device described below in reference to FIGS. 7A-7C-2. At least some of the operations shown in FIG. 6 correspond to instructions stored in a computer memory or computer-readable storage medium (e.g., storage, RAM, and/or memory, such as memory 950; FIG. 9C). Operations of the methods 600 and 650 can be performed by a single device alone or in conjunction with one or more processors and/or hardware components of another communicatively coupled device and/or instructions stored in memory or computer-readable medium of the other device communicatively coupled to the system. In some embodiments, the various operations of the methods described herein are interchangeable and/or optional, and respective operations of the methods are performed by any of the aforementioned devices, systems, or combination of devices and/or systems.

For convenience, the method operations will be described below as being performed by particular component or device (e.g., a head-wearable device), but should not be construed as limiting the performance of the operation to the particular device in all embodiments.

(A1) In accordance with some embodiments, FIG. 6A shows a flow chart of a method 600 of interacting with one or more XR objects representative of assemblies or parts within a computer aided design, in accordance with some embodiments. The method 600 occurs at a head-wearable device (e.g., an extended-reality headset) while the head-wearable device presents, via one or more communicatively coupled displays, one or more XR objects within a portion of a field of view of a user wearing the head-wearable device. The method 600 includes, in response to a first hand gesture performed by the user, initiating (602) a first XR mode that allows a user to manipulate the one or more XR objects. The method 600 includes, while the first XR mode is active and in response to a second hand gesture performed by the user at an XR object of the one or more XR objects, manipulating (604) the XR object based on the second hand gesture. The method 600 also includes, in response to a third hand gesture performed by the user, initiating (606) a second XR mode, the second XR mode causing presentation of an XR augment that defines a boundary for receiving the one or more XR objects. Further, the method 600 includes, while the second XR mode is active and in response to placement of a subset of XR objects of the one or more XR objects within the XR augment, coupling (608) respective XR objects of the subset of XR objects. The respective XR objects of the subset of XR objects are coupled in a structurally correct sequence. Examples of the first and second modes are provided above in reference to FIGS. 1A-1J and 4A-4D.

(A2) In some embodiments of A2, the method 600 further includes, in response to a fourth hand gesture performed by the user, initiating a third XR mode, the third XR mode allowing the user to perform one or more gestures for measuring the one or more XR objects. While the third XR mode is active and in response to a fifth hand gesture performed by the user, measuring a distance between at least two points of the fifth hand gesture, the distance is to scale with the actual dimension of a respective XR object. Example measurements are shown and described above in reference to FIGS. 1I and 1J.

(A3) In some embodiments of A1-A2, the method 600 further includes in response to a sixth hand gesture performed by the user, initiating a fourth XR mode, the fourth XR mode allowing the user to annotate the one or more XR objects. While the fourth XR mode is active and in response to a seventh hand gesture performed by the user, annotating a portion of field of view of the user with an annotation XR augment. Example annotations are shown and described above in reference to FIGS. 2A-2C.

(A4) In some embodiments of A1-A3, the method 600 further includes in response to an eight hand gesture performed by the user, initiating a fifth XR mode, the fifth XR mode allowing the user to don and/or doff the one or more XR objects. While the fifth XR mode is active and in response to a ninth hand gesture performed by the user, donning and/or doffing the one or more XR objects on a portion of a body of the user. Example donning of an XR object is described above in reference to FIG. 3B.

(A5) In some embodiments of A1-A4, the manipulations performed based on the second hand gesture include one or more of moving the one or more XR objects, enlarging the one or more XR objects, minimizing the one or more XR objects, presenting an exploded view of the one or more XR objects, and presenting a cross section of the one or more XR objects. Example manipulations are shown and described above in reference to FIGS. 1A-1J and 4A-4D.

(A6) In some embodiments of A1-A5, the method 600 further includes in response to a tenth hand gesture performed by the user, remove manipulations to the one or more XR objects.

(A7) In some embodiments of A1-A6, the first mode is an assembly mode that allows the user to interact with a plurality of XR objects or individual XR object (including exploded views), the second mode is a build mode that animates the coupling of the one or more XR objects in a structurally accurate sequence, the third mode is a measurement mode that allows the user to measure respective XR objects at scale, the fourth mode is an annotation mode that allows a user to draw and/or provide messages in an XR environment, and the fifth mode is a don/doff mode that allows a user to wear the one or more XR objects. Non-limiting examples of one or more modes are shown in reference to FIG. 5.

(A8) In some embodiments of A1-A7, the one or more XR objects are accurate representations of one or more objects in a computer aided design document or file (e.g., opened or running on an application of the head-wearable device).

(A9) In some embodiments of A1-A8, interactions with the XR representation of the object and the one or more XR objects are caused to be visible to other users accessing a same XR environment as the user.

(A10) In some embodiments of A1-A9, the method 600 further includes, in response to an eleventh hand gesture performed by the user, initiating a sixth XR mode, the sixth XR mode allowing the user to modify at least one quality of at least one of the one or more XR objects (e.g., color, transparency, opacity, scale, etc.). While the sixth XR mode is active and in response to a twelfth hand gesture performed by the user, modifying at least one quality of at least one of the one or more XR objects. Example modifying the at least one quality of at least one of the one or more XR objects is described above in reference to FIGS. 5C-5D.

(A11) In some embodiments, of A1-A10, the method 600 further includes, in response to a thirteenth hand gesture performed by the user, initiating a seventh XR mode, the seventh XR mode allowing the user to group at least one of the one or more XR objects with a grouping XR augment. While the seventh XR mode is active and in response to a fourteenth hand gesture performed by the user, group at least one of the one or more XR objects with a grouping XR augment. Example grouping the at least one of the one or more XR objects with a grouping XR augment is described above in reference to FIGS. 5A-5B.

(A12) In some embodiments of A1-A11, each of the first hand gesture, second hand gesture, third hand gesture, fourth hand gesture, fifth hand gesture, sixth hand gesture, seventh hand gesture, eighth hand gesture, ninth hand gesture, tenth hand gesture, eleventh hand gesture, twelfth hand gesture, thirteenth hand gesture, and fourteenth hand gesture are each associated with a respective voice command. Each respective voice command is performed by the user alternatively or in conjunction with its respective hand gesture.

(B1) In accordance with some embodiments, another method occurs at a head-wearable device (e.g., an extended-reality headset). The other method includes, while presenting, using a lens system of the extended-reality headset, an extended reality (XR) representation of an object within a portion of a field of view of a user wearing the extended-reality headset, in response to a first hand gesture performed by the user directed to the XR representation, initiating a first XR mode that allows the user to manipulate a plurality of component parts of the object within the XR representation. The other method includes, while the first XR mode is active and in response to a second hand gesture performed by the user directed to a component part of the plurality of component parts of the XR representation, causing a manipulation to the component part based on the second hand gesture. The other method includes in response to a third hand gesture performed by the user, initiating a second XR mode. The second XR mode causes presentation of an XR augment that defines a boundary for receiving one or more of the plurality of component parts. The other method further includes, while the second XR mode is active and in response to movement of at least one component part of the plurality of component parts to within a threshold distance of the boundary, coupling together the plurality of component parts to form the XR representation of the object in a structurally correct sequence. Examples of the first and second modes are provided above in reference to FIGS. 1A-1J and 4A-4D.

(B2) In some embodiments of B2, the other method further includes in response to a fourth hand gesture performed by the user, initiate a third XR mode. The third XR mode allows the user to perform one or more gestures for measuring respective component parts of the plurality of component parts within the XR representation. The other method includes, while the third XR mode is active and in response to a fifth hand gesture performed by the user, measure a distance between at least two points indicated by the fifth hand gesture, the distance being to scale with actual dimensions of the object. Example measurements are shown and described above in reference to FIGS. 1I and 1J.

(B3) In some embodiments of B1-B2, the other method includes in response to a sixth hand gesture performed by the user, initiate a fourth XR mode. The fourth XR mode allowing the user to annotate respective component parts of the plurality of component parts within the XR representation. The other method includes, while the fourth XR mode is active and in response to a seventh hand gesture performed by the user, annotate a portion of field of view of the user with an annotation XR augment. Example annotations are shown and described above in reference to FIGS. 2A-2C.

(B4) In some embodiments of B1-B3, the other method further includes in response to an eight hand gesture performed by the user, initiate a fifth XR mode. The fifth XR mode allowing the user to don and/or doff a representation of a different object. The other method includes, while the fifth XR mode is active and in response to a ninth hand gesture performed by the user, don and/or doff the representation of the different object on a body of the user that is visible to other users within an extended-reality environment viewable by the user and the other users. Example donning of an XR object is described above in reference to FIG. 3B.

(B5) In some embodiments of B4, the manipulations performed based on the second hand gesture include one or more of moving the plurality of component parts within the XR representation, enlarging the plurality of component parts within the XR representation, minimizing the plurality of component parts within the XR representation, presenting an exploded view that includes all of the plurality of component parts within the XR representation, and presenting a cross section of plurality of component parts within the XR representation. Example manipulations are shown and described above in reference to FIGS. 1A-1J and 4A-4D.

(B6) In some embodiments of B1-B5, the other method further includes in response to a tenth hand gesture performed by the user, remove respective manipulations to the plurality of component parts within the XR representation.

(B7) In some embodiments of B1-B6, the first mode is an assembly mode that allows the user to interact with one or more of the plurality of component parts within the XR representation, the second mode is a build mode that animates the coupling of the plurality of component parts within the XR representation in a structurally accurate sequence, the third mode is a measurement mode that allows the user to measure respective component parts of the plurality of component parts at scale, the fourth mode is an annotation mode that allows a user to draw and/or provide messages in the XR environment, and the fifth mode is a don/doff mode that allows a user to wear respective XR objects. Non-limiting examples of one or more modes are shown in reference to FIG. 5.

(B8) In some embodiments of B1-B7, the plurality of component parts of the object respectively and accurate represent information about corresponding component parts from a computer aided design document.

(B9) In some embodiments of B1-B8, interactions with the XR representation of the object and the plurality of component parts of the object are caused to be visible to other users accessing a same XR environment as the user.

(B10) In some embodiments of B1-B9, the other method further includes in response to an eleventh hand gesture performed by the user, initiating a sixth XR mode. The sixth XR mode allowing the user to modify at least one quality of respective component parts of the plurality of component parts within the XR representation (e.g., color, transparency, opacity, scale, etc.). The other method includes, while the sixth XR mode is active and in response to a twelfth hand gesture performed by the user, modifying the at least one quality of respective component parts of the plurality of component parts within the XR representation. Example modifying the at least one quality of respective component parts of the plurality of component parts within the XR representation is described above in reference to FIGS. 5C-5D.

(B11) In some embodiments of B1-B10, the other method further includes in response to a thirteenth hand gesture performed by the user, initiating a seventh XR mode. The seventh XR mode allowing the user to group respective component parts of the plurality of component parts within the XR representation with a grouping XR augment. The other method includes, while the seventh XR mode is active and in response to a fourteenth hand gesture performed by the user, grouping the respective component parts of the plurality of component parts within the XR representation with the grouping XR augment. Example grouping the respective component parts of the plurality of component parts within the XR representation with the grouping XR augment is described above in reference to FIGS. 5A-5B.

(B12) In some embodiments of B1-B11, each of the first hand gesture, second hand gesture, third hand gesture, fourth hand gesture, fifth hand gesture, sixth hand gesture, seventh hand gesture, eighth hand gesture, ninth hand gesture, tenth hand gesture, eleventh hand gesture, twelfth hand gesture, thirteenth hand gesture, and fourteenth hand gesture are each associated with a respective voice command. Each respective voice command is performed by the user alternatively or in conjunction with its respective hand gesture.

(C1) In accordance with some embodiments, FIG. 6B shows a flow chart of an additional method 650 of interacting with one or more XR objects representative of assemblies or parts within a computer aided design with voice commands, in accordance with some embodiments. The additional method 650 occurs at a head-wearable device (e.g., an extended-reality headset) while the head-wearable device presents, via one or more communicatively coupled displays, one or more XR objects within a portion of a field of view of a user wearing the head-wearable device. The additional method 650 includes, in response to a first voice command performed by the user, initiating (652) a first XR mode that allows a user to manipulate the one or more XR objects. The additional method 650 includes, while the first XR mode is active and in response to a second voice command performed by the user at an XR object of the one or more XR objects, manipulating (654) the XR object based on the second voice command. The additional method 650 also includes, in response to a third voice command performed by the user, initiating (606) a second XR mode, the second XR mode causing presentation of an XR augment that defines a boundary for receiving the one or more XR objects. Further, the additional method 650 includes, while the second XR mode is active and in response to placement of a subset of XR objects of the one or more XR objects within the XR augment, coupling (658) respective XR objects of the subset of XR objects. The respective XR objects of the subset of XR objects are coupled in a structurally correct sequence. Examples of the first and second modes are provided above in reference to FIGS. 1A-1J and 4A-4D.

(C2) In some embodiments of C1, the additional method 650 further includes operations corresponding to any of A2A-12 and/or B2B12.

(D1) In accordance with some embodiments, a system that includes one or more wrist wearable devices and an extended-reality headset, and the system is configured to perform operations corresponding to any of A1-C2.

(E1) In accordance with some embodiments, a non-transitory computer readable storage medium including instructions that, when executed by a computing device in communication with an extended-reality headset, cause the computer device to perform operations corresponding to any of A1-C2.

(F1) In accordance with some embodiments, means for performing or causing the performance of operations that correspond to any of A1-C2.

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU) or microcontroller unit (MCU)), is an electronic component that is responsible for executing instructions and controlling the operation of an electronic device (e.g., a wrist-wearable device 800, a head-wearable device, an HIPD 1000, a smart textile-based garment, or other computer system). There are various types of processors that may be used interchangeably or specifically required by embodiments described herein. For example, a processor may be (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing and/or customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware and/or boot loaders); (iii) flash memory, magnetic disk storage devices, optical disk storage devices, other non-volatile solid state storage devices, which can be configured to store data in electronic devices (e.g., universal serial bus (USB) drives, memory cards, and/or solid-state drives (SSDs)); and (iv) cache memory configured to temporarily store frequently accessed data and instructions. Memory, as described herein, can include structured data (e.g., SQL databases, MongoDB databases, GraphQL data, or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including (i) a power source, which can be an alternating current (AC) adapter or a direct current (DC) adapter power supply; (ii) a charger input that can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals and can provide a means for input and output of data and signals. Examples of peripheral interfaces can include (i) USB and/or micro-USB interfaces configured for connecting devices to an electronic device; (ii) Bluetooth interfaces configured to allow devices to communicate with each other, including Bluetooth low energy (BLE); (iii) near-field communication (NFC) interfaces configured to be short-range wireless interfaces for operations such as access control; (iv) POGO pins, which may be small, spring-loaded pins configured to provide a charging interface; (v) wireless charging interfaces; (vi) global-position system (GPS) interfaces; (vii) Wi-Fi interfaces for providing a connection between a device and a wireless network; and (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; and (vii) light sensors (e.g., ToF sensors, infrared light sensors, or visible light sensors), and/or sensors for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and diagnose neuromuscular disorders; (iv) electrooculography (EOG) sensors configured to measure the electrical activity of eye muscles to detect eye movement and diagnose eye disorders.

As described herein, an application stored in memory of an electronic device (e.g., software) includes instructions stored in the memory. Examples of such applications include (i) games; (ii) word processors; (iii) messaging applications; (iv) media-streaming applications; (v) financial applications; (vi) calendars; (vii) clocks; (viii) web browsers; (ix) social media applications, (x) camera applications, (xi) web-based applications; (xii) health applications; (xiii) artificial-reality (AR) applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, or Bluetooth). In some embodiments, a communication interface can refer to a software layer that enables different software programs to communicate with each other (e.g., application programming interfaces (APIs) and protocols such as HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example AR Systems

Figure 7A:
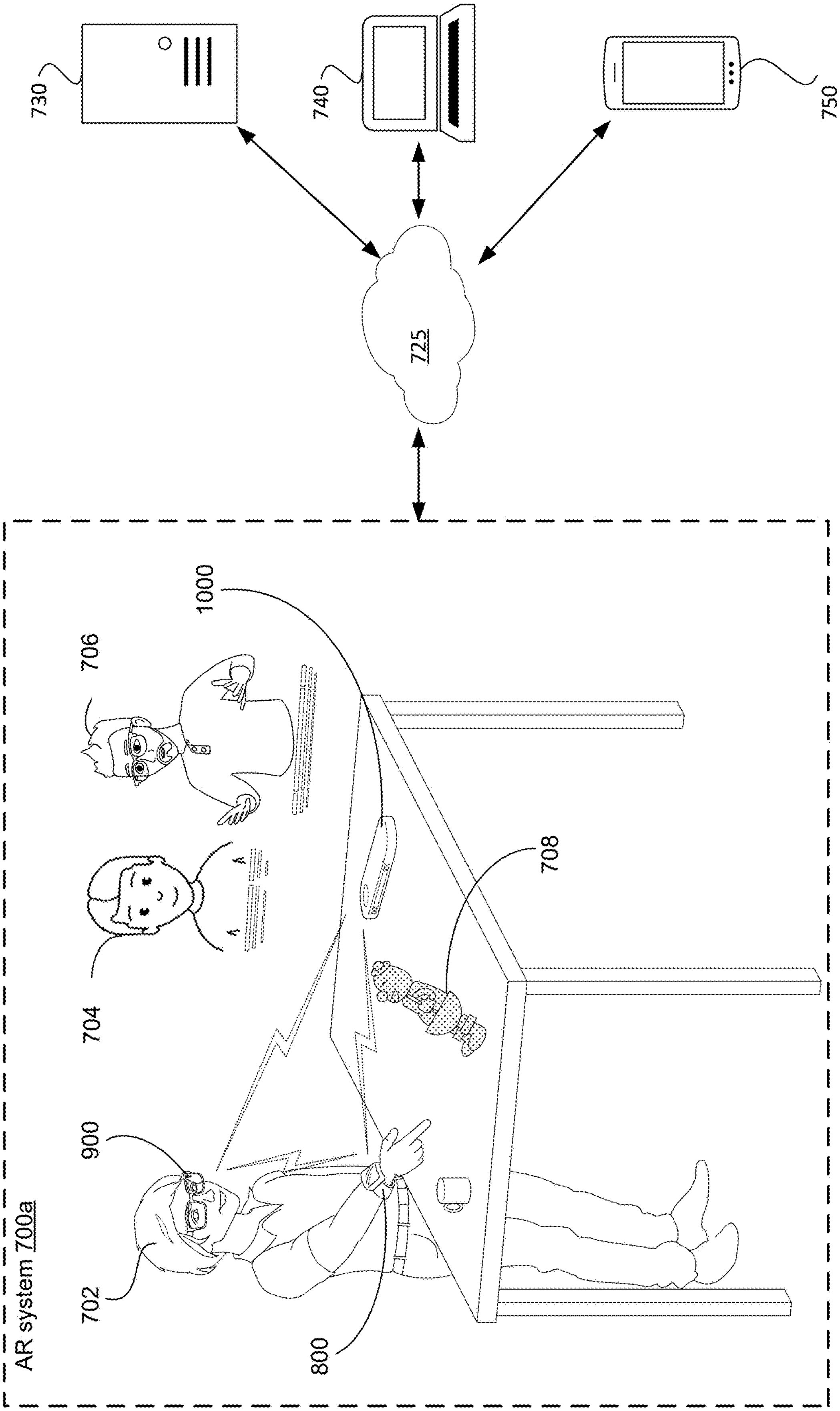
FIGS. 7A-7C-2 illustrate example artificial-reality systems, in accordance with some embodiments.
Figure 7B:
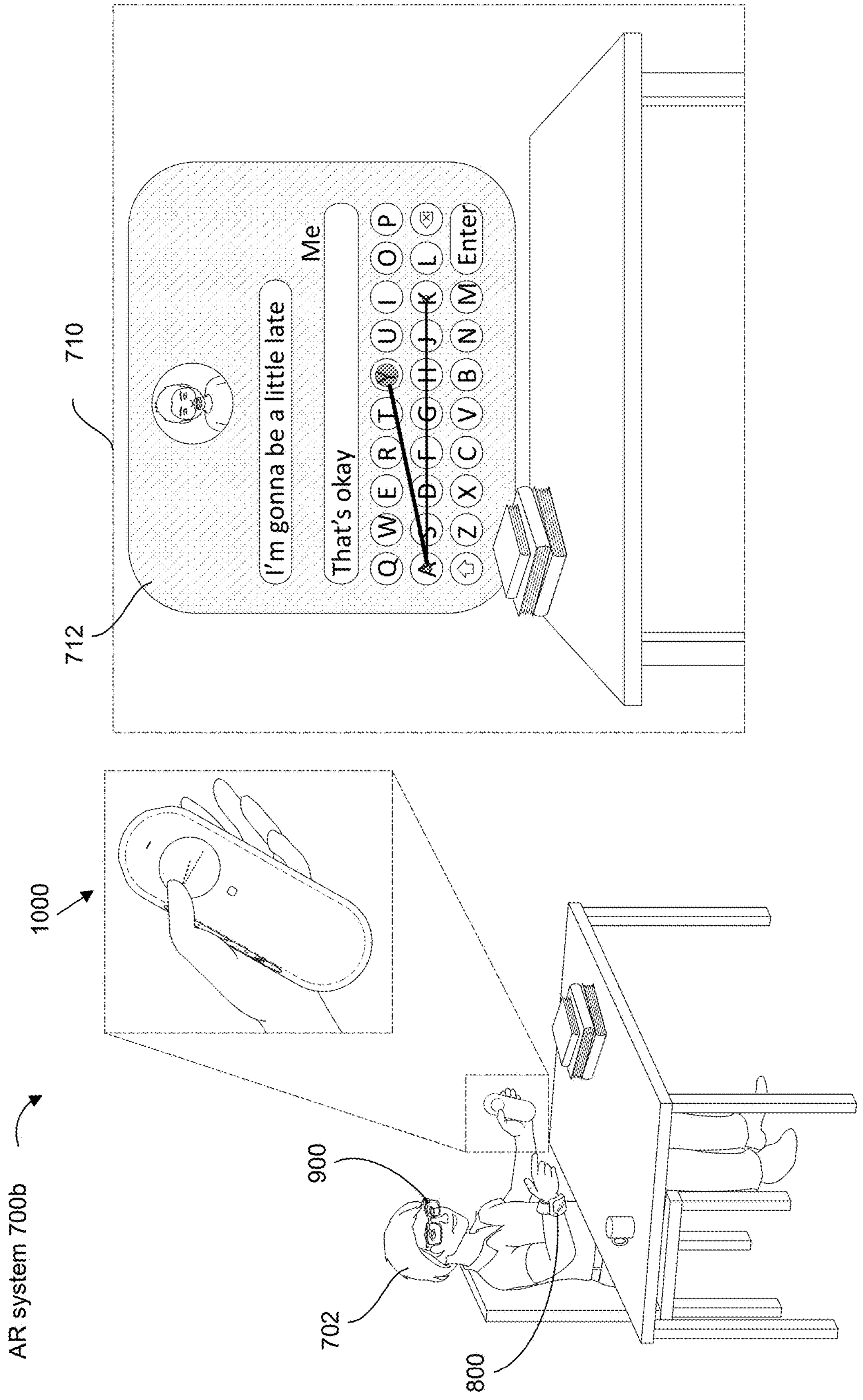
Figures 1, 7C:
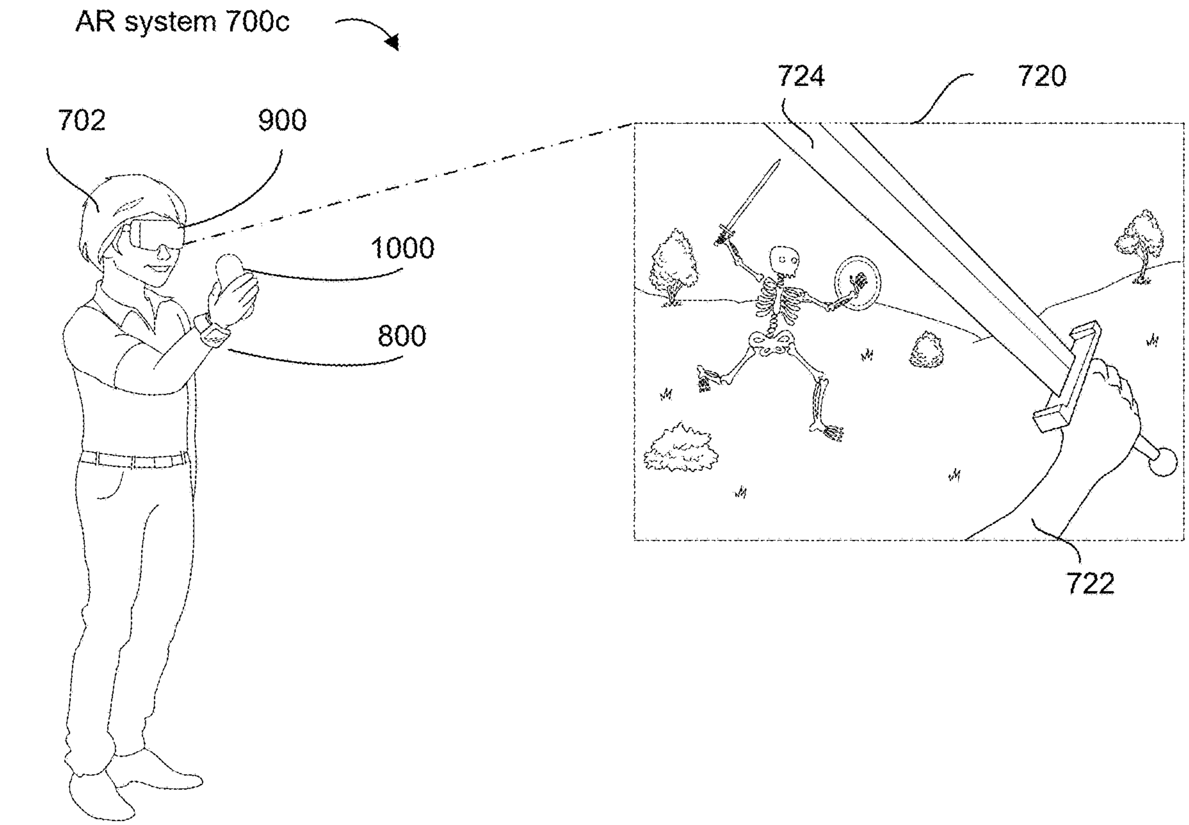
Figures 2, 7C:
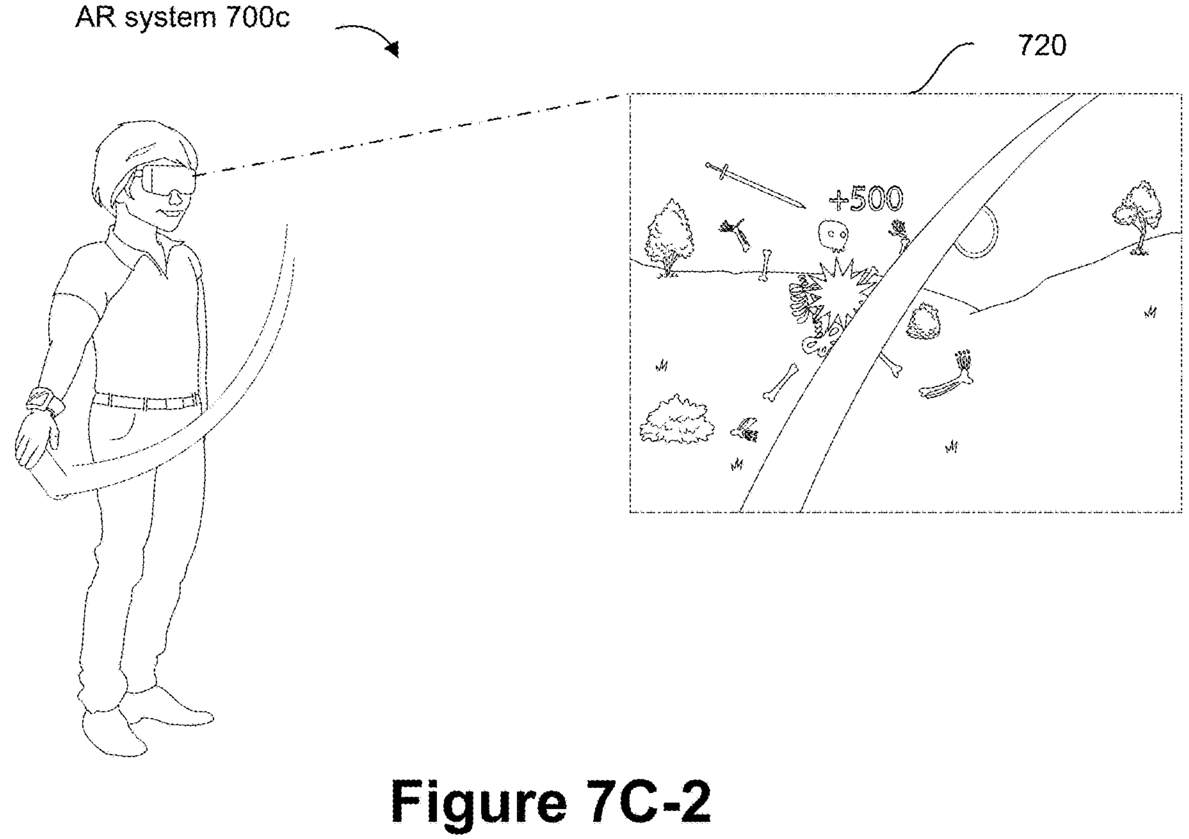

FIGS. 7A-7C-2 illustrate example artificial-reality systems, in accordance with some embodiments. FIG. 7A shows a first AR system 700*a* and first example user interactions using a wrist-wearable device 800, a head-wearable device (e.g., AR device 900), and/or a handheld intermediary processing device (HIPD) 1000. FIG. 7B shows a second AR system 700*b* and second example user interactions using a wrist-wearable device 800, AR device 900, and/or an HIPD 1000. FIGS. 7C-1 and 7C-2 show a third AR system 700*c* and third example user interactions using a wrist-wearable device 800, a head-wearable device (e.g., virtual-reality (VR) device 910), and/or an HIPD 1000. As the skilled artisan will appreciate upon reading the descriptions provided herein, the above-example AR systems (described in detail below) can perform various functions and/or operations described above with reference to FIGS. 1A-6.

The wrist-wearable device 800 and its constituent components are described below in reference to FIGS. 8A-8B, the head-wearable devices and their constituent components are described below in reference to FIGS. 9A-9D, and the HIPD 1000 and its constituent components are described below in reference to FIGS. 10A-10B. The wrist-wearable device 800, the head-wearable devices, and/or the HIPD 1000 can communicatively couple via a network 725 (e.g., cellular, near field, Wi-Fi, personal area network, wireless LAN, etc.). Additionally, the wrist-wearable device 800, the head-wearable devices, and/or the HIPD 1000 can also communicatively couple with one or more servers 730, computers 740 (e.g., laptops, computers, etc.), mobile devices 750 (e.g., smartphones, tablets, etc.), and/or other electronic devices via the network 725 (e.g., cellular, near field, Wi-Fi, personal area network, wireless LAN, etc.).

Turning to FIG. 7A, a user 702 is shown wearing the wrist-wearable device 800 and the AR device 900, and having the HIPD 1000 on their desk. The wrist-wearable device 800, the AR device 900, and the HIPD 1000 facilitate user interaction with an AR environment. In particular, as shown by the first AR system 700*a*, the wrist-wearable device 800, the AR device 900, and/or the HIPD 1000 cause presentation of one or more avatars 704, digital representations of contacts 706, and virtual objects 708. As discussed below, the user 702 can interact with the one or more avatars 704, digital representations of the contacts 706, and virtual objects 708 via the wrist-wearable device 800, the AR device 900, and/or the HIPD 1000.

The user 702 can use any of the wrist-wearable device 800, the AR device 900, and/or the HIPD 1000 to provide user inputs. For example, the user 702 can perform one or more hand gestures that are detected by the wrist-wearable device 800 (e.g., using one or more EMG sensors and/or IMUs, described below in reference to FIGS. 8A-8B) and/or AR device 900 (e.g., using one or more image sensors or cameras, described below in reference to FIGS. 9A-9B) to provide a user input. Alternatively, or additionally, the user 702 can provide a user input via one or more touch surfaces of the wrist-wearable device 800, the AR device 900, and/or the HIPD 1000, and/or voice commands captured by a microphone of the wrist-wearable device 800, the AR device 900, and/or the HIPD 1000. In some embodiments, the wrist-wearable device 800, the AR device 900, and/or the HIPD 1000 include a digital assistant to help the user in providing a user input (e.g., completing a sequence of operations, suggesting different operations or commands, providing reminders, confirming a command). In some embodiments, the user 702 can provide a user input via one or more facial gestures and/or facial expressions. For example, cameras of the wrist-wearable device 800, the AR device 900, and/or the HIPD 1000 can track the user 702's eyes for navigating a user interface.

The wrist-wearable device 800, the AR device 900, and/or the HIPD 1000 can operate alone or in conjunction to allow the user 702 to interact with the AR environment. In some embodiments, the HIPD 1000 is configured to operate as a central hub or control center for the wrist-wearable device 800, the AR device 900, and/or another communicatively coupled device. For example, the user 702 can provide an input to interact with the AR environment at any of the wrist-wearable device 800, the AR device 900, and/or the HIPD 1000, and the HIPD 1000 can identify one or more back-end and front-end tasks to cause the performance of the requested interaction and distribute instructions to cause the performance of the one or more back-end and front-end tasks at the wrist-wearable device 800, the AR device 900, and/or the HIPD 1000. In some embodiments, a back-end task is a background-processing task that is not perceptible by the user (e.g., rendering content, decompression, compression, etc.), and a front-end task is a user-facing task that is perceptible to the user (e.g., presenting information to the user, providing feedback to the user, etc.)). As described below in reference to FIGS. 10A-10B, the HIPD 1000 can perform the back-end tasks and provide the wrist-wearable device 800 and/or the AR device 900 operational data corresponding to the performed back-end tasks such that the wrist-wearable device 800 and/or the AR device 900 can perform the front-end tasks. In this way, the HIPD 1000, which has more computational resources and greater thermal headroom than the wrist-wearable device 800 and/or the AR device 900, performs computationally intensive tasks and reduces the computer resource utilization and/or power usage of the wrist-wearable device 800 and/or the AR device 900.

In the example shown by the first AR system 700*a*, the HIPD 1000 identifies one or more back-end tasks and front-end tasks associated with a user request to initiate an AR video call with one or more other users (represented by the avatar 704 and the digital representation of the contact 706) and distributes instructions to cause the performance of the one or more back-end tasks and front-end tasks. In particular, the HIPD 1000 performs back-end tasks for processing and/or rendering image data (and other data) associated with the AR video call and provides operational data associated with the performed back-end tasks to the AR device 900 such that the AR device 900 performs front-end tasks for presenting the AR video call (e.g., presenting the avatar 704 and the digital representation of the contact 706).

In some embodiments, the HIPD 1000 can operate as a focal or anchor point for causing the presentation of information. This allows the user 702 to be generally aware of where information is presented. For example, as shown in the first AR system 700*a*, the avatar 704 and the digital representation of the contact 706 are presented above the HIPD 1000. In particular, the HIPD 1000 and the AR device 900 operate in conjunction to determine a location for presenting the avatar 704 and the digital representation of the contact 706. In some embodiments, information can be presented within a predetermined distance from the HIPD 1000 (e.g., within five meters). For example, as shown in the first AR system 700*a*, virtual object 708 is presented on the desk some distance from the HIPD 1000. Similar to the above example, the HIPD 1000 and the AR device 900 can operate in conjunction to determine a location for presenting the virtual object 708. Alternatively, in some embodiments, presentation of information is not bound by the HIPD 1000. More specifically, the avatar 704, the digital representation of the contact 706, and the virtual object 708 do not have to be presented within a predetermined distance of the HIPD 1000.

User inputs provided at the wrist-wearable device 800, the AR device 900, and/or the HIPD 1000 are coordinated such that the user can use any device to initiate, continue, and/or complete an operation. For example, the user 702 can provide a user input to the AR device 900 to cause the AR device 900 to present the virtual object 708 and, while the virtual object 708 is presented by the AR device 900, the user 702 can provide one or more hand gestures via the wrist-wearable device 800 to interact and/or manipulate the virtual object 708.

FIG. 7B shows the user 702 wearing the wrist-wearable device 800 and the AR device 900, and holding the HIPD 1000. In the second AR system 700*b*, the wrist-wearable device 800, the AR device 900, and/or the HIPD 1000 are used to receive and/or provide one or more messages to a contact of the user 702. In particular, the wrist-wearable device 800, the AR device 900, and/or the HIPD 1000 detect and coordinate one or more user inputs to initiate a messaging application and prepare a response to a received message via the messaging application.

In some embodiments, the user 702 initiates, via a user input, an application on the wrist-wearable device 800, the AR device 900, and/or the HIPD 1000 that causes the application to initiate on at least one device. For example, in the second AR system 700*b* the user 702 performs a hand gesture associated with a command for initiating a messaging application (represented by messaging user interface 712); the wrist-wearable device 800 detects the hand gesture; and, based on a determination that the user 702 is wearing AR device 900, causes the AR device 900 to present a messaging user interface 712 of the messaging application. The AR device 900 can present the messaging user interface 712 to the user 702 via its display (e.g., as shown by user 702's field of view 710). In some embodiments, the application is initiated and can be run on the device (e.g., the wrist-wearable device 800, the AR device 900, and/or the HIPD 1000) that detects the user input to initiate the application, and the device provides another device operational data to cause the presentation of the messaging application. For example, the wrist-wearable device 800 can detect the user input to initiate a messaging application, initiate and run the messaging application, and provide operational data to the AR device 900 and/or the HIPD 1000 to cause presentation of the messaging application. Alternatively, the application can be initiated and run at a device other than the device that detected the user input. For example, the wrist-wearable device 800 can detect the hand gesture associated with initiating the messaging application and cause the HIPD 1000 to run the messaging application and coordinate the presentation of the messaging application.

Further, the user 702 can provide a user input provided at the wrist-wearable device 800, the AR device 900, and/or the HIPD 1000 to continue and/or complete an operation initiated at another device. For example, after initiating the messaging application via the wrist-wearable device 800 and while the AR device 900 presents the messaging user interface 712, the user 702 can provide an input at the HIPD 1000 to prepare a response (e.g., shown by the swipe gesture performed on the HIPD 1000). The user 702's gestures performed on the HIPD 1000 can be provided and/or displayed on another device. For example, the user 702's swipe gestures performed on the HIPD 1000 are displayed on a virtual keyboard of the messaging user interface 712 displayed by the AR device 900.

In some embodiments, the wrist-wearable device 800, the AR device 900, the HIPD 1000, and/or other communicatively coupled devices can present one or more notifications to the user 702. The notification can be an indication of a new message, an incoming call, an application update, a status update, etc. The user 702 can select the notification via the wrist-wearable device 800, the AR device 900, or the HIPD 1000 and cause presentation of an application or operation associated with the notification on at least one device. For example, the user 702 can receive a notification that a message was received at the wrist-wearable device 800, the AR device 900, the HIPD 1000, and/or other communicatively coupled device and provide a user input at the wrist-wearable device 800, the AR device 900, and/or the HIPD 1000 to review the notification, and the device detecting the user input can cause an application associated with the notification to be initiated and/or presented at the wrist-wearable device 800, the AR device 900, and/or the HIPD 1000.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 900 can present to the user 702 game application data and the HIPD 1000 can use a controller to provide inputs to the game. Similarly, the user 702 can use the wrist-wearable device 800 to initiate a camera of the AR device 900, and the user can use the wrist-wearable device 800, the AR device 900, and/or the HIPD 1000 to manipulate the image capture (e.g., zoom in or out, apply filters, etc.) and capture image data.

Turning to FIGS. 7C-1 and 7C-2, the user 702 is shown wearing the wrist-wearable device 800 and a VR device 910, and holding the HIPD 1000. In the third AR system **700*c*, the wrist-wearable device 800, the VR device 910, and/or the HIPD 1000 are used to interact within an AR environment, such as a VR game or other AR application. While the VR device 910 present a representation of a VR game (e.g., first AR game environment 720) to the user 702, the wrist-wearable device 800, the VR device 910, and/or the HIPD 1000 detect and coordinate one or more user inputs to allow the user 702** to interact with the VR game.

In some embodiments, the user 702 can provide a user input via the wrist-wearable device 800, the VR device 910, and/or the HIPD 1000 that causes an action in a corresponding AR environment. For example, the user 702 in the third AR system **700*c* (shown in FIG. 7C-1) raises the HIPD 1000 to prepare for a swing in the first AR game environment 720. The VR device 910, responsive to the user 702 raising the HIPD 1000, causes the AR representation of the user 722 to perform a similar action (e.g., raise a virtual object, such as a virtual sword 724). In some embodiments, each device uses respective sensor data and/or image data to detect the user input and provide an accurate representation of the user 702's motion. For example, image sensors 1058 (e.g., SLAM cameras or other cameras discussed below in FIGS. 10A and 10B) of the HIPD 1000 can be used to detect a position of the 1000 relative to the user 702's body such that the virtual object can be positioned appropriately within the first AR game environment 720; sensor data from the wrist-wearable device 800 can be used to detect a velocity at which the user 702 raises the HIPD 1000 such that the AR representation of the user 722 and the virtual sword 724 are synchronized with the user 702's movements; and image sensors 926 (FIGS. 9A-9C) of the VR device 910 can be used to represent the user 702's body, boundary conditions, or real-world objects within the first AR game environment 720**.

In FIG. 7C-2, the user 702 performs a downward swing while holding the HIPD 1000. The user 702's downward swing is detected by the wrist-wearable device 800, the VR device 910, and/or the HIPD 1000 and a corresponding action is performed in the first AR game environment 720. In some embodiments, the data captured by each device is used to improve the user's experience within the AR environment. For example, sensor data of the wrist-wearable device 800 can be used to determine a speed and/or force at which the downward swing is performed and image sensors of the HIPD 1000 and/or the VR device 910 can be used to determine a location of the swing and how it should be represented in the first AR game environment 720, which, in turn, can be used as inputs for the AR environment (e.g., game mechanics, which can use detected speed, force, locations, and/or aspects of the user 702's actions to classify a user's inputs (e.g., user performs a light strike, hard strike, critical strike, glancing strike, miss) or calculate an output (e.g., amount of damage)).

While the wrist-wearable device 800, the VR device 910, and/or the HIPD 1000 are described as detecting user inputs, in some embodiments, user inputs are detected at a single device (with the single device being responsible for distributing signals to the other devices for performing the user input). For example, the HIPD 1000 can operate an application for generating the first AR game environment 720 and provide the VR device 910 with corresponding data for causing the presentation of the first AR game environment 720, as well as detect the 702's movements (while holding the HIPD 1000) to cause the performance of corresponding actions within the first AR game environment 720. Additionally or alternatively, in some embodiments, operational data (e.g., sensor data, image data, application data, device data, and/or other data) of one or more devices is provide to a single device (e.g., the HIPD 1000) to process the operational data and cause respective devices to perform an action associated with processed operational data.

Having discussed example AR systems, devices for interacting with such AR systems, and other computing systems more generally, will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

Example Wrist-Wearable Devices

Figure 8A:
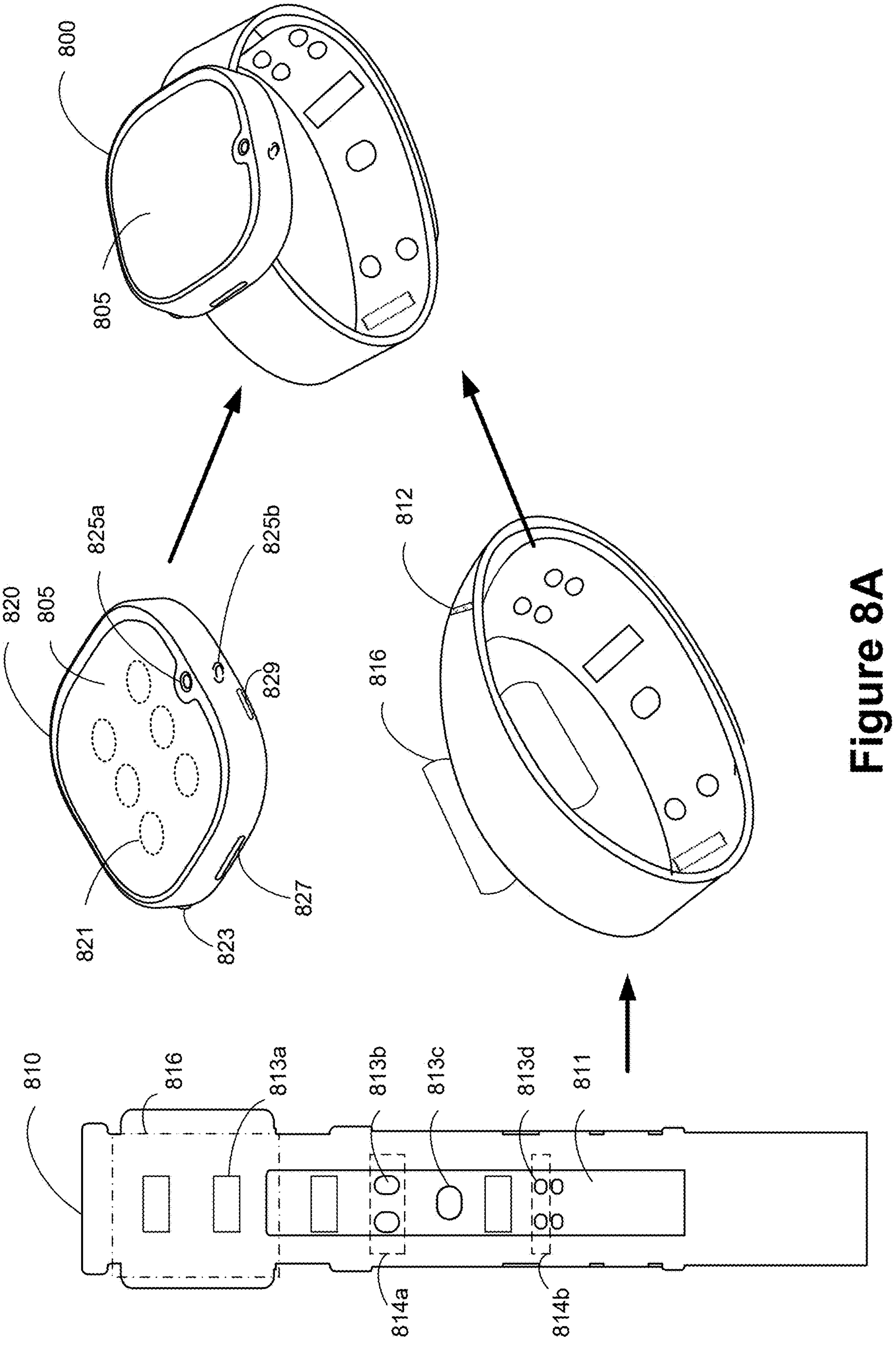
FIGS. 8A-8B illustrate an example wrist-wearable device 800, in accordance with some embodiments.
Figure 8B:
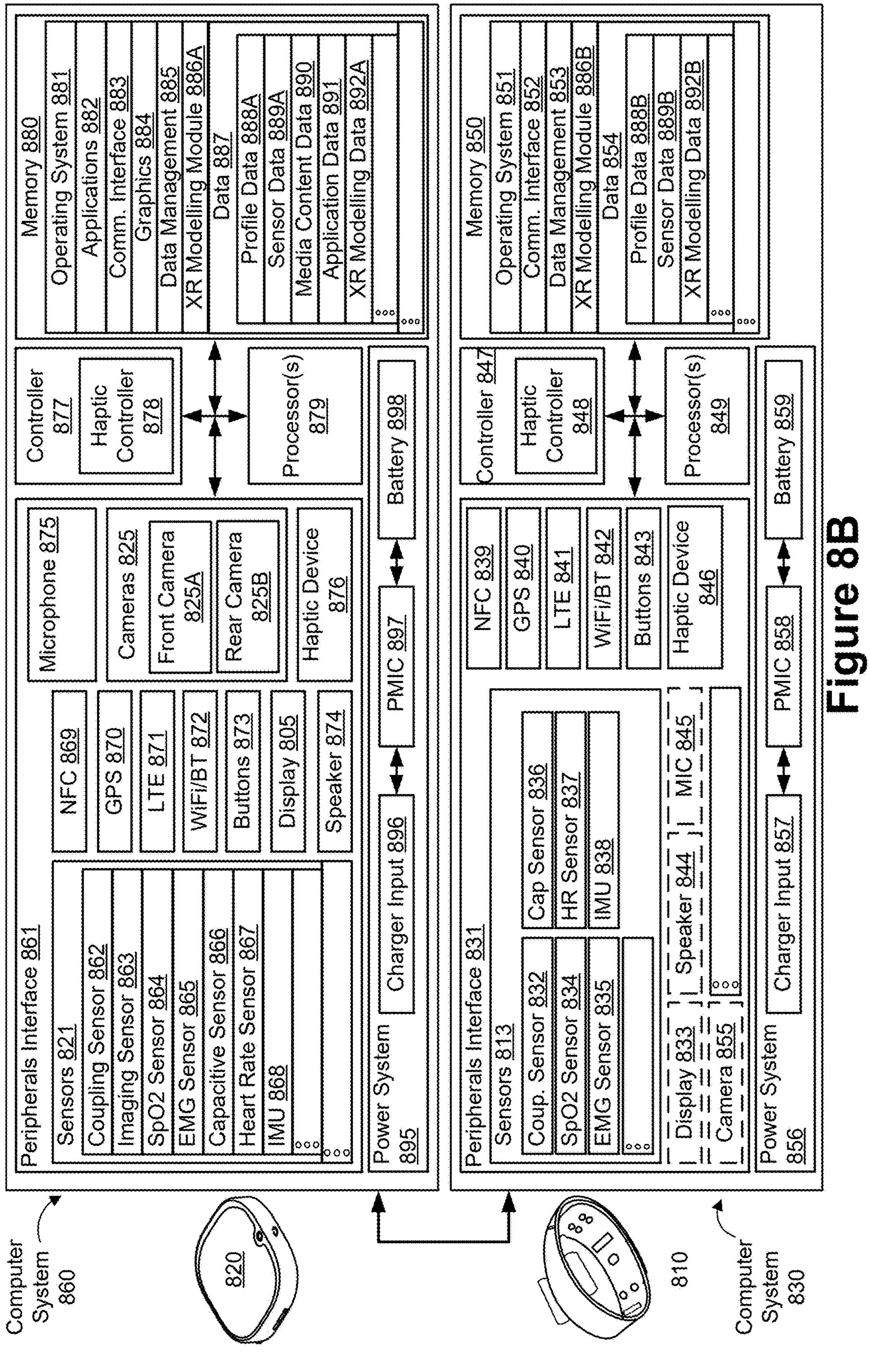

FIGS. 8A and 8B illustrate an example wrist-wearable device 800, in accordance with some embodiments. The wrist-wearable device 800 is an instance of the wearable device described in reference to FIGS. 1A-6B herein, such that the wrist-wearable devices should be understood to have the features of the wrist-wearable device 800 and vice versa. FIG. 8A illustrates components of the wrist-wearable device 800, which can be used individually or in combination, including combinations that include other electronic devices and/or electronic components.

FIG. 8A shows a wearable band 810 and a watch body 820 (or capsule) being coupled, as discussed below, to form the wrist-wearable device 800. The wrist-wearable device 800 can perform various functions and/or operations associated with navigating through user interfaces and selectively opening applications, as well as the functions and/or operations described above with reference to FIGS. 1A-6B.

As will be described in more detail below, operations executed by the wrist-wearable device 800 can include (i) presenting content to a user (e.g., displaying visual content via a display 805); (ii) detecting (e.g., sensing) user input (e.g., sensing a touch on peripheral button 823 and/or at a touch screen of the display 805, a hand gesture detected by sensors (e.g., biopotential sensors)); (iii) sensing biometric data via one or more sensors 813 (e.g., neuromuscular signals, heart rate, temperature, sleep, etc.); messaging (e.g., text, speech, video, etc.); image capture via one or more imaging devices or cameras 825; wireless communications (e.g., cellular, near field, Wi-Fi, personal area network, etc.); location determination; financial transactions; providing haptic feedback; alarms; notifications; biometric authentication; health monitoring; sleep monitoring.

The above-example functions can be executed independently in the watch body 820, independently in the wearable band 810, and/or via an electronic communication between the watch body 820 and the wearable band 810. In some embodiments, functions can be executed on the wrist-wearable device 800 while an AR environment is being presented (e.g., via one of the AR systems 700*a* to 700*c*). As the skilled artisan will appreciate upon reading the descriptions provided herein, the novel wearable devices described herein can be used with other types of AR environments.

The wearable band 810 can be configured to be worn by a user such that an inner (or inside) surface of the wearable structure 811 of the wearable band 810 is in contact with the user's skin. When worn by a user, sensors 813 contact the user's skin. The sensors 813 can sense biometric data such as a user's heart rate, saturated oxygen level, temperature, sweat level, neuromuscular signal sensors, or a combination thereof. The sensors 813 can also sense data about a user's environment, including a user's motion, altitude, location, orientation, gait, acceleration, position, or a combination thereof. In some embodiments, the sensors 813 are configured to track a position and/or motion of the wearable band 810. The one or more sensors 813 can include any of the sensors defined above and/or discussed below with respect to FIG. 8B.

The one or more sensors 813 can be distributed on an inside and/or an outside surface of the wearable band 810. In some embodiments, the one or more sensors 813 are uniformly spaced along the wearable band 810. Alternatively, in some embodiments, the one or more sensors 813 are positioned at distinct points along the wearable band 810. As shown in FIG. 8A, the one or more sensors 813 can be the same or distinct. For example, in some embodiments, the one or more sensors 813 can be shaped as a pill (e.g., sensor 813*a*), an oval, a circle a square, an oblong (e.g., sensor 813*c*) and/or any other shape that maintains contact with the user's skin (e.g., such that neuromuscular signal and/or other biometric data can be accurately measured at the user's skin). In some embodiments, the one or more sensors 813 are aligned to form pairs of sensors (e.g., for sensing neuromuscular signals based on differential sensing within each respective sensor). For example, sensor 813*b* is aligned with an adjacent sensor to form sensor pair 814*a* and sensor 813*d* is aligned with an adjacent sensor to form sensor pair 814*b*. In some embodiments, the wearable band 810 does not have a sensor pair. Alternatively, in some embodiments, the wearable band 810 has a predetermined number of sensor pairs (one pair of sensors, three pairs of sensors, four pairs of sensors, six pairs of sensors, sixteen pairs of sensors, etc.).

The wearable band 810 can include any suitable number of sensors 813. In some embodiments, the number and arrangements of sensors 813 depend on the particular application for which the wearable band 810 is used. For instance, a wearable band 810 configured as an armband, wristband, or chest-band may include a plurality of sensors 813 with different number of sensors 813 and different arrangement for each use case, such as medical use cases, compared to gaming or general day-to-day use cases.

In accordance with some embodiments, the wearable band 810 further includes an electrical ground electrode and a shielding electrode. The electrical ground and shielding electrodes, like the sensors 813, can be distributed on the inside surface of the wearable band 810 such that they contact a portion of the user's skin. For example, the electrical ground and shielding electrodes can be at an inside surface of coupling mechanism 816 or an inside surface of a wearable structure 811. The electrical ground and shielding electrodes can be formed and/or use the same components as the sensors 813. In some embodiments, the wearable band 810 includes more than one electrical ground electrode and more than one shielding electrode.

The sensors 813 can be formed as part of the wearable structure 811 of the wearable band 810. In some embodiments, the sensors 813 are flush or substantially flush with the wearable structure 811 such that they do not extend beyond the surface of the wearable structure 811. While flush with the wearable structure 811, the sensors 813 are still configured to contact the user's skin (e.g., via a skin-contacting surface). Alternatively, in some embodiments, the sensors 813 extend beyond the wearable structure 811 a predetermined distance (e.g., 0.1 mm to 2 mm) to make contact and depress into the user's skin. In some embodiments, the sensors 813 are coupled to an actuator (not shown) configured to adjust an extension height (e.g., a distance from the surface of the wearable structure 811) of the sensors 813 such that the sensors 813 make contact and depress into the user's skin. In some embodiments, the actuators adjust the extension height between 0.01 mm to 1.2 mm. This allows the user to customize the positioning of the sensors 813 to improve the overall comfort of the wearable band 810 when worn while still allowing the sensors 813 to contact the user's skin. In some embodiments, the sensors 813 are indistinguishable from the wearable structure 811 when worn by the user.

The wearable structure 811 can be formed of an elastic material, elastomers, etc., configured to be stretched and fitted to be worn by the user. In some embodiments, the wearable structure 811 is a textile or woven fabric. As described above, the sensors 813 can be formed as part of a wearable structure 811. For example, the sensors 813 can be molded into the wearable structure 811 or be integrated into a woven fabric (e.g., the sensors 813 can be sewn into the fabric and mimic the pliability of fabric (e.g., the sensors 813 can be constructed from a series of woven strands of fabric)).

The wearable structure 811 can include flexible electronic connectors that interconnect the sensors 813, the electronic circuitry, and/or other electronic components (described below in reference to FIG. 8B) that are enclosed in the wearable band 810. In some embodiments, the flexible electronic connectors are configured to interconnect the sensors 813, the electronic circuitry, and/or other electronic components of the wearable band 810 with respective sensors and/or other electronic components of another electronic device (e.g., watch body 820). The flexible electronic connectors are configured to move with the wearable structure 811 such that the user adjustment to the wearable structure 811 (e.g., resizing, pulling, folding, etc.) does not stress or strain the electrical coupling of components of the wearable band 810.

As described above, the wearable band 810 is configured to be worn by a user. In particular, the wearable band 810 can be shaped or otherwise manipulated to be worn by a user. For example, the wearable band 810 can be shaped to have a substantially circular shape such that it can be configured to be worn on the user's lower arm or wrist. Alternatively, the wearable band 810 can be shaped to be worn on another body part of the user, such as the user's upper arm (e.g., around a bicep), forearm, chest, legs, etc. The wearable band 810 can include a retaining mechanism 812 (e.g., a buckle, a hook and loop fastener, etc.) for securing the wearable band 810 to the user's wrist or other body part. While the wearable band 810 is worn by the user, the sensors 813 sense data (referred to as sensor data) from the user's skin. In particular, the sensors 813 of the wearable band 810 obtain (e.g., sense and record) neuromuscular signals.

The sensed data (e.g., sensed neuromuscular signals) can be used to detect and/or determine the user's intention to perform certain motor actions. In particular, the sensors 813 sense and record neuromuscular signals from the user as the user performs muscular activations (e.g., movements, gestures, etc.). The detected and/or determined motor actions (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 805 of the wrist-wearable device 800 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 813 can be used to provide a user with an enhanced interaction with a physical object (e.g., devices communicatively coupled with the wearable band 810) and/or a virtual object in an artificial-reality application generated by an artificial-reality system (e.g., user interface objects presented on the display 805 or another computing device (e.g., a smartphone)).

In some embodiments, the wearable band 810 includes one or more haptic devices 846 (FIG. 8B; e.g., a vibratory haptic actuator) that are configured to provide haptic feedback (e.g., a cutaneous and/or kinesthetic sensation, etc.) to the user's skin. The sensors 813, and/or the haptic devices 846 can be configured to operate in conjunction with multiple applications including, without limitation, health monitoring, social media, games, and artificial reality (e.g., the applications associated with artificial reality).

The wearable band 810 can also include coupling mechanism 816 (e.g., a cradle or a shape of the coupling mechanism can correspond to shape of the watch body 820 of the wrist-wearable device 800) for detachably coupling a capsule (e.g., a computing unit) or watch body 820 (via a coupling surface of the watch body 820) to the wearable band 810. In particular, the coupling mechanism 816 can be configured to receive a coupling surface proximate to the bottom side of the watch body 820 (e.g., a side opposite to a front side of the watch body 820 where the display 805 is located), such that a user can push the watch body 820 downward into the coupling mechanism 816 to attach the watch body 820 to the coupling mechanism 816. In some embodiments, the coupling mechanism 816 can be configured to receive a top side of the watch body 820 (e.g., a side proximate to the front side of the watch body 820 where the display 805 is located) that is pushed upward into the cradle, as opposed to being pushed downward into the coupling mechanism 816. In some embodiments, the coupling mechanism 816 is an integrated component of the wearable band 810 such that the wearable band 810 and the coupling mechanism 816 are a single unitary structure. In some embodiments, the coupling mechanism 816 is a type of frame or shell that allows the watch body 820 coupling surface to be retained within or on the wearable band 810 coupling mechanism 816 (e.g., a cradle, a tracker band, a support base, a clasp, etc.).

The coupling mechanism 816 can allow for the watch body 820 to be detachably coupled to the wearable band 810 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 820 to the wearable band 810 and to decouple the watch body 820 from the wearable band 810. For example, a user can twist, slide, turn, push, pull, or rotate the watch body 820 relative to the wearable band 810, or a combination thereof, to attach the watch body 820 to the wearable band 810 and to detach the watch body 820 from the wearable band 810. Alternatively, as discussed below, in some embodiments, the watch body 820 can be decoupled from the wearable band 810 by actuation of the release mechanism 829.

The wearable band 810 can be coupled with a watch body 820 to increase the functionality of the wearable band 810 (e.g., converting the wearable band 810 into a wrist-wearable device 800, adding an additional computing unit and/or battery to increase computational resources and/or a battery life of the wearable band 810, adding additional sensors to improve sensed data, etc.). As described above, the wearable band 810 (and the coupling mechanism 816) is configured to operate independently (e.g., execute functions independently) from watch body 820. For example, the coupling mechanism 816 can include one or more sensors 813 that contact a user's skin when the wearable band 810 is worn by the user and provide sensor data for determining control commands.

A user can detach the watch body 820 (or capsule) from the wearable band 810 in order to reduce the encumbrance of the wrist-wearable device 800 to the user. For embodiments in which the watch body 820 is removable, the watch body 820 can be referred to as a removable structure, such that in these embodiments the wrist-wearable device 800 includes a wearable portion (e.g., the wearable band 810) and a removable structure (the watch body 820).

Turning to the watch body 820, the watch body 820 can have a substantially rectangular or circular shape. The watch body 820 is configured to be worn by the user on their wrist or on another body part. More specifically, the watch body 820 is sized to be easily carried by the user, attached on a portion of the user's clothing, and/or coupled to the wearable band 810 (forming the wrist-wearable device 800). As described above, the watch body 820 can have a shape corresponding to the coupling mechanism 816 of the wearable band 810. In some embodiments, the watch body 820 includes a single release mechanism 829 or multiple release mechanisms (e.g., two release mechanisms 829 positioned on opposing sides of the watch body 820, such as spring-loaded buttons) for decoupling the watch body 820 and the wearable band 810. The release mechanism 829 can include, without limitation, a button, a knob, a plunger, a handle, a lever, a fastener, a clasp, a dial, a latch, or a combination thereof.

A user can actuate the release mechanism 829 by pushing, turning, lifting, depressing, shifting, or performing other actions on the release mechanism 829. Actuation of the release mechanism 829 can release (e.g., decouple) the watch body 820 from the coupling mechanism 816 of the wearable band 810, allowing the user to use the watch body 820 independently from wearable band 810, and vice versa. For example, decoupling the watch body 820 from the wearable band 810 can allow the user to capture images using rear-facing camera 825B. Although the coupling mechanism 816 is shown positioned at a corner of watch body 820, the release mechanism 829 can be positioned anywhere on watch body 820 that is convenient for the user to actuate. In addition, in some embodiments, the wearable band 810 can also include a respective release mechanism for decoupling the watch body 820 from the coupling mechanism 816. In some embodiments, the release mechanism 829 is optional and the watch body 820 can be decoupled from the coupling mechanism 816 as described above (e.g., via twisting, rotating, etc.).

The watch body 820 can include one or more peripheral buttons 823 and 827 for performing various operations at the watch body 820. For example, the peripheral buttons 823 and 827 can be used to turn on or wake (e.g., transition from a sleep state to an active state) the display 805, unlock the watch body 820, increase or decrease a volume, increase or decrease brightness, interact with one or more applications, interact with one or more user interfaces, etc. Additionally, or alternatively, in some embodiments, the display 805 operates as a touch screen and allows the user to provide one or more inputs for interacting with the watch body 820.

In some embodiments, the watch body 820 includes one or more sensors 821. The sensors 821 of the watch body 820 can be the same or distinct from the sensors 813 of the wearable band 810. The sensors 821 of the watch body 820 can be distributed on an inside and/or an outside surface of the watch body 820. In some embodiments, the sensors 821 are configured to contact a user's skin when the watch body 820 is worn by the user. For example, the sensors 821 can be placed on the bottom side of the watch body 820 and the coupling mechanism 816 can be a cradle with an opening that allows the bottom side of the watch body 820 to directly contact the user's skin. Alternatively, in some embodiments, the watch body 820 does not include sensors that are configured to contact the user's skin (e.g., including sensors internal and/or external to the watch body 820 that configured to sense data of the watch body 820 and the watch body 820's surrounding environment). In some embodiments, the sensors 813 are configured to track a position and/or motion of the watch body 820.

The watch body 820 and the wearable band 810 can share data using a wired communication method (e.g., a Universal Asynchronous Receiver/Transmitter (UART), a USB transceiver, etc.) and/or a wireless communication method (e.g., near field communication, Bluetooth, etc.). For example, the watch body 820 and the wearable band 810 can share data sensed by the sensors 813 and 821, as well as application- and device-specific information (e.g., active and/or available applications), output devices (e.g., display, speakers, etc.), input devices (e.g., touch screen, microphone, imaging sensors, etc.).

In some embodiments, the watch body 820 can include, without limitation, a front-facing camera 825A and/or a rear-facing camera 825B, sensors 821 (e.g., a biometric sensor, an IMU sensor, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 863; FIG. 8B), a touch sensor, a sweat sensor, etc.). In some embodiments, the watch body 820 can include one or more haptic devices 876 (FIG. 8B; a vibratory haptic actuator) that is configured to provide haptic feedback (e.g., a cutaneous and/or kinesthetic sensation, etc.) to the user. The sensors 821 and/or the haptic device 876 can also be configured to operate in conjunction with multiple applications including, without limitation, health-monitoring applications, social media applications, game applications, and artificial-reality applications (e.g., the applications associated with artificial reality).

As described above, the watch body 820 and the wearable band 810, when coupled, can form the wrist-wearable device 800. When coupled, the watch body 820 and wearable band 810 operate as a single device to execute functions (operations, detections, communications, etc.) described herein. In some embodiments, each device is provided with particular instructions for performing the one or more operations of the wrist-wearable device 800. For example, in accordance with a determination that the watch body 820 does not include neuromuscular signal sensors, the wearable band 810 can include alternative instructions for performing associated instructions (e.g., providing sensed neuromuscular signal data to the watch body 820 via a different electronic device). Operations of the wrist-wearable device 800 can be performed by the watch body 820 alone or in conjunction with the wearable band 810 (e.g., via respective processors and/or hardware components) and vice versa. In some embodiments, operations of the wrist-wearable device 800, the watch body 820, and/or the wearable band 810 can be performed in conjunction with one or more processors and/or hardware components of another communicatively coupled device (e.g., the HIPD 1000; FIGS. 10A-10B).

As described below with reference to the block diagram of FIG. 8B, the wearable band 810 and/or the watch body 820 can each include independent resources required to independently execute functions. For example, the wearable band 810 and/or the watch body 820 can each include a power source (e.g., a battery), a memory, data storage, a processor (e.g., a central processing unit (CPU)), communications, a light source, and/or input/output devices.

FIG. 8B shows block diagrams of a computing system 830 corresponding to the wearable band 810, and a computing system 860 corresponding to the watch body 820, according to some embodiments. A computing system of the wrist-wearable device 800 includes a combination of components of the wearable band computing system 830 and the watch body computing system 860, in accordance with some embodiments.

The watch body 820 and/or the wearable band 810 can include one or more components shown in watch body computing system 860. In some embodiments, a single integrated circuit includes all or a substantial portion of the components of the watch body computing system 860 are included in a single integrated circuit. Alternatively, in some embodiments, components of the watch body computing system 860 are included in a plurality of integrated circuits that are communicatively coupled. In some embodiments, the watch body computing system 860 is configured to couple (e.g., via a wired or wireless connection) with the wearable band computing system 830, which allows the computing systems to share components, distribute tasks, and/or perform other operations described herein (individually or as a single device).

The watch body computing system 860 can include one or more processors 879, a controller 877, a peripherals interface 861, a power system 895, and memory (e.g., a memory 880), each of which are defined above and described in more detail below.

The power system 895 can include a charger input 896, a power-management integrated circuit (PMIC) 897, and a battery 898, each are which are defined above. In some embodiments, a watch body 820 and a wearable band 810 can have respective charger inputs (e.g., charger input 896 and 857), respective batteries (e.g., battery 898 and 859), and can share power with each other (e.g., the watch body 820 can power and/or charge the wearable band 810, and vice versa). Although watch body 820 and/or the wearable band 810 can include respective charger inputs, a single charger input can charge both devices when coupled. The watch body 820 and the wearable band 810 can receive a charge using a variety of techniques. In some embodiments, the watch body 820 and the wearable band 810 can use a wired charging assembly (e.g., power cords) to receive the charge. Alternatively, or in addition, the watch body 820 and/or the wearable band 810 can be configured for wireless charging. For example, a portable charging device can be designed to mate with a portion of watch body 820 and/or wearable band 810 and wirelessly deliver usable power to a battery of watch body 820 and/or wearable band 810. The watch body 820 and the wearable band 810 can have independent power systems (e.g., power system 895 and 856) to enable each to operate independently. The watch body 820 and wearable band 810 can also share power (e.g., one can charge the other) via respective PMICs (e.g., PMICs 897 and 858) that can share power over power and ground conductors and/or over wireless charging antennas.

In some embodiments, the peripherals interface 861 can include one or more sensors 821, many of which listed below are defined above. The sensors 821 can include one or more coupling sensors 862 for detecting when the watch body 820 is coupled with another electronic device (e.g., a wearable band 810). The sensors 821 can include imaging sensors 863 (one or more of the cameras 825 and/or separate imaging sensors 863 (e.g., thermal-imaging sensors)). In some embodiments, the sensors 821 include one or more SpO2 sensors 864. In some embodiments, the sensors 821 include one or more biopotential-signal sensors (e.g., EMG sensors 865, which may be disposed on a user-facing portion of the watch body 820 and/or the wearable band 810). In some embodiments, the sensors 821 include one or more capacitive sensors 866. In some embodiments, the sensors 821 include one or more heart rate sensors 867. In some embodiments, the sensors 821 include one or more IMUs 868. In some embodiments, one or more IMUs 868 can be configured to detect movement of a user's hand or other location that the watch body 820 is placed or held.

In some embodiments, the peripherals interface 861 includes an NFC component 869, a global-position system (GPS) component 870, a long-term evolution (LTE) component 871, and/or a Wi-Fi and/or Bluetooth communication component 872. In some embodiments, the peripherals interface 861 includes one or more buttons 873 (e.g., the peripheral buttons 823 and 827 in FIG. 8A), which, when selected by a user, cause operations to be performed at the watch body 820. In some embodiments, the peripherals interface 861 includes one or more indicators, such as a light emitting diode (LED), to provide a user with visual indicators (e.g., message received, low battery, an active microphone, and/or a camera, etc.).

The watch body 820 can include at least one display 805 for displaying visual representations of information or data to the user, including user-interface elements and/or three-dimensional (3D) virtual objects. The display can also include a touch screen for inputting user inputs, such as touch gestures, swipe gestures, and the like. The watch body 820 can include at least one speaker 874 and at least one microphone 875 for providing audio signals to the user and receiving audio input from the user. The user can provide user inputs through the microphone 875 and can also receive audio output from the speaker 874 as part of a haptic event provided by the haptic controller 878. The watch body 820 can include at least one camera 825, including a front-facing camera 825A and a rear-facing camera 825B. The cameras 825 can include ultra-wide-angle cameras, wide-angle cameras, fish-eye cameras, spherical cameras, telephoto cameras, a depth-sensing cameras, or other types of cameras.

The watch body computing system 860 can include one or more haptic controllers 878 and associated componentry (e.g., haptic devices 876) for providing haptic events at the watch body 820 (e.g., a vibrating sensation or audio output in response to an event at the watch body 820). The haptic controllers 878 can communicate with one or more haptic devices 876, such as electroacoustic devices, including a speaker of the one or more speakers 874 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 878 can provide haptic events to respective haptic actuators that are capable of being sensed by a user of the watch body 820. In some embodiments, the one or more haptic controllers 878 can receive input signals from an application of the applications 882.

In some embodiments, the computer system 830 and/or the computer system 860 can include memory 880, which can be controlled by a memory controller of the one or more controllers 877 and/or one or more processors 879. In some embodiments, software components stored in the memory 880 include one or more applications 882 configured to perform operations at the watch body 820. In some embodiments, the one or more applications 882 include games, word processors, messaging applications, calling applications, web browsers, social media applications, media streaming applications, financial applications, calendars, clocks, etc. In some embodiments, software components stored in the memory 880 include one or more communication interface modules 883 as defined above. In some embodiments, software components stored in the memory 880 include one or more graphics modules 884 for rendering, encoding, and/or decoding audio and/or visual data; and one or more data management modules 885 for collecting, organizing, and/or providing access to the data 887 stored in memory 880. In some embodiments, software components stored in the memory 880 include an XR modelling module 886A to perform the features described above in reference to FIGS. 1A-6B. In some embodiments, one or more of applications 882 and/or one or more modules can work in conjunction with one another to perform various tasks at the watch body 820.

In some embodiments, software components stored in the memory 880 can include one or more operating systems 881 (e.g., a Linux-based operating system, an Android operating system, etc.). The memory 880 can also include data 887. The data 887 can include profile data 888A, sensor data 889A, media content data 890, application data 891, and XR modelling data 892A, which stores data related to the performance of the features described above in reference to FIGS. 1A-6B.

It should be appreciated that the watch body computing system 860 is an example of a computing system within the watch body 820, and that the watch body 820 can have more or fewer components than shown in the watch body computing system 860, combine two or more components, and/or have a different configuration and/or arrangement of the components. The various components shown in watch body computing system 860 are implemented in hardware, software, firmware, or a combination thereof, including one or more signal processing and/or application-specific integrated circuits.

Turning to the wearable band computing system 830, one or more components that can be included in the wearable band 810 are shown. The wearable band computing system 830 can include more or fewer components than shown in the watch body computing system 860, combine two or more components, and/or have a different configuration and/or arrangement of some or all of the components. In some embodiments, all, or a substantial portion of the components of the wearable band computing system 830 are included in a single integrated circuit. Alternatively, in some embodiments, components of the wearable band computing system 830 are included in a plurality of integrated circuits that are communicatively coupled. As described above, in some embodiments, the wearable band computing system 830 is configured to couple (e.g., via a wired or wireless connection) with the watch body computing system 860, which allows the computing systems to share components, distribute tasks, and/or perform other operations described herein (individually or as a single device).

The wearable band computing system 830, similar to the watch body computing system 860, can include one or more processors 849, one or more controllers 847 (including one or more haptics controller 848), a peripherals interface 831 that can include one or more sensors 813 and other peripheral devices, power source (e.g., a power system 856), and memory (e.g., a memory 850) that includes an operating system (e.g., an operating system 851), data (e.g., data 854 including profile data 888B, sensor data 889B, XR modelling data 892B, etc.), and one or more modules (e.g., a communications interface module 852, a data management module 853, an XR modelling module 886B, etc.).

The one or more sensors 813 can be analogous to sensors 821 of the computer system 860 in light of the definitions above. For example, sensors 813 can include one or more coupling sensors 832, one or more SpO2 sensors 834, one or more EMG sensors 835, one or more capacitive sensors 836, one or more heart rate sensors 837, and one or more IMU sensors 838.

The peripherals interface 831 can also include other components analogous to those included in the peripheral interface 861 of the computer system 860, including an NFC component 839, a GPS component 840, an LTE component 841, a Wi-Fi and/or Bluetooth communication component 842, and/or one or more haptic devices 876 as described above in reference to peripherals interface 861. In some embodiments, the peripherals interface 831 includes one or more buttons 843, a display 833, a speaker 844, a microphone 845, and a camera 855. In some embodiments, the peripherals interface 831 includes one or more indicators, such as an LED.

It should be appreciated that the wearable band computing system 830 is an example of a computing system within the wearable band 810, and that the wearable band 810 can have more or fewer components than shown in the wearable band computing system 830, combine two or more components, and/or have a different configuration and/or arrangement of the components. The various components shown in wearable band computing system 830 can be implemented in one or a combination of hardware, software, and firmware, including one or more signal processing and/or application-specific integrated circuits.

The wrist-wearable device 800 with respect to FIG. 8A is an example of the wearable band 810 and the watch body 820 coupled, so the wrist-wearable device 800 will be understood to include the components shown and described for the wearable band computing system 830 and the watch body computing system 860. In some embodiments, wrist-wearable device 800 has a split architecture (e.g., a split mechanical architecture or a split electrical architecture) between the watch body 820 and the wearable band 810. In other words, all of the components shown in the wearable band computing system 830 and the watch body computing system 860 can be housed or otherwise disposed in a combined watch device 800, or within individual components of the watch body 820, wearable band 810, and/or portions thereof (e.g., a coupling mechanism 816 of the wearable band 810).

The techniques described above can be used with any device for sensing neuromuscular signals, including the arm-wearable devices of FIG. 8A-8B, but could also be used with other types of wearable devices for sensing neuromuscular signals (such as body-wearable or head-wearable devices that might have neuromuscular sensors closer to the brain or spinal column).

In some embodiments, a wrist-wearable device 800 can be used in conjunction with a head-wearable device described below (e.g., AR device 900 and VR device 910) and/or an HIPD 1000, and the wrist-wearable device 800 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality. Having thus described example wrist-wearable device, attention will now be turned to example head-wearable devices, such AR device 900 and VR device 910.

Example Head-Wearable Devices

FIGS. 9A, 9B-1, 9B-2, and 9C show example head-wearable devices, in accordance with some embodiments. Head-wearable devices can include, but are not limited to, AR devices 910 (e.g., AR or smart eyewear devices, such as smart glasses, smart monocles, smart contacts, etc.), VR devices 910 (e.g., VR headsets, head-mounted displays (HMD) s, etc.), or other ocularly coupled devices. The AR devices 900 and the VR devices 910 are instances of the head-wearable devices described in reference to FIGS. 1A-6B herein, such that the head-wearable device should be understood to have the features of the AR devices 900 and/or the VR devices 910, and vice versa. The AR devices 900 and the VR devices 910 can perform various functions and/or operations associated with navigating through user interfaces and selectively opening applications, as well as the functions and/or operations described above with reference to FIGS. 1A-6B.

In some embodiments, an AR system (e.g., AR systems 700*a*-700*c*; FIGS. 7A-7C-2) includes an AR device 900 (as shown in FIG. 9A) and/or VR device 910 (as shown in FIGS. 9B-1-B-2). In some embodiments, the AR device 900 and the VR device 910 can include one or more analogous components (e.g., components for presenting interactive artificial-reality environments, such as processors, memory, and/or presentation devices, including one or more displays and/or one or more waveguides), some of which are described in more detail with respect to FIG. 9C. The head-wearable devices can use display projectors (e.g., display projector assemblies 907A and 907B) and/or waveguides for projecting representations of data to a user. Some embodiments of head-wearable devices do not include displays.

FIG. 9A shows an example visual depiction of the AR device 900 (e.g., which may also be described herein as augmented-reality glasses and/or smart glasses). The AR device 900 can work in conjunction with additional electronic components that are not shown in FIGS. 9A, such as a wearable accessory device and/or an intermediary processing device, in electronic communication or otherwise configured to be used in conjunction with the AR device 900. In some embodiments, the wearable accessory device and/or the intermediary processing device may be configured to couple with the AR device 900 via a coupling mechanism in electronic communication with a coupling sensor 924, where the coupling sensor 924 can detect when an electronic device becomes physically or electronically coupled with the AR device 900. In some embodiments, the AR device 900 can be configured to couple to a housing (e.g., a portion of frame 904 or temple arms 905), which may include one or more additional coupling mechanisms configured to couple with additional accessory devices. The components shown in FIG. 9A can be implemented in hardware, software, firmware, or a combination thereof, including one or more signal-processing components and/or application-specific integrated circuits (ASICs).

The AR device 900 includes mechanical glasses components, including a frame 904 configured to hold one or more lenses (e.g., one or both lenses 906-1 and 906-2). One of ordinary skill in the art will appreciate that the AR device 900 can include additional mechanical components, such as hinges configured to allow portions of the frame 904 of the AR device 900 to be folded and unfolded, a bridge configured to span the gap between the lenses 906-1 and 906-2 and rest on the user's nose, nose pads configured to rest on the bridge of the nose and provide support for the AR device 900, earpieces configured to rest on the user's ears and provide additional support for the AR device 900, temple arms 905 configured to extend from the hinges to the earpieces of the AR device 900, and the like. One of ordinary skill in the art will further appreciate that some examples of the AR device 900 can include none of the mechanical components described herein. For example, smart contact lenses configured to present artificial reality to users may not include any components of the AR device 900.

The lenses 906-1 and 906-2 can be individual displays or display devices (e.g., a waveguide for projected representations). The lenses 906-1 and 906-2 may act together or independently to present an image or series of images to a user. In some embodiments, the lenses 906-1 and 906-2 can operate in conjunction with one or more display projector assemblies 907A and 907B to present image data to a user. While the AR device 900 includes two displays, embodiments of this disclosure may be implemented in AR devices with a single near-eye display (NED) or more than two NEDs.

The AR device 900 includes electronic components, many of which will be described in more detail below with respect to FIG. 9C. Some example electronic components are illustrated in FIG. 9A, including sensors 923-1, 923-2, 923-3, 923-4, 923-5, and 923-6, which can be distributed along a substantial portion of the frame 904 of the AR device 900. The different types of sensors are described below in reference to FIG. 9C. The AR device 900 also includes a left camera 939A and a right camera 939B, which are located on different sides of the frame 904. And the eyewear device includes one or more processors 948A and 948B (e.g., an integral microprocessor, such as an ASIC) that is embedded into a portion of the frame 904.

FIGS. 9B-1 and 9B-2 show an example visual depiction of the VR device 910 (e.g., a head-mounted display (HMD) 912, also referred to herein as an extended-reality headset, a head-wearable device, a VR headset, etc.). The HMD 912 includes a front body 914 and a frame 916 (e.g., a strap or band) shaped to fit around a user's head. In some embodiments, the front body 914 and/or the frame 916 includes one or more electronic elements for facilitating presentation of and/or interactions with an AR and/or VR system (e.g., displays, processors (e.g., processor 948A-1), IMUs, tracking emitter or detectors, sensors, etc.). In some embodiments, the HMD 912 includes output audio transducers (e.g., an audio transducer 918-1), as shown in FIG. 9B-2. In some embodiments, one or more components, such as the output audio transducer(s) 918-1 and the frame 916, can be configured to attach and detach (e.g., are detachably attachable)

to the HMD 912 (e.g., a portion or all of the frame 916, and/or the output audio transducer 918-1), as shown in FIG. 9B-2. In some embodiments, coupling a detachable component to the HMD 912 causes the detachable component to come into electronic communication with the HMD 912. The VR device 910 includes electronic components, many of which will be described in more detail below with respect to FIG. 9C.

FIG. 9B-1 to 9B-2 also show that the VR device 910 one or more cameras, such as the left camera 939A and the right camera 939B, which can be analogous to the left and right cameras on the frame 904 of the AR device 900. In some embodiments, the VR device 910 includes one or more additional cameras (e.g., cameras 939C and 939D), which can be configured to augment image data obtained by the cameras 939A and 939B by providing more information. For example, the camera 939C can be used to supply color information that is not discerned by cameras 939A and 939B. In some embodiments, one or more of the cameras 939A to 939D can include an optional IR cut filter configured to remove IR light from being received at the respective camera sensors.

The VR device 910 can include a housing 990 storing one or more components of the VR device 910 and/or additional components of the VR device 910. The housing 990 can be a modular electronic device configured to couple with the VR device 910 (or an AR device 900) and supplement and/or extend the capabilities of the VR device 910 (or an AR device 900). For example, the housing 990 can include additional sensors, cameras, power sources, processors (e.g., processor 948A-2), etc. to improve and/or increase the functionality of the VR device 910. Examples of the different components included in the housing 990 are described below in reference to FIG. 9C.

Alternatively or in addition, in some embodiments, the head-wearable device, such as the VR device 910 and/or the AR device 900), includes, or is communicatively coupled to, another external device (e.g., a paired device), such as an HIPD 10 (discussed below in reference to FIGS. 10A-10B) and/or an optional neckband. The optional neckband can couple to the head-wearable device via one or more connectors (e.g., wired or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as an intermediary processing device (e.g., an HIPD device 1000, an optional neckband, and/or wearable accessory device) with the head-wearable devices (e.g., an AR device 900 and/or VR device 910) enables the head-wearable devices to achieve a similar form factor of a pair of glasses while still providing sufficient battery and computation power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable devices overall while allowing the head-wearable devices to retain its desired functionality. For example, the intermediary processing device (e.g., the HIPD 1000) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, storage, etc.) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, like an HIPD 1000, can process information generated by one or more sensors of its sensors and/or information provided by other communicatively coupled devices. For example, a head-wearable device can include an IMU, and the intermediary processing device (neckband and/or an HIPD 1000) can compute all inertial and spatial calculations from the IMUs located on the head-wearable device. Additional examples of processing performed by a communicatively coupled device, such as the HIPD 1000, are provided below in reference to FIGS. 10A and 10B.

Artificial-reality systems may include a variety of types of visual feedback mechanisms. For example, display devices in the AR devices 900 and/or the VR devices 910 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen. In addition to or instead of using display screens, some artificial-reality systems include one or more projection systems. For example, display devices in the AR device 900 and/or the VR device 910 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 900 and the VR device 910, either or both of the example head-wearable devices described herein can be configured to present fully-immersive VR scenes presented in substantially all of a user's field of view, additionally or alternatively to, subtler augmented-reality scenes that are presented within a portion, less than all, of the user's field of view.

In some embodiments, the AR device 900 and/or the VR device 910 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices (e.g., wrist-wearable devices which may be incorporated into headwear, gloves, body suits, handheld controllers, environmental devices (e.g., chairs or floormats), and/or any other type of device or system, such as a wrist-wearable device 800, an HIPD 1000, smart textile-based garment, etc.), and/or other devices described herein.

FIG. 9C illustrates a computing system 920 and an optional housing 990, each of which show components that can be included in a head-wearable device (e.g., the AR device 900 and/or the VR device 910). In some embodiments, more or less components can be included in the optional housing 990 depending on practical restraints of the respective head-wearable device being described. Additionally, or alternatively, the optional housing 990 can include additional components to expand and/or augment the functionality of a head-wearable device.

In some embodiments, the computing system 920 and/or the optional housing 990 can include one or more peripheral interfaces 922A and 922B, one or more power systems 942A and 942B (including charger input 943, PMIC 944, and battery 945), one or more controllers 946A 946B (including one or more haptic controllers 947), one or more processors 948A and 948B (as defined above, including any of the examples provided), and memory 950A and 950B, which can all be in electronic communication with each other. For example, the one or more processors 948A and/or 948B can be configured to execute instructions stored in the memory 950A and/or 950B, which can cause a controller of the one or more controllers 946A and/or 946B to cause operations to be performed at one or more peripheral devices of the peripherals interfaces 922A and/or 922B. In some embodiments, each operation described can occur based on electrical power provided by the power system 942A and/or 942B.

In some embodiments, the peripherals interface 922A can include one or more devices configured to be part of the computing system 920, many of which have been defined above and/or described with respect to wrist-wearable devices shown in FIGS. 8A and 8B. For example, the peripherals interface can include one or more sensors 923A. Some example sensors include: one or more coupling sensors 924, one or more acoustic sensors 925, one or more imaging sensors 926, one or more EMG sensors 927, one or more capacitive sensors 928, and/or one or more IMUs 929. In some embodiments, the sensors 923A further include depth sensors 967, light sensors 968 and/or any other types of sensors defined above or described with respect to any other embodiments discussed herein.

In some embodiments, the peripherals interface can include one or more additional peripheral devices, including one or more NFC devices 930, one or more GPS devices 931, one or more LTE devices 932, one or more WiFi and/or Bluetooth devices 933, one or more buttons 934 (e.g., including buttons that are slidable or otherwise adjustable), one or more displays 935A, one or more speakers 936A, one or more microphones 937A, one or more cameras 938A (e.g., including the a first camera 939-1 through nth camera 939-*n*, which are analogous to the left camera 939A and/or the right camera 939B), one or more haptic devices 940; and/or any other types of peripheral devices defined above or described with respect to any other embodiments discussed herein.

The head-wearable devices can include a variety of types of visual feedback mechanisms (e.g., presentation devices). For example, display devices in the AR device 900 and/or the VR device 910 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes), and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 935A can be coupled to each of the lenses 906-1 and 906-2 of the AR device 900. The displays 935A coupled to each of the lenses 906-1 and 906-2 can act together or independently to present an image or series of images to a user. In some embodiments, the AR device 900 and/or the VR device 910 includes a single display 935A (e.g., a near-eye display) or more than two displays 935A.

In some embodiments, a first set of one or more displays 935A can be used to present an augmented-reality environment, and a second set of one or more display devices 935A can be used to present a virtual-reality environment. In some embodiments, one or more waveguides are used in conjunction with presenting artificial-reality content to the user of the AR device 900 and/or the VR device 910 (e.g., as a means of delivering light from a display projector assembly and/or one or more displays 935A to the user's eyes). In some embodiments, one or more waveguides are fully or partially integrated into the AR device 900 and/or the VR device 910. Additionally, or alternatively to display screens, some artificial-reality systems include one or more projection systems. For example, display devices in the AR device 900 and/or the VR device 910 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. The head-wearable devices can also be configured with any other suitable type or form of image projection system. In some embodiments, one or more waveguides are provided additionally or alternatively to the one or more display(s) 935A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15-50% of the ambient light and/or the real-world live view) can be passed through the user interface element, such that the user can distinguish at least a portion of the physical environment over which the user interface element is being displayed.

The head-wearable devices can include one or more external displays 935A for presenting information to users. For example, an external display 935A can be used to show a current battery level, network activity (e.g., connected, disconnected, etc.), current activity (e.g., playing a game, in a call, in a meeting, watching a movie, etc.), and/or other relevant information. In some embodiments, the external displays 935A can be used to communicate with others. For example, a user of the head-wearable device can cause the external displays 935A to present a do not disturb notification. The external displays 935A can also be used by the user to share any information captured by the one or more components of the peripherals interface 922A and/or generated by head-wearable device (e.g., during operation and/or performance of one or more applications).

The memory 950A can include instructions and/or data executable by one or more processors 948A (and/or processors 948B of the housing 990) and/or a memory controller of the one or more controllers 946A (and/or controller 946B of the housing 990). The memory 950A can include one or more operating systems 951; one or more applications 952; one or more communication interface modules 953A; one or more graphics modules 954A; one or more AR processing modules 955A; one or more XR modelling modules 956; and/or any other types of modules or components defined above or described with respect to any other embodiments discussed herein.

The data 960 stored in memory 950A can be used in conjunction with one or more of the applications and/or programs discussed above. The data 960 can include profile data 961; sensor data 962; media content data 963; AR application data 964; XR modelling data 965; and/or any other types of data defined above or described with respect to any other embodiments discussed herein.

In some embodiments, the controller 946A of the head-wearable devices processes information generated by the sensors 923A on the head-wearable devices and/or another component of the head-wearable devices and/or communicatively coupled with the head-wearable devices (e.g., components of the housing 990, such as components of peripherals interface 922B). For example, the controller 946A can process information from the acoustic sensors 925 and/or image sensors 926. For each detected sound, the controller 946A can perform a direction of arrival (DOA) estimation to estimate a direction from which the detected sound arrived at a head-wearable device. As one or more of the acoustic sensors 925 detects sounds, the controller 946A can populate an audio data set with the information (e.g., represented by sensor data 962).

In some embodiments, a physical electronic connector can convey information between the head-wearable devices and another electronic device, and/or between one or more processors 948A of the head-wearable devices and the controller 946A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 1000) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 900 and/or the VR device 910 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. A head-wearable device can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with in AR environment), among a variety of other functions. For example, FIGS. 9B-1 and 9B-2 show the VR device 910 having cameras 939A-939D, which can be used to provide depth information for creating a voxel field and a two-dimensional mesh to provide object information to the user to avoid collisions.

The optional housing 990 can include analogous components to those describe above with respect to the computing system 920. For example, the optional housing 990 can include a respective peripherals interface 922B including more or less components to those described above with respect to the peripherals interface 922A. As described above, the components of the optional housing 990 can be used augment and/or expand on the functionality of the head-wearable devices. For example, the optional housing 990 can include respective sensors 923B, speakers 936B, displays 935B, microphones 937B, cameras 938B, and/or other components to capture and/or present data. Similarly, the optional housing 990 can include one or more processors 948B, controllers 946B, and/or memory 950B (including respective communication interface modules 953B; one or more graphics modules 954B; one or more AR processing modules 955B, etc.) that can be used individually and/or in conjunction with the components of the computing system 920.

The techniques described above in FIGS. 9A-9C can be used with different head-wearable devices. In some embodiments, the head-wearable devices (e.g., the AR device 900 and/or the VR device 910) can be used in conjunction with one or more wearable device such as a wrist-wearable device 800 (or components thereof).

Example Handheld Intermediary Processing Devices

Figure 10A:
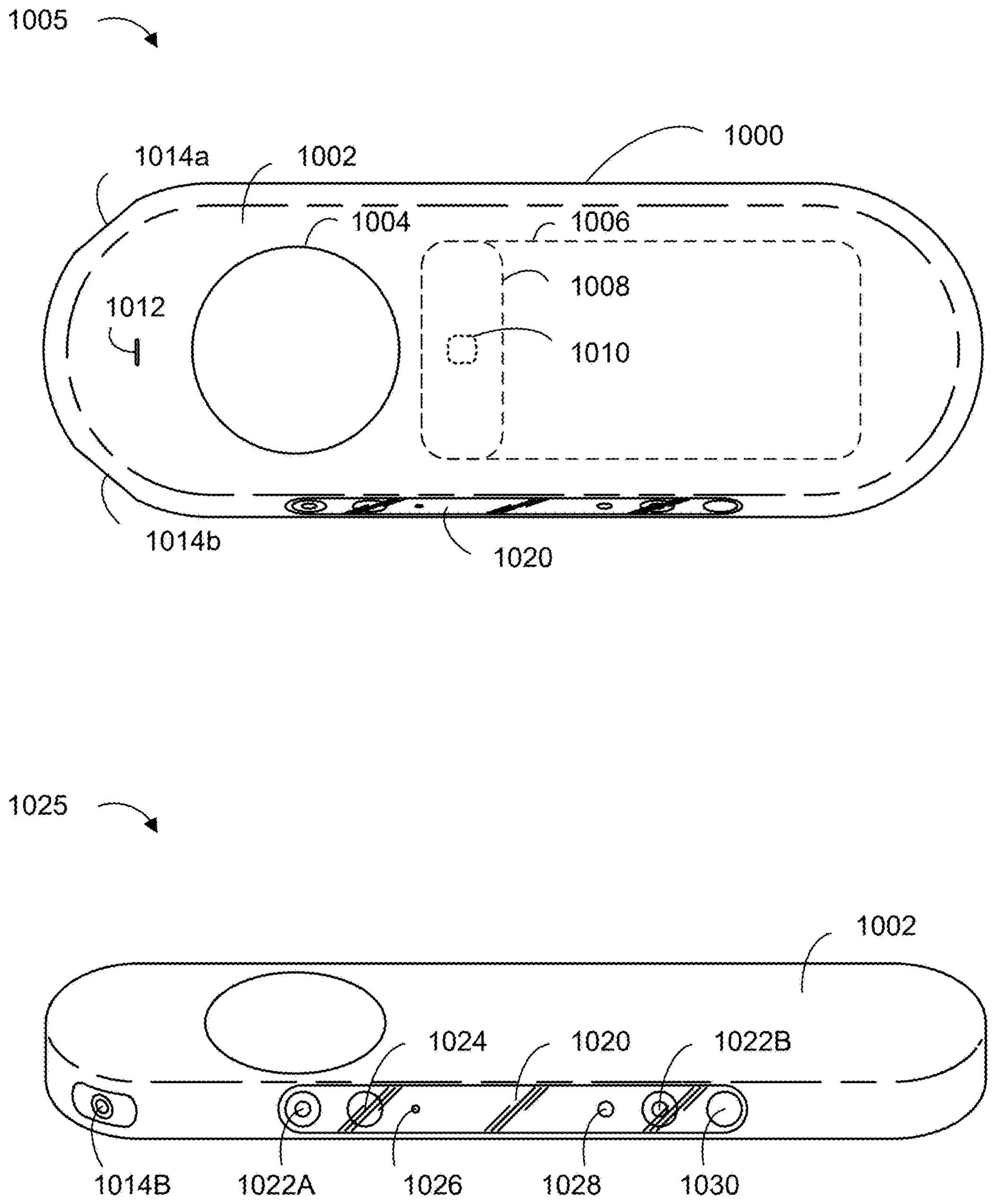
FIGS. 10A-10B illustrate an example handheld intermediary processing device, in accordance with some embodiments.
Figure 10B:
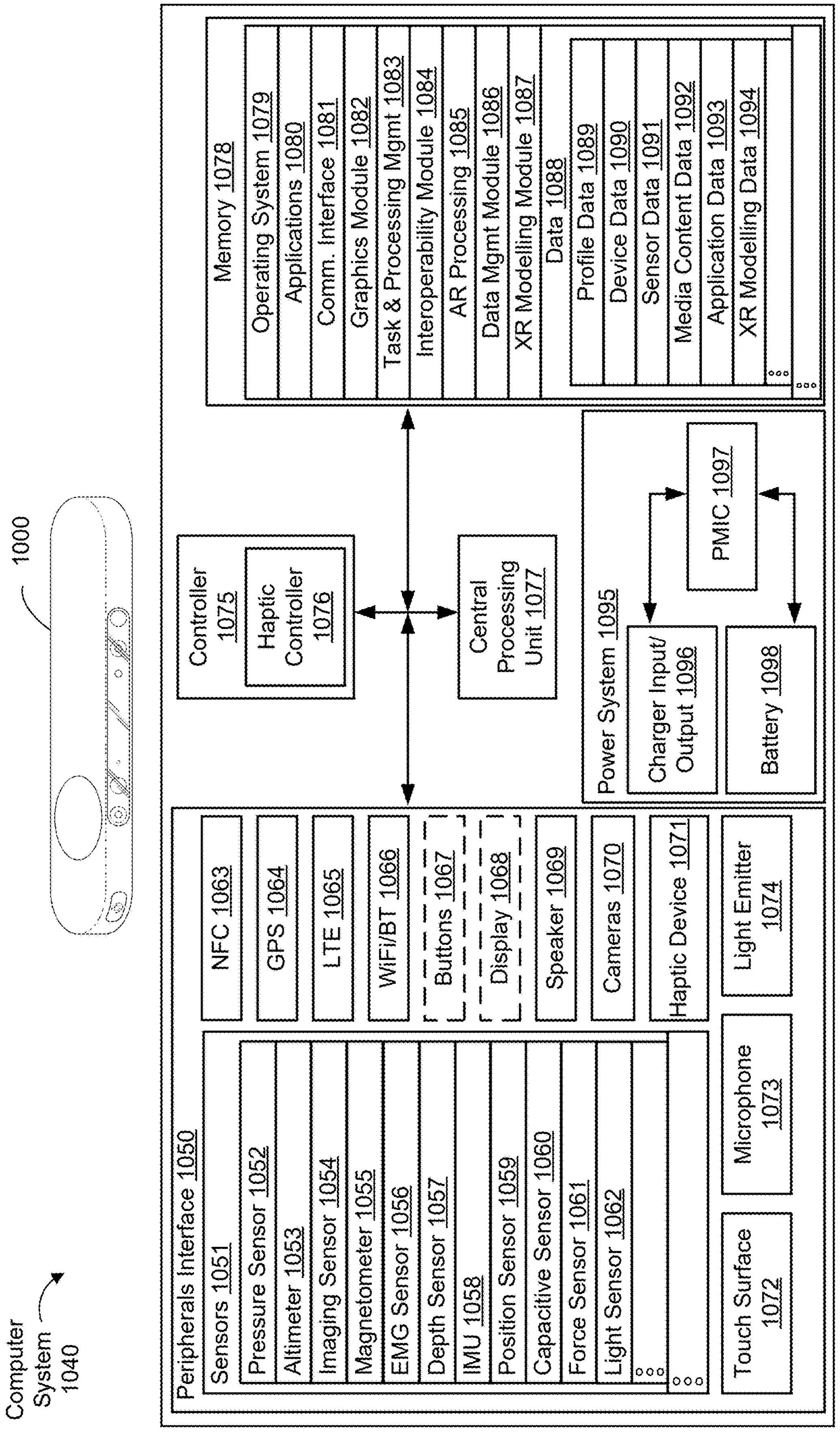

FIGS. 10A and 10B illustrate an example handheld intermediary processing device (HIPD) 1000, in accordance with some embodiments. The HIPD 1000 is an instance of the intermediary device described in reference to FIGS. 1A-6B herein, such that the HIPD 1000 should be understood to have the features described with respect to any intermediary device defined above or otherwise described herein, and vice versa. The HIPD 1000 can perform various functions and/or operations associated with navigating through user interfaces and selectively opening applications, as well as the functions and/or operations described above with reference to FIGS. 1A-6B.

FIG. 10A shows a top view 1005 and a side view 1025 of the HIPD 1000. The HIPD 1000 is configured to communicatively couple with one or more wearable devices (or other electronic devices) associated with a user. For example, the HIPD 1000 is configured to communicatively couple with a user's wrist-wearable device 800 (or components thereof, such as the watch body 820 and the wearable band 810), AR device 900, and/or VR device 910. The HIPD 1000 can be configured to be held by a user (e.g., as a handheld controller), carried on the user's person (e.g., in their pocket, in their bag, etc.), placed in proximity of the user (e.g., placed on their desk while seated at their desk, on a charging dock, etc.), and/or placed at or within a predetermined distance from a wearable device or other electronic device (e.g., where, in some embodiments, the predetermined distance is the maximum distance (e.g., 10 meters) at which the HIPD 1000 can successfully be communicatively coupled with an electronic device, such as a wearable device).

The HIPD 1000 can perform various functions independently and/or in conjunction with one or more wearable devices (e.g., wrist-wearable device 800, AR device 900, VR device 910, etc.). The HIPD 1000 is configured to increase and/or improve the functionality of communicatively coupled devices, such as the wearable devices. The HIPD 1000 is configured to perform one or more functions or operations associated with interacting with user interfaces and applications of communicatively coupled devices, interacting with an AR environment, interacting with VR environment, and/or operating as a human-machine interface controller, as well as functions and/or operations described above with reference to FIGS. 1A-6B. Additionally, as will be described in more detail below, functionality and/or operations of the HIPD 1000 can include, without limitation, task offloading and/or handoffs; thermals offloading and/or handoffs; 6 degrees of freedom (6DoF) raycasting and/or gaming (e.g., using imaging devices or cameras 1014A and 1014B, which can be used for simultaneous localization and mapping (SLAM) and/or with other image processing techniques); portable charging; messaging; image capturing via one or more imaging devices or cameras (e.g., cameras 1022A and 1022B); sensing user input (e.g., sensing a touch on a multi-touch input surface 1002); wireless communications and/or interlining (e.g., cellular, near field, Wi-Fi, personal area network, etc.); location determination; financial transactions; providing haptic feedback; alarms; notifications; biometric authentication; health monitoring; sleep monitoring; etc. The above-example functions can be executed independently in the HIPD 1000 and/or in communication between the HIPD 1000 and another wearable device described herein. In some embodiments, functions can be executed on the HIPD 1000 in conjunction with an AR environment. As the skilled artisan will appreciate upon reading the descriptions provided herein, the novel the HIPD 1000 described herein can be used with any type of suitable AR environment.

While the HIPD 1000 is communicatively coupled with a wearable device and/or other electronic device, the HIPD 1000 is configured to perform one or more operations initiated at the wearable device and/or the other electronic device. In particular, one or more operations of the wearable device and/or the other electronic device can be offloaded to the HIPD 1000 to be performed. The HIPD 1000 performs the one or more operations of the wearable device and/or the other electronic device and provides to data corresponded to the completed operations to the wearable device and/or the other electronic device. For example, a user can initiate a video stream using AR device 900 and back-end tasks associated with performing the video stream (e.g., video rendering) can be offloaded to the HIPD 1000, which the HIPD 1000 performs and provides corresponding data to the AR device 900 to perform remaining front-end tasks associated with the video stream (e.g., presenting the rendered video data via a display of the AR device 900). In this way, the HIPD 1000, which has more computational resources and greater thermal headroom than a wearable device, can perform computationally intensive tasks for the wearable device improving performance of an operation performed by the wearable device.

The HIPD 1000 includes a multi-touch input surface 1002 on a first side (e.g., a front surface) that is configured to detect one or more user inputs. In particular, the multi-touch input surface 1002 can detect single tap inputs, multi-tap inputs, swipe gestures and/or inputs, force-based and/or pressure-based touch inputs, held taps, and the like. The multi-touch input surface 1002 is configured to detect capacitive touch inputs and/or force (and/or pressure) touch inputs. The multi-touch input surface 1002 includes a first touch-input surface 1004 defined by a surface depression, and a second touch-input surface 1006 defined by a substantially planar portion. The first touch-input surface 1004 can be disposed adjacent to the second touch-input surface 1006. In some embodiments, the first touch-input surface 1004 and the second touch-input surface 1006 can be different dimensions, shapes, and/or cover different portions of the multi-touch input surface 1002. For example, the first touch-input surface 1004 can be substantially circular and the second touch-input surface 1006 is substantially rectangular. In some embodiments, the surface depression of the multi-touch input surface 1002 is configured to guide user handling of the HIPD 1000. In particular, the surface depression is configured such that the user holds the HIPD 1000 upright when held in a single hand (e.g., such that the using imaging devices or cameras 1014A and 1014B are pointed toward a ceiling or the sky). Additionally, the surface depression is configured such that the user's thumb rests within the first touch-input surface 1004.

In some embodiments, the different touch-input surfaces include a plurality of touch-input zones. For example, the second touch-input surface 1006 includes at least a first touch-input zone 1008 within a second touch-input zone 1006 and a third touch-input zone 1010 within the first touch-input zone 1008. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 1008 causes the HIPD 1000 to perform a first command and a user input detected within the second touch-input zone 1006 causes the HIPD 1000 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 1008 can be configured to detect force touch inputs (e.g., a magnitude at which the user presses down) and capacitive touch inputs, and the second touch-input zone 1006 can be configured to detect capacitive touch inputs.

The HIPD 1000 includes one or more sensors 1051 for sensing data used in the performance of one or more operations and/or functions. For example, the HIPD 1000 can include an IMU that is used in conjunction with cameras 1014 for 3-dimensional object manipulation (e.g., enlarging, moving, destroying, etc. an object) in an AR or VR environment. Non-limiting examples of the sensors 1051 included in the HIPD 1000 include a light sensor, a magnetometer, a depth sensor, a pressure sensor, and a force sensor. Additional examples of the sensors 1051 are provided below in reference to FIG. 10B.

The HIPD 1000 can include one or more light indicators 1012 to provide one or more notifications to the user. In some embodiments, the light indicators are LEDs or other types of illumination devices. The light indicators 1012 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 1004. The light indicators can be illuminated in different colors and/or patterns to provide the user with one or more notifications and/or information about the device. For example, a light indicator positioned around the first touch-input surface 1004 can flash when the user receives a notification (e.g., a message), change red when the HIPD 1000 is out of power, operate as a progress bar (e.g., a light ring that is closed when a task is completed (e.g., 0% to 100%)), operates as a volume indicator, etc.).

In some embodiments, the HIPD 1000 includes one or more additional sensors on another surface. For example, as shown FIG. 10A, HIPD 1000 includes a set of one or more sensors (e.g., sensor set 1020) on an edge of the HIPD 1000. The sensor set 1020, when positioned on an edge of the of the HIPD 1000, can be positioned at a predetermined tilt angle (e.g., 26 degrees), which allows the sensor set 1020 to be angled toward the user when placed on a desk or other flat surface. Alternatively, in some embodiments, the sensor set 1020 is positioned on a surface opposite the multi-touch input surface 1002 (e.g., a back surface). The one or more sensors of the sensor set 1020 are discussed in detail below.

The side view 1025 of the of the HIPD 1000 shows the sensor set 1020 and camera 1014B. The sensor set 1020 includes one or more cameras 1022A and 1022B, a depth projector 1024, an ambient light sensor 1028, and a depth receiver 1030. In some embodiments, the sensor set 1020 includes a light indicator 1026. The light indicator 1026 can operate as a privacy indicator to let the user and/or those around them know that a camera and/or microphone is active. The sensor set 1020 is configured to capture a user's facial expression such that the user can puppet a custom avatar (e.g., showing emotions, such as smiles, laughter, etc., on the avatar or a digital representation of the user). The sensor set 1020 can be configured as a side stereo RGB system, a rear indirect Time-of-Flight (iToF) system, or a rear stereo RGB system. As the skilled artisan will appreciate upon reading the descriptions provided herein, the novel HIPD 1000 described herein can use different sensor set 1020 configurations and/or sensor set 1020 placement.

In some embodiments, the HIPD 1000 includes one or more haptic devices 1071 (FIG. 10B; e.g., a vibratory haptic actuator) that are configured to provide haptic feedback (e.g., kinesthetic sensation). The sensors 1051, and/or the haptic devices 1071 can be configured to operate in conjunction with multiple applications and/or communicatively coupled devices including, without limitation, wearable devices, health monitoring applications, social media applications, game applications, and artificial reality applications (e.g., the applications associated with artificial reality).

The HIPD 1000 is configured to operate without a display. However, in optional embodiments, the HIPD 1000 can include a display 1068 (FIG. 10B). The HIPD 1000 can also income one or more optional peripheral buttons 1067 (FIG. 10B). For example, the peripheral buttons 1067 can be used to turn on or turn off the HIPD 1000. Further, the HIPD 1000 housing can be formed of polymers and/or elastomer elastomers. The HIPD 1000 can be configured to have a non-slip surface to allow the HIPD 1000 to be placed on a surface without requiring a user to watch over the HIPD 1000. In other words, the HIPD 1000 is designed such that it would not easily slide off surfaces. In some embodiments, the HIPD 1000 include one or magnets to couple the HIPD 1000 to another surface. This allows the user to mount the HIPD 1000 to different surfaces and provide the user with greater flexibility in use of the HIPD 1000.

As described above, the HIPD 1000 can distribute and/or provide instructions for performing the one or more tasks at the HIPD 1000 and/or a communicatively coupled device. For example, the HIPD 1000 can identify one or more back-end tasks to be performed by the HIPD 1000 and one or more front-end tasks to be performed by a communicatively coupled device. While the HIPD 1000 is configured to offload and/or handoff tasks of a communicatively coupled device, the HIPD 1000 can perform both back-end and front-end tasks (e.g., via one or more processors, such as CPU 1077; FIG. 10B). The HIPD 1000 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 1000 can perform the above operations alone or in conjunction with a wearable device (or other communicatively coupled electronic device).

FIG. 10B shows block diagrams of a computing system 1040 of the HIPD 1000, in accordance with some embodiments. The HIPD 1000, described in detail above, can include one or more components shown in HIPD computing system 1040. The HIPD 1000 will be understood to include the components shown and described below for the HIPD computing system 1040. In some embodiments, all, or a substantial portion of the components of the HIPD computing system 1040 are included in a single integrated circuit. Alternatively, in some embodiments, components of the HIPD computing system 1040 are included in a plurality of integrated circuits that are communicatively coupled.

The HIPD computing system 1040 can include a processor (e.g., a CPU 1077, a GPU, and/or a CPU with integrated graphics), a controller 1075, a peripherals interface 1050 that includes one or more sensors 1051 and other peripheral devices, a power source (e.g., a power system 1095), and memory (e.g., a memory 1078) that includes an operating system (e.g., an operating system 1079), data (e.g., data 1088), one or more applications (e.g., applications 1080), and one or more modules (e.g., a communications interface module 1081, a graphics module 1082, a task and processing management module 1083, an interoperability module 1084, an AR processing module 1085, a data management module 1086, an XR modelling module 1087, etc.). The HIPD computing system 1040 further includes a power system 1095 that includes a charger input and output 1096, a PMIC 1097, and a battery 1098, all of which are defined above.

In some embodiments, the peripherals interface 1050 can include one or more sensors 1051. The sensors 1051 can include analogous sensors to those described above in reference to FIG. 8B. For example, the sensors 1051 can include imaging sensors 1054, (optional) EMG sensors 1056, IMUs 1058, and capacitive sensors 1060. In some embodiments, the sensors 1051 can include one or more pressure sensor 1052 for sensing pressure data, an altimeter 1053 for sensing an altitude of the HIPD 1000, a magnetometer 1055 for sensing a magnetic field, a depth sensor 1057 (or a time-of flight sensor) for determining a difference between the camera and the subject of an image, a position sensor 1059 (e.g., a flexible position sensor) for sensing a relative displacement or position change of a portion of the HIPD 1000, a force sensor 1061 for sensing a force applied to a portion of the HIPD 1000, and a light sensor 1062 (e.g., an ambient light sensor) for detecting an amount of lighting. The sensors 1051 can include one or more sensors not shown in FIG. 10B.

Analogous to the peripherals described above in reference to FIGS. 8B, the peripherals interface 1050 can also include an NFC component 1063, a GPS component 1064, an LTE component 1065, a Wi-Fi and/or Bluetooth communication component 1066, a speaker 1069, a haptic device 1071, and a microphone 1073. As described above in reference to FIG. 10A, the HIPD 1000 can optionally include a display 1068 and/or one or more buttons 1067. The peripherals interface 1050 can further include one or more cameras 1070, touch surfaces 1072, and/or one or more light emitters 1074. The multi-touch input surface 1002 described above in reference to FIG. 10A is an example of touch surface 1072. The light emitters 1074 can be one or more LEDs, lasers, etc. and can be used to project or present information to a user. For example, the light emitters 1074 can include light indicators 1012 and 1026 described above in reference to FIG. 10A. The cameras 1070 (e.g., cameras 1014A, 1014B, and 1022 described above in FIG. 10A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 1070 can be used for SLAM; 6 DoF ray casting, gaming, object manipulation, and/or other rendering; facial recognition and facial expression recognition, etc.

Similar to the watch body computing system 860 and the watch band computing system 830 described above in reference to FIG. 8B, the HIPD computing system 1040 can include one or more haptic controllers 1076 and associated componentry (e.g., haptic devices 1071) for providing haptic events at the HIPD 1000.

Memory 1078 can include high-speed random-access memory and/or non-volatile memory, such as one or more magnetic disk storage devices, flash memory devices, or other non-volatile solid-state memory devices. Access to the memory 1078 by other components of the HIPD 1000, such as the one or more processors and the peripherals interface 1050, can be controlled by a memory controller of the controllers 1075.

In some embodiments, software components stored in the memory 1078 include one or more operating systems 1079, one or more applications 1080, one or more communication interface modules 1081, one or more graphics modules 1082, one or more data management modules 1085, which are analogous to the software components described above in reference to FIG. 8B. The software components stored in the memory 1078 can also include an XR modelling model 1086A, which is configured to perform the features described above in reference to FIGS. 1A-6B.

In some embodiments, software components stored in the memory 1078 include a task and processing management module 1083 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 1083 uses data 1088 (e.g., device data 1090) to distribute the one or more front-end and/or back-end tasks based on communicatively coupled devices' computing resources, available power, thermal headroom, ongoing operations, and/or other factors. For example, the task and processing management module 1083 can cause the performance of one or more back-end tasks (of an operation performed at communicatively coupled AR device 900) at the HIPD 1000 in accordance with a determination that the operation is utilizing a predetermined amount (e.g., at least 70%) of computing resources available at the AR device 900.

In some embodiments, software components stored in the memory 1078 include an interoperability module 1084 for exchanging and utilizing information received and/or provided to distinct communicatively coupled devices. The interoperability module 1084 allows for different systems, devices, and/or applications to connect and communicate in a coordinated way without user input. In some embodiments, software components stored in the memory 1078 include an AR module 1085 that is configured to process signals based at least on sensor data for use in an AR and/or VR environment. For example, the AR processing module 1085 can be used for 3D object manipulation, gesture recognition, facial and facial expression, recognition, etc.

The memory 1078 can also include data 1087, including structured data. In some embodiments, the data 1087 can include profile data 1089, device data 1089 (including device data of one or more devices communicatively coupled with the HIPD 1000, such as device type, hardware, software, configurations, etc.), sensor data 1091, media content data 1092, application data 1093, and XR modelling data 1094, which stores data related to the performance of the features described above in reference to FIGS. 1A-6B.

It should be appreciated that the HIPD computing system 1040 is an example of a computing system within the HIPD 1000, and that the HIPD 1000 can have more or fewer components than shown in the HIPD computing system

1040, combine two or more components, and/or have a different configuration and/or arrangement of the components. The various components shown in HIPD computing system 1040 are implemented in hardware, software, firmware, or a combination thereof, including one or more signal processing and/or application-specific integrated circuits.

The techniques described above in FIG. 10A-10B can be used with any device used as a human-machine interface controller. In some embodiments, an HIPD 1000 can be used in conjunction with one or more wearable device such as a head-wearable device (e.g., AR device 900 and VR device 910) and/or a wrist-wearable device 800 (or components thereof).

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A non-transitory computer readable storage medium including instructions that, when executed by an extended-reality headset, cause the extended-reality headset to:

while presenting, using a lens system of the extended-reality headset, an extended reality (XR) representation of an object within a portion of a field of view of a user wearing the extended-reality headset:

in response to a first hand gesture performed by the user directed to the XR representation, initiate a first XR mode that allows the user to manipulate a plurality of component parts of the object within the XR representation;

while the first XR mode is active and in response to a second hand gesture performed by the user directed to a component part of the plurality of component parts of the XR representation, cause a manipulation to the component part based on the second hand gesture;

in response to a third hand gesture performed by the user, initiate a second XR mode, the second XR mode causing presentation of an XR augment that defines a boundary for receiving one or more of the plurality of component parts; and while the second XR mode is active and in response to movement of at least one component part of the plurality of component parts to within a threshold distance of the boundary, couple together the plurality of component parts to form the object in a structurally correct sequence.

2. The non-transitory computer readable storage medium of claim 1, wherein the instructions, when executed by an extended-reality headset, further cause the extended-reality headset to:

in response to a fourth hand gesture performed by the user, initiate a third XR mode, the third XR mode allowing the user to perform one or more gestures for measuring respective component parts of the plurality of component parts within the XR representation; and while the third XR mode is active and in response to a fifth hand gesture performed by the user, measure a distance between at least two points indicated by the fifth hand gesture, the distance being to scale with actual dimensions of the object.

3. The non-transitory computer readable storage medium of claim 1, wherein the instructions, when executed by an extended-reality headset, further cause the extended-reality headset to:

in response to a sixth hand gesture performed by the user, initiate a fourth XR mode, the fourth XR mode allowing the user to annotate respective component parts of the plurality of component parts within the XR representation; and while the fourth XR mode is active and in response to a seventh hand gesture performed by the user, annotate a portion of field of view of the user with an annotation XR augment.

4. The non-transitory computer readable storage medium of claim 1, wherein the instructions, when executed by an extended-reality headset, further cause the extended-reality headset to:

in response to an eighth hand gesture performed by the user, initiate a fifth XR mode, the fifth XR mode allowing the user to don and/or doff a representation of a different object; and while the fifth XR mode is active and in response to a ninth hand gesture performed by the user, don and/or doff the representation of the different object on a body of the user that is visible to other users within an extended-reality environment viewable by the user and the other users.

5. The non-transitory computer readable storage medium of claim 1, wherein the manipulations performed based on the second hand gesture include one or more of:

moving the plurality of component parts within the XR representation;

enlarging the plurality of component parts within the XR representation;

minimizing the plurality of component parts within the XR representation;

presenting an exploded view that includes all of the plurality of component parts within the XR representation; and presenting a cross section of plurality of component parts within the XR representation.

6. The non-transitory computer readable storage medium of claim 1, wherein the instructions, when executed by an extended-reality headset, further cause the extended-reality headset to:

in response to a tenth hand gesture performed by the user, remove respective manipulations to the plurality of component parts within the XR representation.

7. The non-transitory computer readable storage medium of claim 1, wherein:

the first mode is an assembly mode that allows the user to interact with one or more of the plurality of component parts within the XR representation;

the second mode is a build mode that animates the coupling of the plurality of component parts within the XR representation in a structurally accurate sequence;

the third mode is a measurement mode that allows the user to measure respective component parts of the plurality of component parts at scale;

the fourth mode is an annotation mode that allows a user to draw and/or provide messages in the XR environment; and the fifth mode is a don/doff mode that allows a user to wear respective XR objects.

8. The non-transitory computer readable storage medium of claim 1, wherein the plurality of component parts of the object represent information about corresponding component parts from a computer aided design document.

9. The non-transitory computer readable storage medium of claim 1, wherein interactions with the XR representation of the object and the plurality of component parts of the object are caused to be visible to other users accessing a same XR environment as the user.

10. The non-transitory computer readable storage medium of claim 1, wherein the instructions, when executed by an extended-reality headset, further cause the extended-reality headset to:

in response to an eleventh hand gesture performed by the user, initiate a sixth XR mode, the sixth XR mode allowing the user to modify at least one quality of respective component parts of the plurality of component parts within the XR representation; and while the sixth XR mode is active and in response to a twelfth hand gesture performed by the user, modify the at least one quality of respective component parts of the plurality of component parts within the XR representation.

11. The non-transitory computer readable storage medium of claim 1, wherein the instructions, when executed by an extended-reality headset, further cause the extended-reality headset to:

in response to a thirteenth hand gesture performed by the user, initiate a seventh XR mode, the seventh XR mode allowing the user to group respective component parts of the plurality of component parts within the XR representation with a grouping XR augment; and while the seventh XR mode is active and in response to a fourteenth hand gesture performed by the user, group the respective component parts of the plurality of component parts within the XR representation with the grouping XR augment.

12. The non-transitory computer readable storage medium of claim 1, wherein:

each of the first hand gesture, the second hand gesture, and the third hand gesture are each associated with a respective voice command; and each respective voice command is performed by the user alternatively or in conjunction with its respective hand gesture.

13. A head-wearable device, comprising:

one or more cameras;

one or more displays; and one or more programs, wherein the one or more programs are stored in memory and configured to be executed by one or more processors, the one or more programs including instructions cause the head-wearable device to:

while presenting, using the one or more displays, an extended reality (XR) representation of an object within a portion of a field of view of a user wearing the head-wearable device:

in response to a first hand gesture performed by the user directed to the XR representation, initiate a first XR mode that allows the user to manipulate a plurality of component parts of the object within the XR representation;

while the first XR mode is active and in response to a second hand gesture performed by the user directed to a component part of the plurality of component parts of the XR representation, cause a manipulation to the component part based on the second hand gesture;

in response to a third hand gesture performed by the user, initiate a second XR mode, the second XR mode causing presentation of an XR augment that defines a boundary for receiving one or more of the plurality of component parts; and while the second XR mode is active and in response to movement of at least one component part of the plurality of component parts to within a threshold distance of the boundary, couple together the plurality of component parts to form the object in a structurally correct sequence.

14. The head-wearable device of claim 13, wherein the one or more programs further include instructions that cause the head-wearable device to:

in response to a fourth hand gesture performed by the user, initiate a third XR mode, the third XR mode allowing the user to perform one or more gestures for measuring respective component parts of the plurality of component parts within the XR representation; and while the third XR mode is active and in response to a fifth hand gesture performed by the user, measure a distance between at least two points indicated by the fifth hand gesture, the distance being to scale with actual dimensions of the object.

15. The head-wearable device of claim 13, wherein the one or more programs further include instructions that cause the head-wearable device to:

in response to a sixth hand gesture performed by the user, initiate a fourth XR mode, the fourth XR mode allowing the user to annotate respective component parts of the plurality of component parts within the XR representation; and while the fourth XR mode is active and in response to a seventh hand gesture performed by the user, annotate a portion of field of view of the user with an annotation XR augment.

16. The head-wearable device of claim 13, wherein the one or more programs further include instructions that cause the head-wearable device to:

in response to an eighth hand gesture performed by the user, initiate a fifth XR mode, the fifth XR mode allowing the user to don and/or doff a representation of a different object; and while the fifth XR mode is active and in response to a ninth hand gesture performed by the user, don and/or doff the representation of the different object on a body of the user that is visible to other users within an extended-reality environment viewable by the user and the other users.

17. A method of operating an extended-reality (XR) headset, the method comprising:

while presenting, using a lens system of the XR headset, an XR representation of an object within a portion of a field of view of a user wearing the extended-reality headset:

in response to a first hand gesture performed by the user directed to the XR representation, initiating a first XR mode that allows the user to manipulate a plurality of component parts of the object within the XR representation;

while the first XR mode is active and in response to a second hand gesture performed by the user directed to a component part of the plurality of component parts of the XR representation, causing a manipulation to the component part based on the second hand gesture;

in response to a third hand gesture performed by the user, initiating a second XR mode, the second XR mode causing presentation of an XR augment that defines a boundary for receiving one or more of the plurality of component parts; and while the second XR mode is active and in response to movement of at least one component part of the plurality of component parts to within a threshold distance of the boundary, coupling together the plurality of component parts to form the object in a structurally correct sequence.

18. The method of claim 17, further comprising:

in response to a fourth hand gesture performed by the user, initiating a third XR mode, the third XR mode allowing the user to perform one or more gestures for measuring respective component parts of the plurality of component parts within the XR representation; and while the third XR mode is active and in response to a fifth hand gesture performed by the user, measuring a distance between at least two points indicated by the fifth hand gesture, the distance being to scale with actual dimensions of the object.

19. The method of claim 17, further comprising:

in response to a sixth hand gesture performed by the user, initiating a fourth XR mode, the fourth XR mode allowing the user to annotate respective component parts of the plurality of component parts within the XR representation; and while the fourth XR mode is active and in response to a seventh hand gesture performed by the user, annotating a portion of field of view of the user with an annotation XR augment.

20. The method of claim 17, further comprising:

in response to an eighth hand gesture performed by the user, initiating a fifth XR mode, the fifth XR mode allowing the user to don and/or doff a representation of a different object; and while the fifth XR mode is active and in response to a ninth hand gesture performed by the user, donning and/or doffing the representation of the different object on a body of the user that is visible to other users within an extended-reality environment viewable by the user and the other users.

* * * * *